United States Patent
Scheif et al.

(10) Patent No.: US 12,350,992 B2
(45) Date of Patent: *Jul. 8, 2025

(54) SIDE-BY-SIDE VEHICLE

(71) Applicant: Polaris Industries Inc., Medina, MN (US)

(72) Inventors: Andrew C. Scheif, Stacy, MN (US); Keith A. Hollman, Osceola, WI (US); Anthony J. Komarek, Taylors Falls, MN (US); Zachary Blackford, Harris, MN (US); Aaron D. Deckard, Stacy, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/673,549

(22) Filed: May 24, 2024

(65) Prior Publication Data

US 2024/0367475 A1 Nov. 7, 2024

Related U.S. Application Data

(63) Continuation of application No. 18/098,318, filed on Jan. 18, 2023, now Pat. No. 11,993,124, which is a (Continued)

(51) Int. Cl.
*B60G 21/055* (2006.01)
*B60G 3/20* (2006.01)
(Continued)

(52) U.S. Cl.
CPC ............. *B60G 21/055* (2013.01); *B60G 3/20* (2013.01); *B60K 13/04* (2013.01); *B60K 17/22* (2013.01);
(Continued)

(58) Field of Classification Search
None
See application file for complete search history.

(56) References Cited

U.S. PATENT DOCUMENTS 3,476,200 A 11/1969 Schoepe et al.
3,600,768 A 8/1971 Romanzi et al.
(Continued)

FOREIGN PATENT DOCUMENTS

CN 1603146 A 4/2005
CN 2837126 Y 11/2006
(Continued)

OTHER PUBLICATIONS

Examination Report issued by the European Patent Office, dated Jan. 12, 2018, for related European Patent Application No. 14771458.8; 6 pages.
(Continued)

*Primary Examiner* — Faye M Fleming
(74) *Attorney, Agent, or Firm* — SCHWEGMAN LUNDBERG & WOESSNER, P.A.

(57) ABSTRACT

A utility vehicle includes a plurality of ground-engaging members, a frame assembly, a cab frame assembly, a front suspension assembly, a rear suspension assembly, a power steering assembly, and a powertrain assembly, all of which may be configured to lower the center of gravity of the vehicle.

12 Claims, 49 Drawing Sheets

Related U.S. Application Data continuation of application No. 17/323,597, filed on May 18, 2021, now Pat. No. 11,660,927, which is a continuation of application No. 16/924,695, filed on Jul. 9, 2020, now Pat. No. 11,091,003, which is a continuation of application No. 16/531,960, filed on Aug. 5, 2019, now Pat. No. 10,737,547, which is a continuation of application No. 14/477,589, filed on Sep. 4, 2014, now Pat. No. 10,369,861.

(60) Provisional application No. 61/873,726, filed on Sep. 4, 2013.

(51) Int. Cl.
| | |
|---|---|
| *B60K 13/04* | (2006.01) |
| *B60K 17/22* | (2006.01) |
| *B60R 19/48* | (2006.01) |
| *B62D 3/12* | (2006.01) |
| *B62D 7/18* | (2006.01) |
| *B62D 21/18* | (2006.01) |
| *B62D 29/00* | (2006.01) |
| *B62D 33/06* | (2006.01) |
| *B60K 5/00* | (2006.01) |
| *B60K 13/02* | (2006.01) |

(52) U.S. Cl.
CPC ............ *B60R 19/48* (2013.01); *B62D 3/12* (2013.01); *B62D 7/18* (2013.01); *B62D 21/183* (2013.01); *B62D 29/00* (2013.01); *B62D 33/0625* (2013.01); *B60G 2200/144* (2013.01); *B60G 2200/44* (2013.01); *B60G 2300/124* (2013.01); *B60G 2300/13* (2013.01); *B60K 2005/003* (2013.01); *B60K 13/02* (2013.01); *B60Y 2200/20* (2013.01)

(56) References Cited

U.S. PATENT DOCUMENTS

| | | | |
|---|---|---|---|
| 5,306,044 A | 4/1994 | Tucker | |
| 6,003,898 A | 12/1999 | Teply et al. | |
| 6,293,588 B1 | 9/2001 | Clune | |
| 6,309,024 B1 | 10/2001 | Busch | |
| 6,976,550 B2 | 12/2005 | Vaisanen | |
| 7,000,978 B1 | 2/2006 | Messano | |
| 7,625,048 B2 | 12/2009 | Rouhana et al. | |
| 7,648,170 B2 | 1/2010 | Geslin et al. | |
| 7,819,220 B2 | 10/2010 | Sunsdahl et al. | |
| 7,950,486 B2 | 5/2011 | Van et al. | |
| 8,079,602 B2 | 12/2011 | Kinsman et al. | |
| 8,215,694 B2 | 7/2012 | Smith et al. | |
| 8,225,896 B2 | 7/2012 | Eichenberger et al. | |
| 8,302,711 B2 | 11/2012 | Kinsman et al. | |
| 8,328,235 B2 | 12/2012 | Schneider et al. | |
| 8,414,082 B2 | 4/2013 | Nakamura et al. | |
| 8,464,824 B1 | 6/2013 | Reisenberger | |
| 8,465,050 B1 | 6/2013 | Spindler et al. | |
| 8,548,710 B1 | 10/2013 | Reisenberger | |
| 8,613,335 B2 | 12/2013 | Deckard et al. | |
| 8,613,337 B2 | 12/2013 | Kinsman et al. | |
| 8,640,814 B2 | 2/2014 | Deckard et al. | |
| D703,102 S | 4/2014 | Eck et al. | |
| 8,684,410 B2 | 4/2014 | Kwon et al. | |
| 8,781,705 B1 | 7/2014 | Reisenberger | |
| 8,827,025 B2 | 9/2014 | Hapka | |
| 8,827,028 B2 | 9/2014 | Sunsdahl et al. | |
| 8,979,123 B1 | 3/2015 | Takahashi et al. | |
| 9,441,526 B2 | 9/2016 | Noguchi et al. | |
| 9,776,481 B2 | 10/2017 | Deckard et al. | |
| 10,246,153 B2 | 4/2019 | Deckard et al. | |
| 10,369,861 B2 | 8/2019 | Deckard et al. | |
| 10,737,547 B2 | 8/2020 | Deckard et al. | |
| 11,091,003 B2 | 8/2021 | Deckard et al. | |
| 11,660,927 B2 * | 5/2023 | Hollman | B62D 29/00 280/124.135 |
| 2002/0135175 A1 | 9/2002 | Schroth | |
| 2005/0073126 A1 | 4/2005 | Seki | |
| 2005/0073187 A1 | 4/2005 | Frank et al. | |
| 2007/0090621 A1 | 4/2007 | Vigen | |
| 2008/0023249 A1 | 1/2008 | Sunsdahl et al. | |
| 2009/0184531 A1 | 7/2009 | Yamamura et al. | |
| 2010/0090797 A1 | 4/2010 | Koenig et al. | |
| 2010/0276990 A1 | 11/2010 | Zuchoski et al. | |
| 2010/0314191 A1 | 12/2010 | Deckard et al. | |
| 2011/0297462 A1 | 12/2011 | Grajkowski et al. | |
| 2012/0223500 A1 | 9/2012 | Kinsman et al. | |
| 2013/0033070 A1 | 2/2013 | Kinsman et al. | |
| 2013/0049318 A1 | 2/2013 | Kwon et al. | |
| 2013/0199097 A1 | 8/2013 | Spindler et al. | |
| 2014/0090917 A1 | 4/2014 | Despres-Nadeau | |
| 2014/0110893 A1 | 4/2014 | Kinsman et al. | |
| 2014/0125018 A1 | 5/2014 | Brady et al. | |
| 2016/0305313 A1 | 10/2016 | Kumar et al. | |
| 2019/0351728 A1 | 11/2019 | Deckard et al. | |
| 2020/0338948 A1 | 10/2020 | Deckard et al. | |
| 2021/0215093 A1 | 7/2021 | Buchwitz et al. | |
| 2021/0268863 A1 | 9/2021 | Deckard et al. | |
| 2023/0150334 A1 | 5/2023 | Deckard et al. | |

FOREIGN PATENT DOCUMENTS

| | | |
|---|---|---|
| CN | 101171149 A | 4/2008 |
| CN | 101177110 A | 5/2008 |
| CN | 201597405 U | 10/2010 |
| CN | 101878146 A | 11/2010 |
| CN | 201729195 U | 2/2011 |
| CN | 202986930 U | 6/2013 |
| EP | 1510452 A2 | 3/2005 |
| FR | 2944497 A3 | 10/2010 |
| JP | 2010-083275 A | 4/2010 |
| WO | 2008/016377 A2 | 2/2008 |
| WO | 2014/059258 A1 | 4/2014 |
| WO | 2014/074711 A1 | 5/2014 |

OTHER PUBLICATIONS

Examination Report No. 1 issued by the Australian Government IP Australia, dated Apr. 27, 2017, for Australian Patent Application No. 2014315278, 3 pages.
Examination Report No. 1 issued by the Australian Government IP Australia, dated Nov. 29, 2018, for Australian Patent Application No. 2018204263; 4 pages.
International Preliminary Report on Patentability issued by the European Patent Office, dated Apr. 14, 2015 for International Patent Application No. PCT/US2013/064516; 18 pages.
International Preliminary Report on Patentability received for PCT Patent Application No. PCT/US2014/054041, mailed on Nov. 26, 2015, 30 pages.
International Search Report and Written Opinion issued by the European Patent Office, dated Jan. 14, 2014, for International Application No. PCT/US2013/064516; 24 pages.
International Search Report and Written Opinion received for PCT Patent Application No. PCT/US2014/054041, mailed on Mar. 3, 2015, 16 pages.
Office Action dated Apr. 7, 2016 issued by the Australian Patent Office in Australian Patent Application No. 2013329090; 3 pages.
Office Action received for European Patent Application No. 14771458. 8, mailed on May 3, 2017, 6 pages.

* cited by examiner

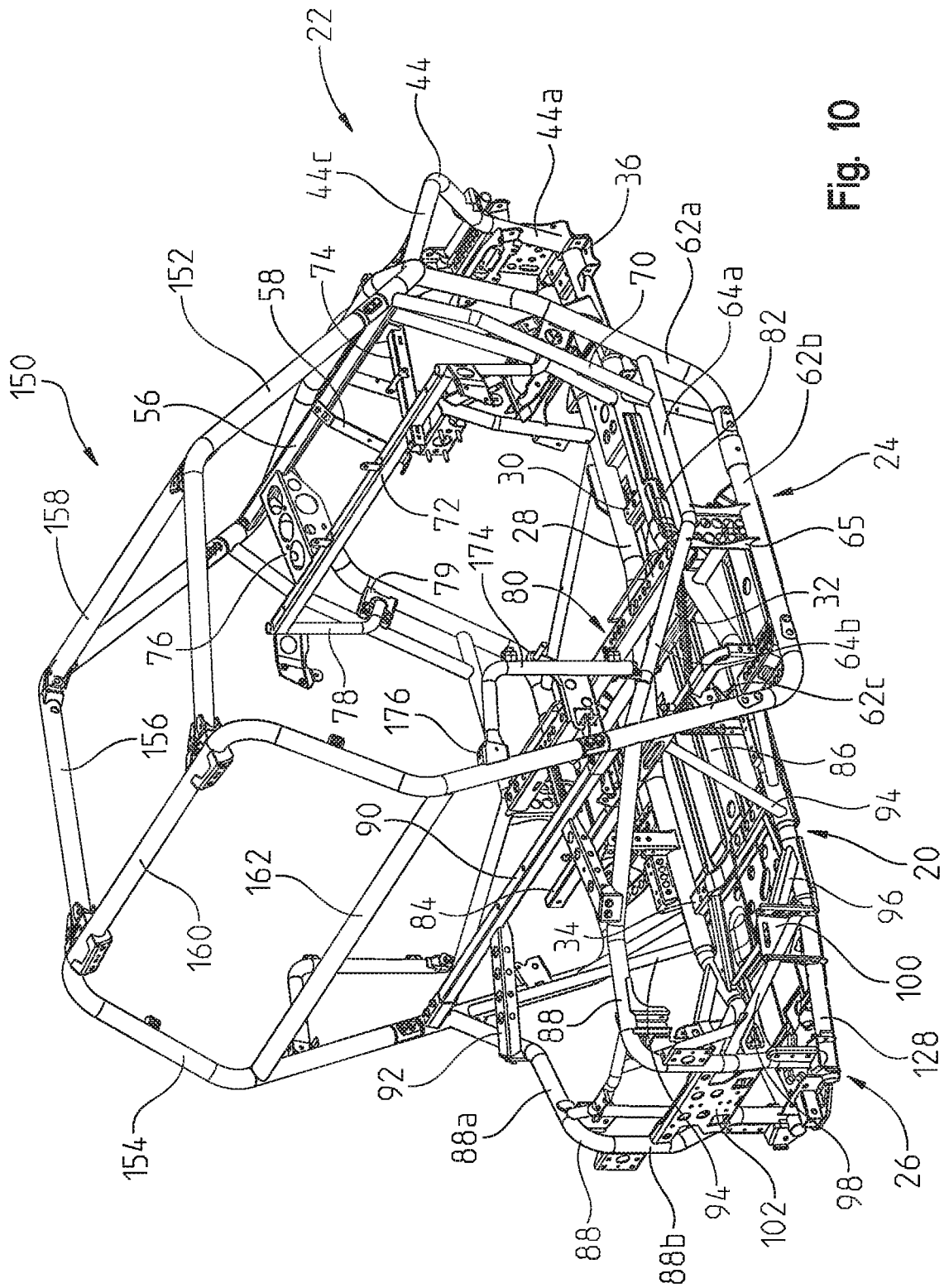

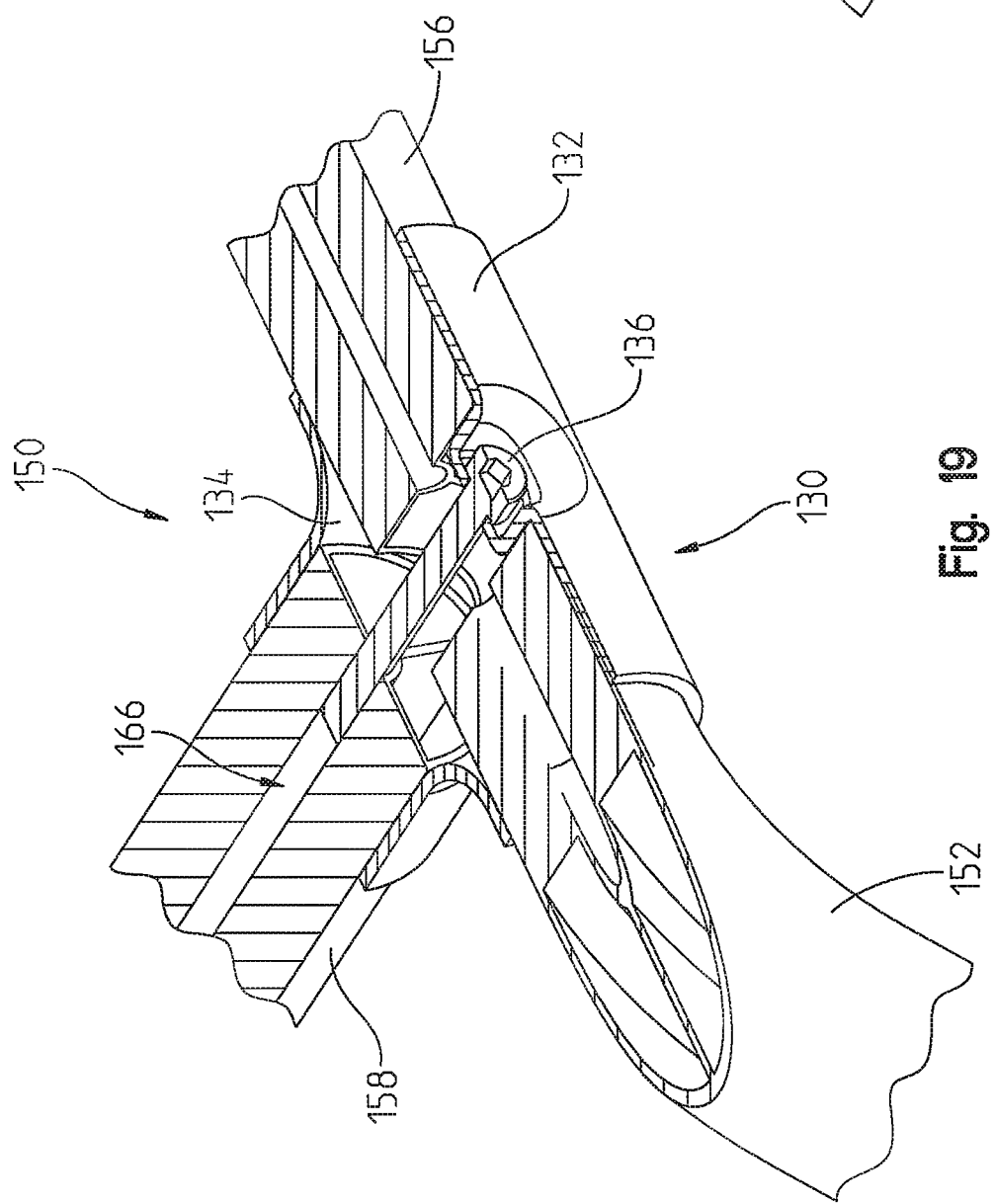
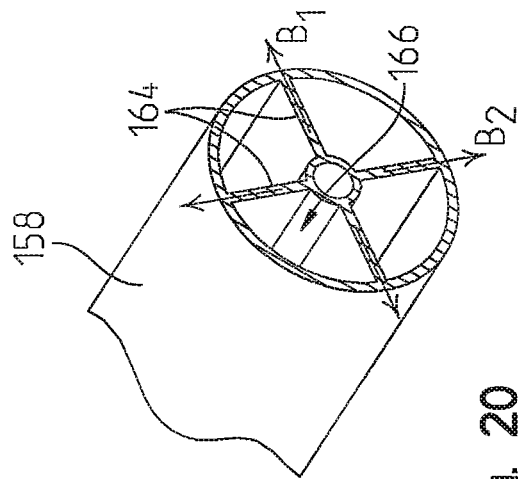
Fig. 19
Fig. 20

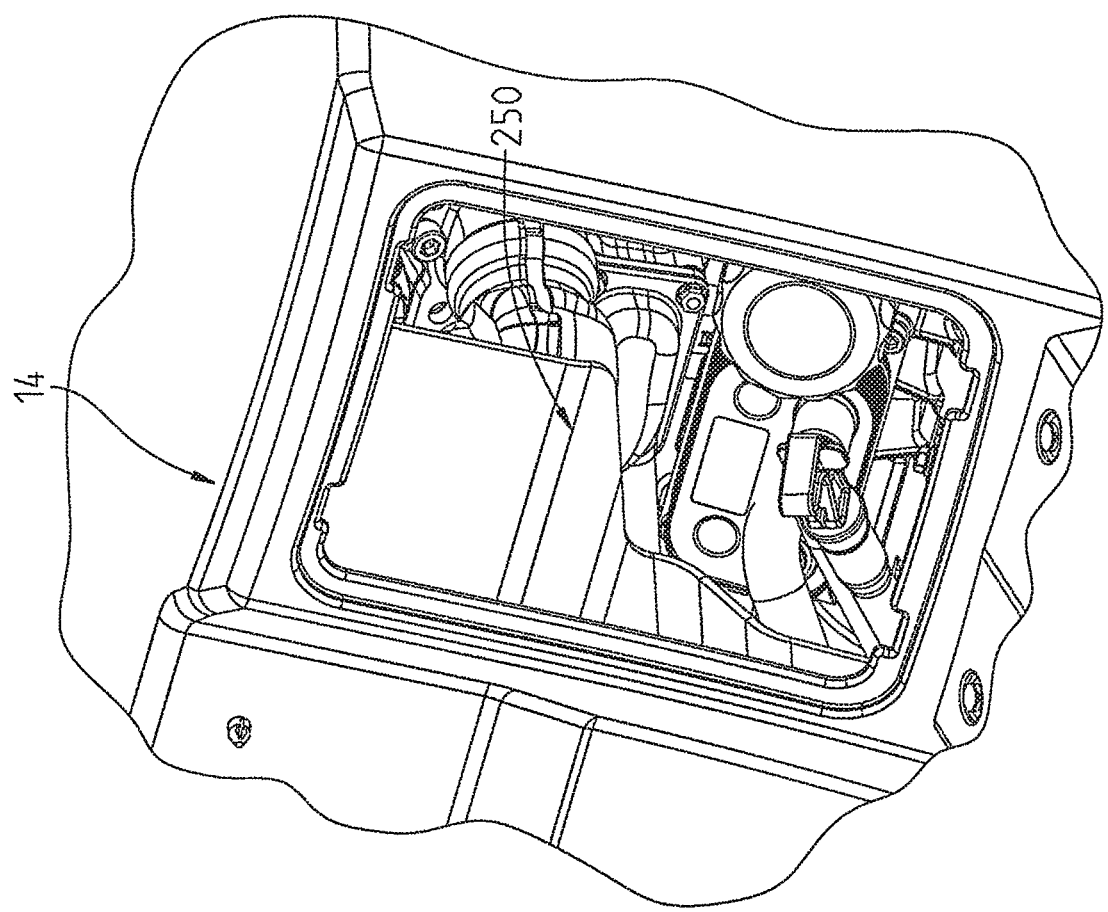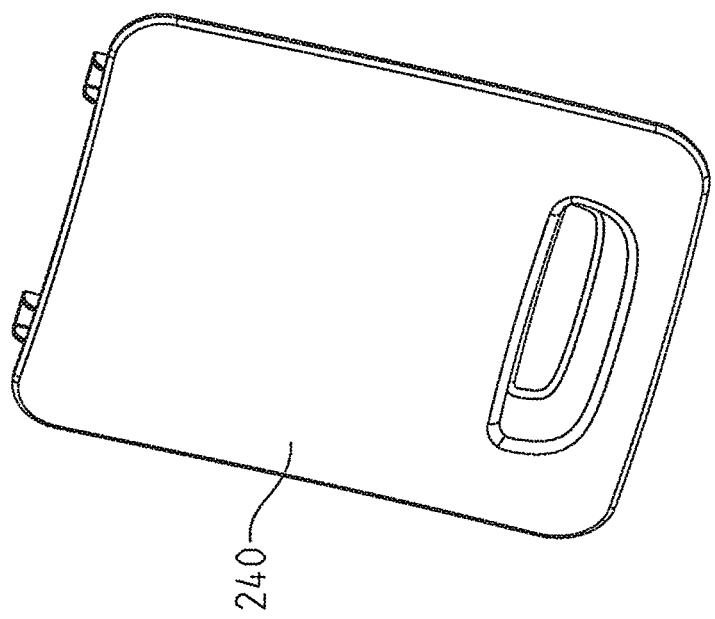
Fig. 25

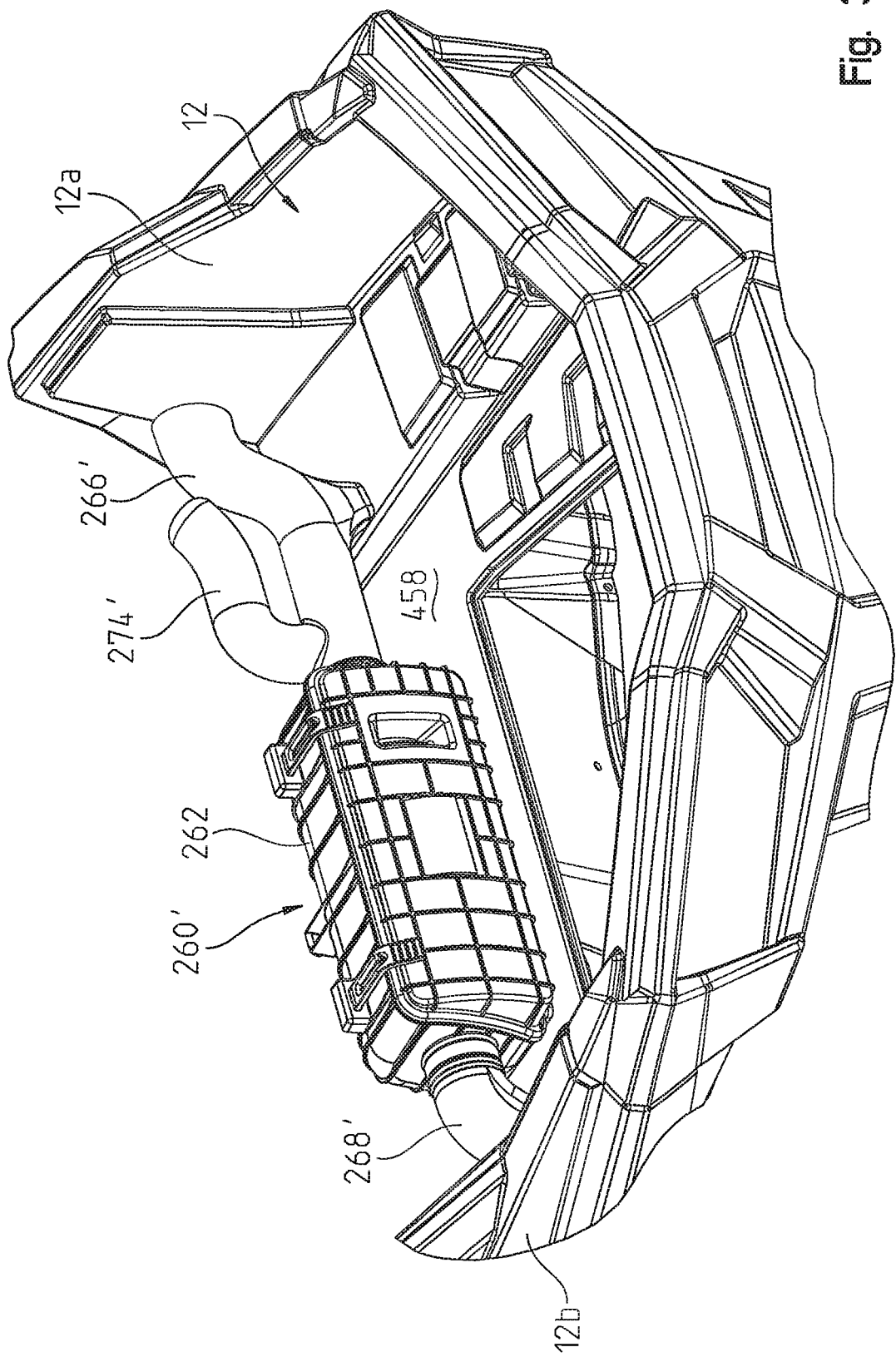

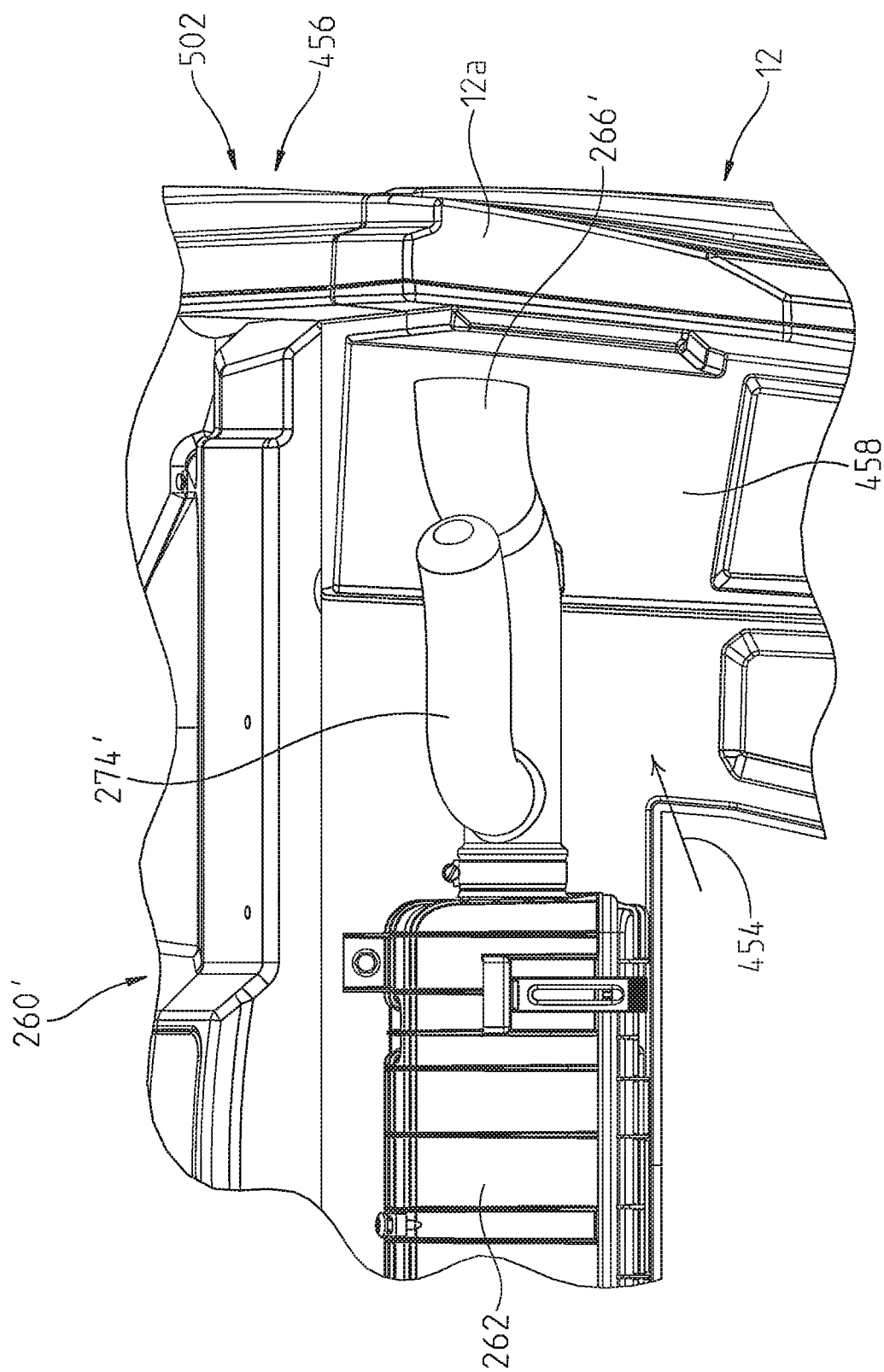

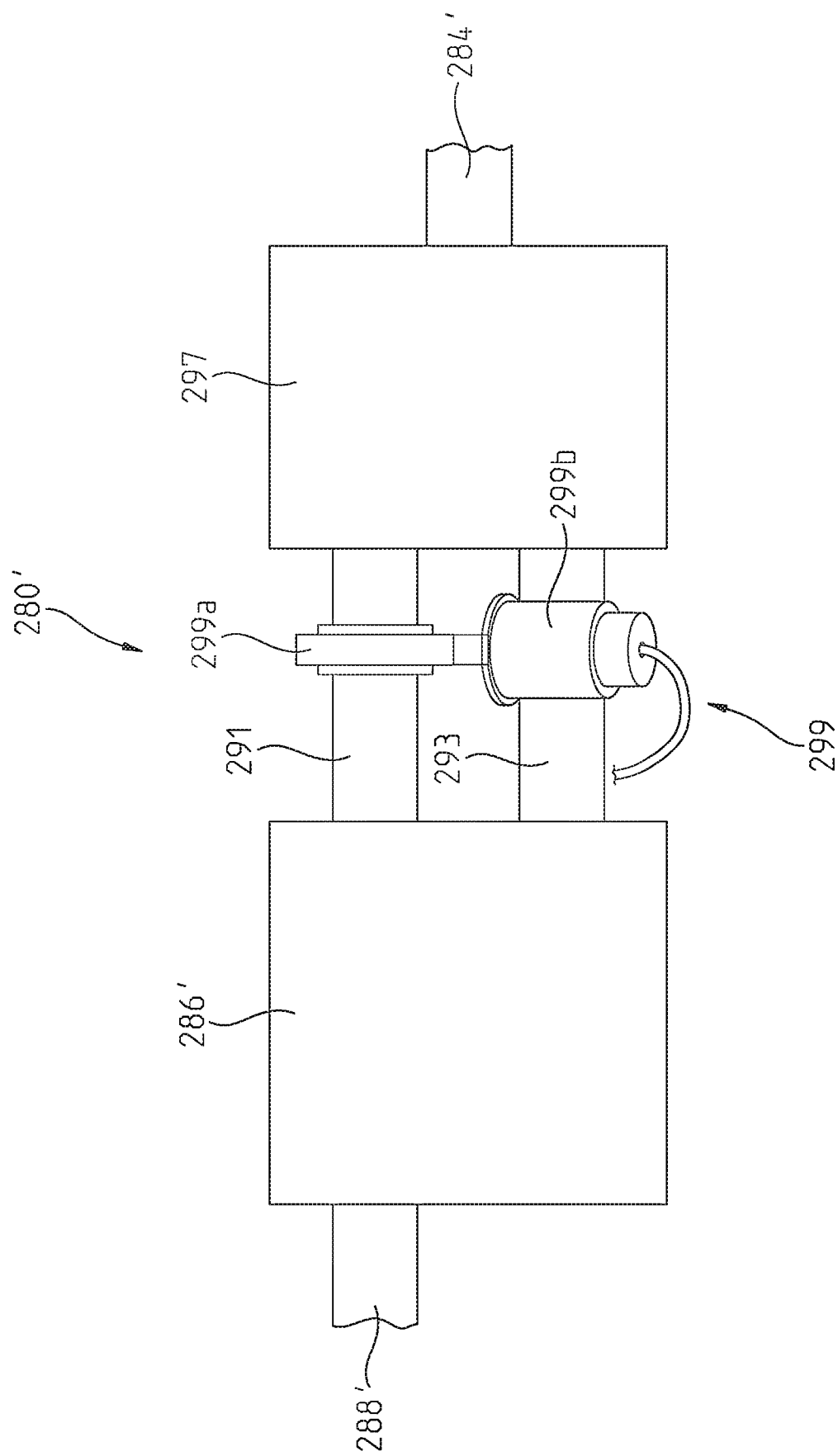

SIDE-BY-SIDE VEHICLE

CROSS-REFERENCE TO RELATED APPLICATIONS

The present application is a continuation of U.S. patent application Ser. No. 18/098,318, filed Jan. 18, 2023, which is a continuation of U.S. patent application Ser. No. 17/323,597, filed on May 18, 2021, which is a continuation of U.S. patent application Ser. No. 16/924,695, filed on Jul. 9, 2020, which is a continuation of U.S. patent application Ser. No. 16/531,960, filed on Aug. 5, 2019, which is a continuation of U.S. patent application Ser. No. 14/477,589, filed on Sep. 4, 2014, which claims priority to U.S. Provisional Patent Application Ser. No. 61/873,726, filed on Sep. 4, 2013, the complete disclosures of which are expressly incorporated by reference herein.

BACKGROUND OF THE DISCLOSURE

The present disclosure generally relates to all-terrain and utility vehicles and, more particularly, to side-by-side utility vehicles configured to carry at least an operator, a passenger, and cargo.

Generally, all-terrain vehicles ("ATVs") and utility vehicles ("UVs") are configured to carry one or two passengers and cargo over a variety of terrains. Side-by-side vehicles, in which the driver and passenger are seated beside each other on laterally spaced apart seats, have become popular because of the ability to allow the passenger to share the driver's viewpoint and riding experience instead of being positioned behind the driver.

ATVs and UVs are configured for various types of terrain and performances, and as such, it may be desirable for the vehicle to have a low center of gravity. A lower center of gravity may provide the ATVs and UVs with more stability on rugged terrain.

SUMMARY OF THE DISCLOSURE

In one embodiment of the present disclosure a utility vehicle comprises a plurality of front ground engaging members, a plurality of rear ground engaging members positioned rearward of the front ground engaging members, and a frame assembly supported by the front and rear ground engaging members. The utility vehicle further comprises a powertrain assembly operably coupled to the front and rear ground engaging members and a front suspension assembly operably coupled to the front ground engaging members. The front suspension assembly includes upper alignment arms, lower alignment arms, shock absorbers, and a torsion bar. The utility vehicle also comprises a steering assembly operably coupled to the front ground engaging members. The steering assembly includes a steering wheel, a steering rack, and steering arms. The torsion bar is positioned intermediate the upper alignment arms and the lower alignment arms.

A further embodiment of the present disclosure includes a utility vehicle comprising a plurality of front ground engaging members, a plurality of rear ground engaging members, and a frame supported by the front and rear ground engaging members. The frame includes a front frame portion and a rear frame portion. The front frame portion includes upstanding members defining a front plane of the utility vehicle. The utility vehicle further comprises a powertrain assembly operably coupled to the front and rear ground engaging members, a front suspension assembly operably coupled to the front ground engaging members, and a rear suspension assembly operably coupled to the rear ground engaging members. The front ground engaging members extend forward beyond the front plane of the utility vehicle.

Another illustrative embodiment of the present disclosure includes a utility vehicle comprising a plurality of ground engaging members and a frame assembly supported by the ground engaging members. The frame assembly is comprised of a first material. The utility vehicle further comprises a powertrain assembly operably coupled to the ground engaging members and supported on the frame assembly, and a cab frame assembly coupled to the frame assembly. The cab frame assembly is comprised of a second material. A weight of the first material is greater than that of the second material.

In one embodiment of the present disclosure, a cab frame assembly comprises a front upstanding member, a rear upstanding member positioned rearward of the front upstanding member, and a longitudinal member coupled to front and rear upstanding members. At least one of the front upstanding member, the rear upstanding member, and the longitudinal member includes a plurality of internal ribs and an internal channel.

Another illustrative embodiment of the present disclosure includes a utility vehicle comprising a plurality of ground engaging members, a frame assembly supported by the ground engaging members, and a powertrain assembly supported by the frame assembly. The powertrain assembly includes an engine, a transmission operably coupled to the engine, an air intake assembly fluidly coupled to the engine, and an exhaust assembly fluidly coupled to the engine. The exhaust assembly is configured to selectively regulate a flow of exhaust from the engine in response to at least one of a drive mode, an operator input, and a throttle position.

In a further illustrative embodiment of the present disclosure, a cab frame assembly comprises a front upstanding member, a rear upstanding member positioned rearward of the front upstanding member, and a longitudinal member coupled to the front and rear upstanding members. At least one of the front upstanding member, the rear upstanding member, and the longitudinal member is extruded.

In another illustrative embodiment of the present disclosure, a utility vehicle, comprises a plurality of ground-engaging members and a frame assembly supported by the plurality of ground-engaging members. The frame assembly includes a front end and a rear end. The utility vehicle further comprises a cab frame assembly coupled to the frame assembly and extending above the frame assembly to define an operator area. At least one seat is positioned within the operator area and includes a seat bottom and a seat back. The utility vehicle further comprises a front suspension assembly coupled to the front end of the frame assembly. The front suspension includes a shock absorber, an alignment arm, and a torsion bar. The utility vehicle also comprises a rear suspension assembly coupled to the rear end of the frame assembly. The rear suspension assembly includes a shock absorber, an alignment arm, and a torsion bar. A center of gravity of the utility vehicle is configured to be lowered by at least one of including a recess on the seat back, extruding the cab frame assembly, positioning the torsion bar of the front suspension assembly approximately 5 inches from a bottom of the frame assembly, and positioning the torsion bar of the rear suspension assembly approximately 6 inches from a bottom of the frame assembly.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 10 is a right rear perspective view of the frame of FIG. 9A;

FIG. 19 is a cross-sectional view of the cab frame assembly of FIG. 17, taken along line 19-19 of FIG. 17;

FIG. 20 is a further cross-sectional view of the cab frame assembly, taken along line 20-20 of FIG. 17;

FIG. 25 is an exploded view of an access panel of the vehicle of FIG. 1 configured to enclose a portion of an engine compartment;

FIG. 32B is a left rear perspective view of the air intake assembly of FIG. 32A positioned within a portion of a cargo box of the vehicle of FIG. 1;

FIG. 32D is a top view of the portion of the air intake assembly of FIG. 32C;

FIG. 34 is a rear view of an alternative embodiment of the exhaust assembly of FIG. 33;

DETAILED DESCRIPTION OF THE DRAWINGS

Figure 1:
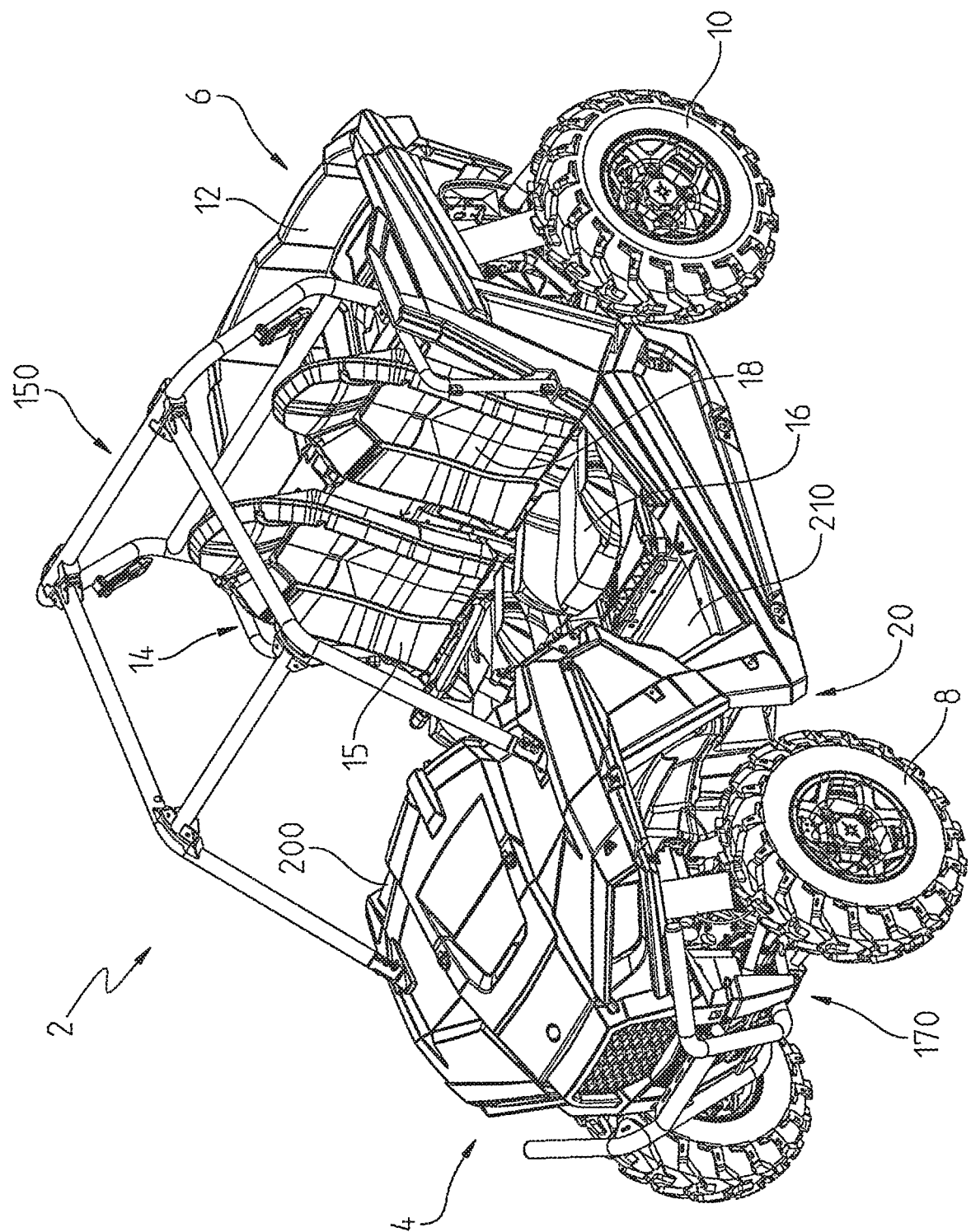
FIG. 1 is a left front perspective view of the vehicle of the present disclosure.

Corresponding reference characters indicate corresponding parts throughout the several views. Unless stated otherwise the drawings are proportional.

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, people movers, and golf carts.

With reference to FIGS. 1-8, a utility vehicle 2 is shown. Vehicle 2 may include light-weight components and/or may position heavier components lower on vehicle 2 in order to lower the center of gravity of vehicle 2.

Vehicle 2 includes a front end 4 and a rear end 6. A plurality of ground engaging members, including front wheels 8 and rear wheels 10, support utility vehicle 2 on a ground surface. In one embodiment, front and rear wheels 8 and 10 may include tires having an outer diameter of approximately 26-32 inches. When including 26-inch tires on front and rear wheels 8, 10, the center of gravity of vehicle 2 may be lowered. Illustratively, the width between the centers of the hubs of rear wheels 10 defines a width of vehicle 2, which may be approximately 45-55 inches. Illustratively, the width of vehicle 2 at ride height and without any payload (e.g., cargo, driver, and/or passenger) may be approximately 50 inches.

Figure 38:
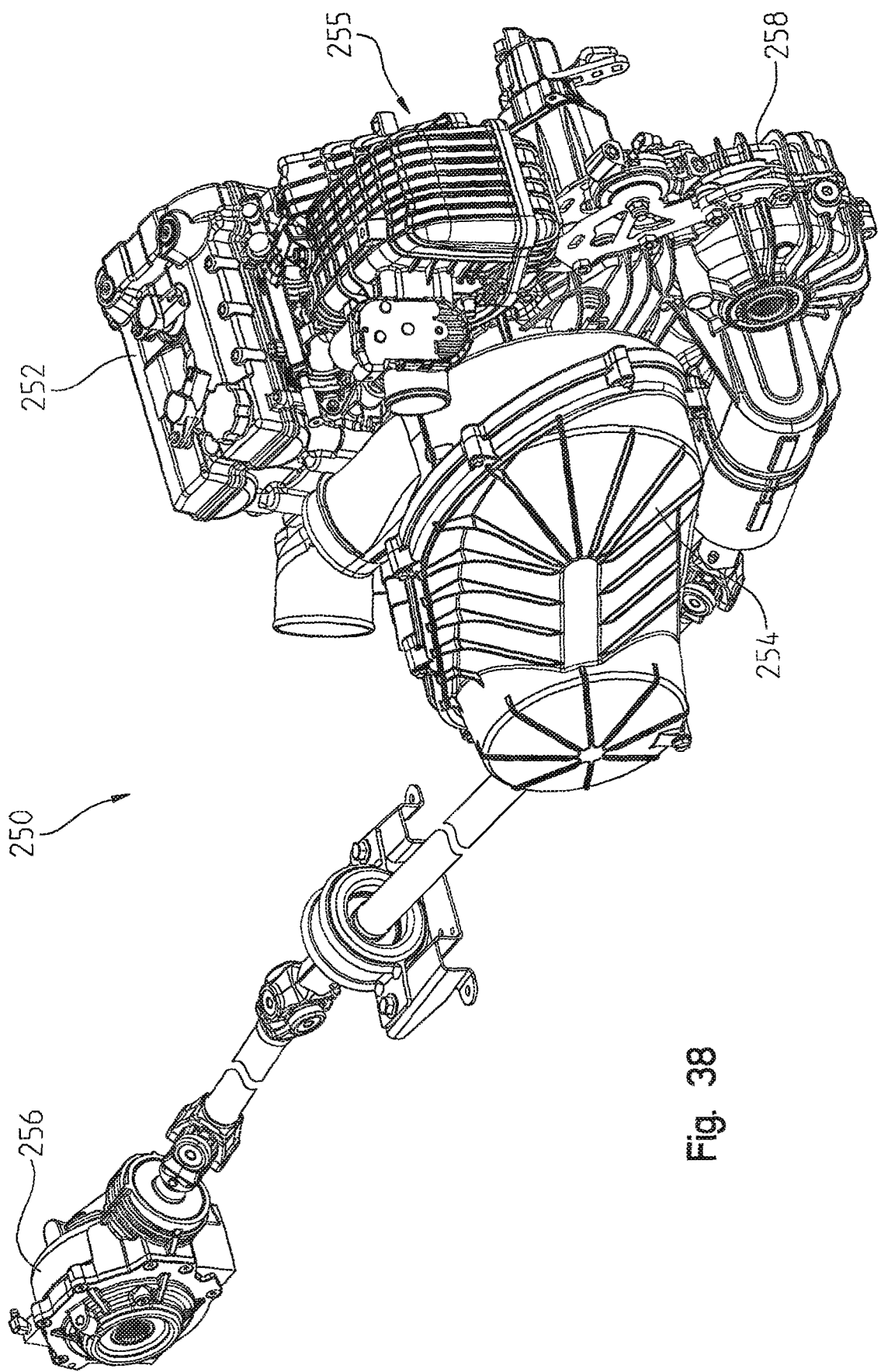
FIG. 38 is a left rear perspective view of a powertrain assembly of the vehicle of FIG. 1.

Rear end 6 of utility vehicle 2 supports portions of a powertrain assembly 250, which, as shown in FIG. 38, includes at least an engine 252, a variable clutch assembly 254, illustratively a continuously variable transmission ("CVT"), a transmission 255, front final drive unit 256, rear final drive unit 258, an exhaust assembly 280, and an air intake assembly 260. Portions of powertrain assembly 250, such as engine 252, transmission 255, and variable clutch assembly 254, may be positioned on vehicle 2 such that the weight distribution of vehicle 2 may be approximately 40/60 or approximately 35/65, as measured from front end 4 to rear end 6 along longitudinal axis L. Additionally, powertrain assembly 250 may be configured to lower the center of gravity of vehicle 2. For example, the position of engine 252 may be lowered in order to lower the center of gravity of vehicle 2. In one embodiment, engine 252 may be lowered by approximately 5-10 mm, and more particularly, by approximately 7 mm, in order to lower the center of gravity of vehicle 2. Also, the position of variable clutch assembly 254 and/or transmission 255 may be lowered by approximately 5-10 mm, and more particularly, by approximately 7 mm in order to lower the center of gravity of vehicle 2.

In one embodiment, engine 252 is configured for at least approximately 60-75 hp. Additionally, front final drive unit 256 may be configured as a close-ratio drive unit. By configuring front final drive unit 256 as a close-ratio drive unit, less slip is needed to engage front wheels 8 when vehicle 2 operates in an all-wheel drive and/or four-wheel drive mode. Furthermore, by configuring front final drive unit 256 as a close-ration drive unit, vehicle 2 may include active descent control.

Figure 5:
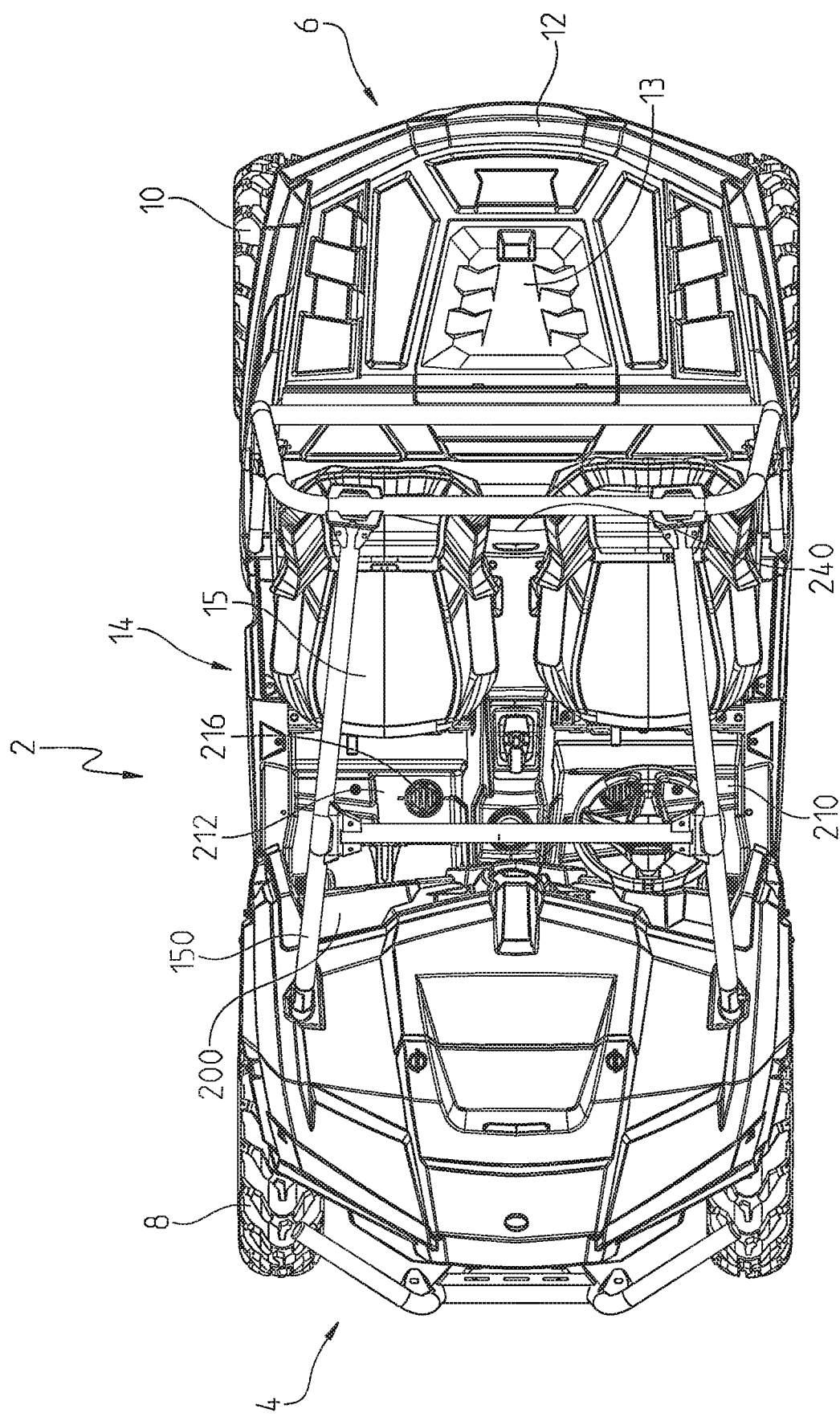
FIG. 5 is a top view of the vehicle of FIG. 1.
Figure 6:
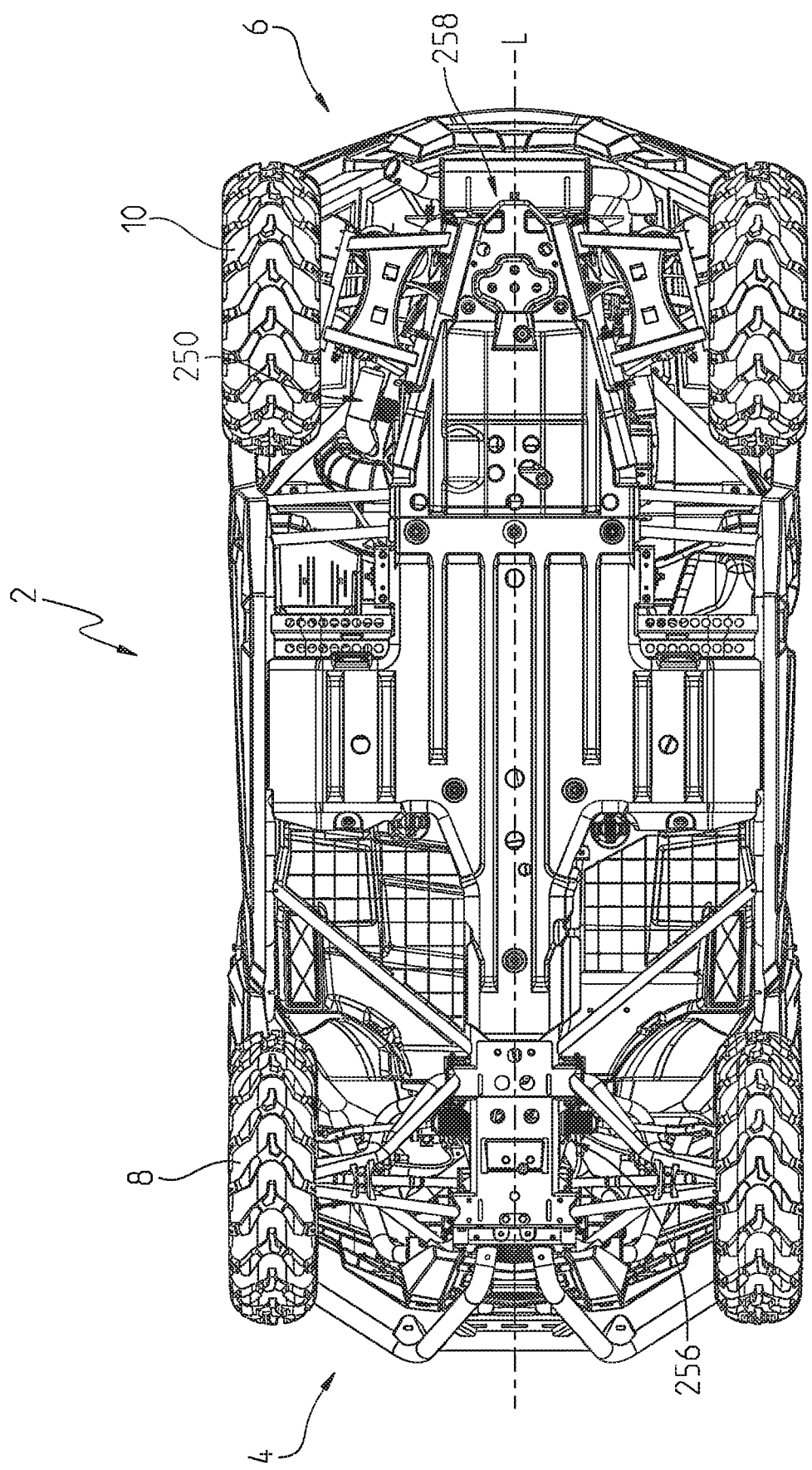
FIG. 6 is a bottom view of the vehicle of FIG. 1.
Figure 7:
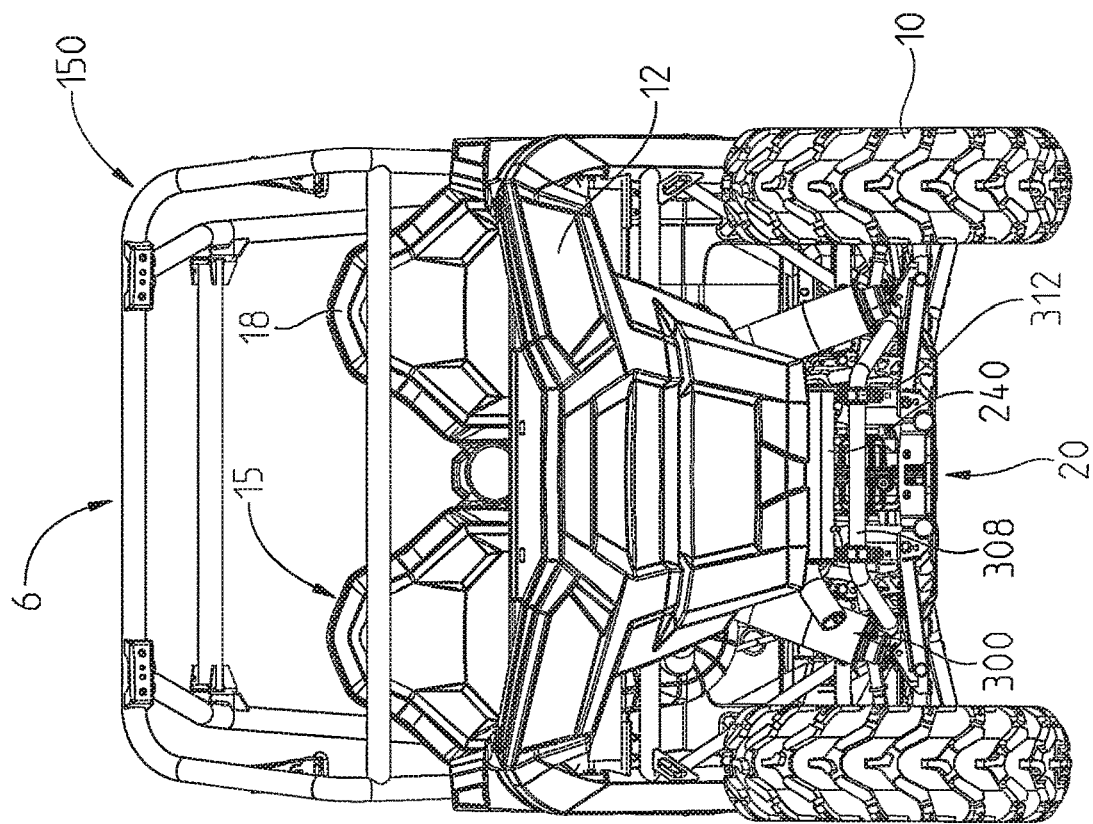
FIG. 7 is a front view of the vehicle of FIG. 1.

A frame assembly 20 extends between front end 4 and rear end 6 of utility vehicle 2 and is supported on front wheels 8 and rear wheels 10. Frame assembly 20 supports a cargo box 12 at rear end 6 and an operator area 14 between front end 4 and rear end 6. As shown in FIG. 5, in one embodiment, cargo box 12 includes a first side wall 12a, a second side wall 12b, and a removable panel 13, which provides access to an engine compartment for powertrain assembly 250 and other components of vehicle 2 positioned below cargo box 12. As shown in FIGS. 1-4, side wall 12a supports an engine intake port 502 and side wall 12b supports a clutch intake port 500 for an air intake assembly 260 or 260', as detailed further herein. In one embodiment, intake ports 500 and 502 include filters therein.

Cargo box 12 may be comprised of a polymeric material. In one embodiment, cargo box 12 is comprised of a lightweight polymeric material, which decreases the weight of vehicle 2. As such, the center of gravity of vehicle 2 may be lowered when cargo box 12 is comprised of a light-weight material.

Operator area 14 includes seating for at least an operator and a passenger in a side-by-side arrangement. Illustratively, operator area 14 includes a plurality of bucket-type seats 15, each having a seat bottom 16 and a seat back 18. Seat bottom 16 and seat back 18 may be coupled to each other or may be separate therefrom. Alternative embodiments of seats 15 may include a bench-type seat, in which one seat bottom 16 and one seat back 18 support both the operator and the passenger. In one embodiment, the height of seat back 18 may be vertically adjustable to accommodate different heights of operators and passengers. Additionally, in one embodiment of seats 15, seat bottom 16 may be configured to slide or otherwise move in a longitudinal direction to further increase the comfort of the operator and passenger. Further details about seats 15 of vehicle 2 may be disclosed in U.S. Provisional Patent Application Ser. No. 61/829,743, filed on May 31, 2013, the complete disclosure of which is expressly incorporated by reference herein.

Figure 2:
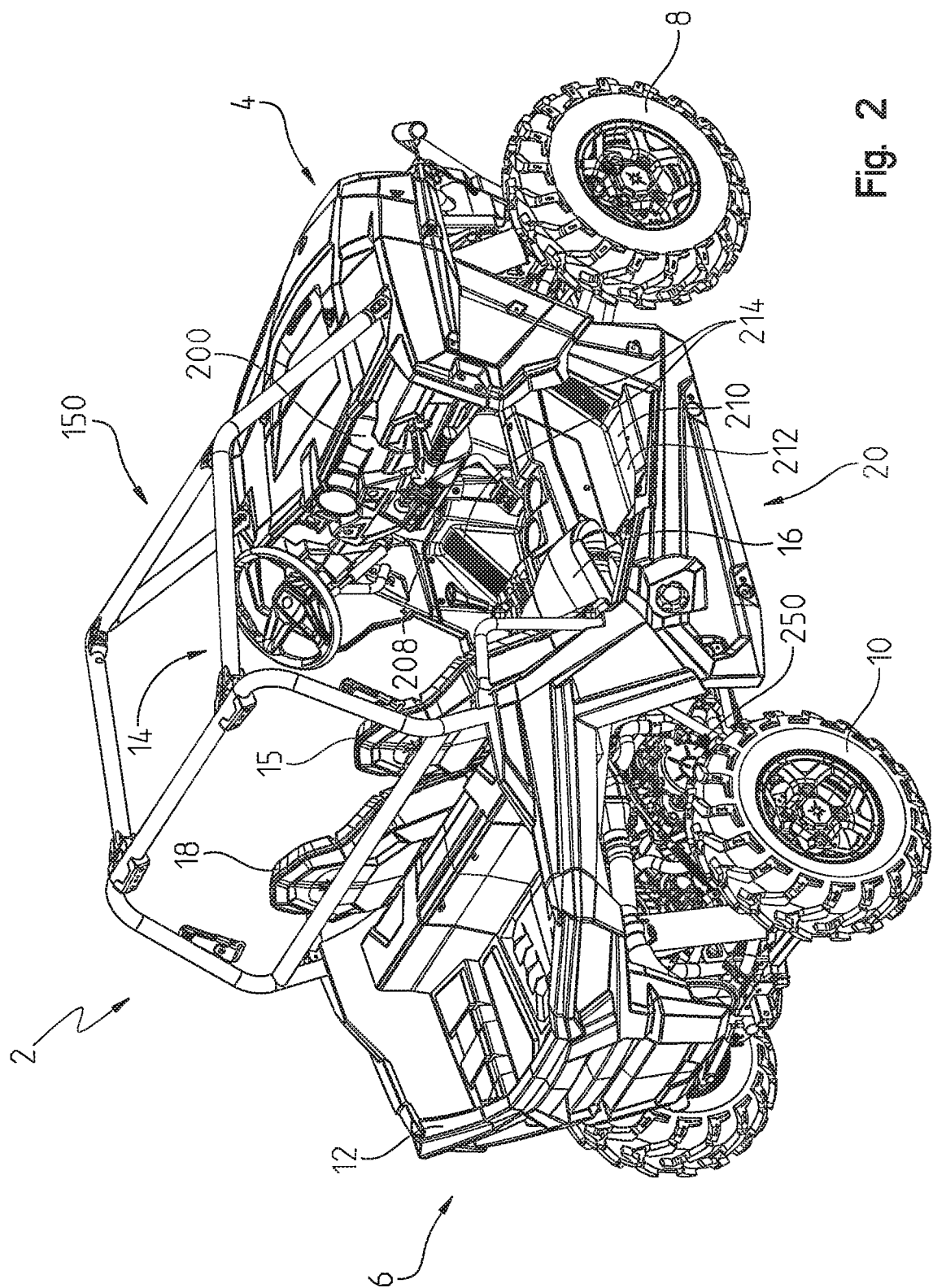
FIG. 2 is a right rear perspective view of the vehicle of FIG. 1.
Figure 3:
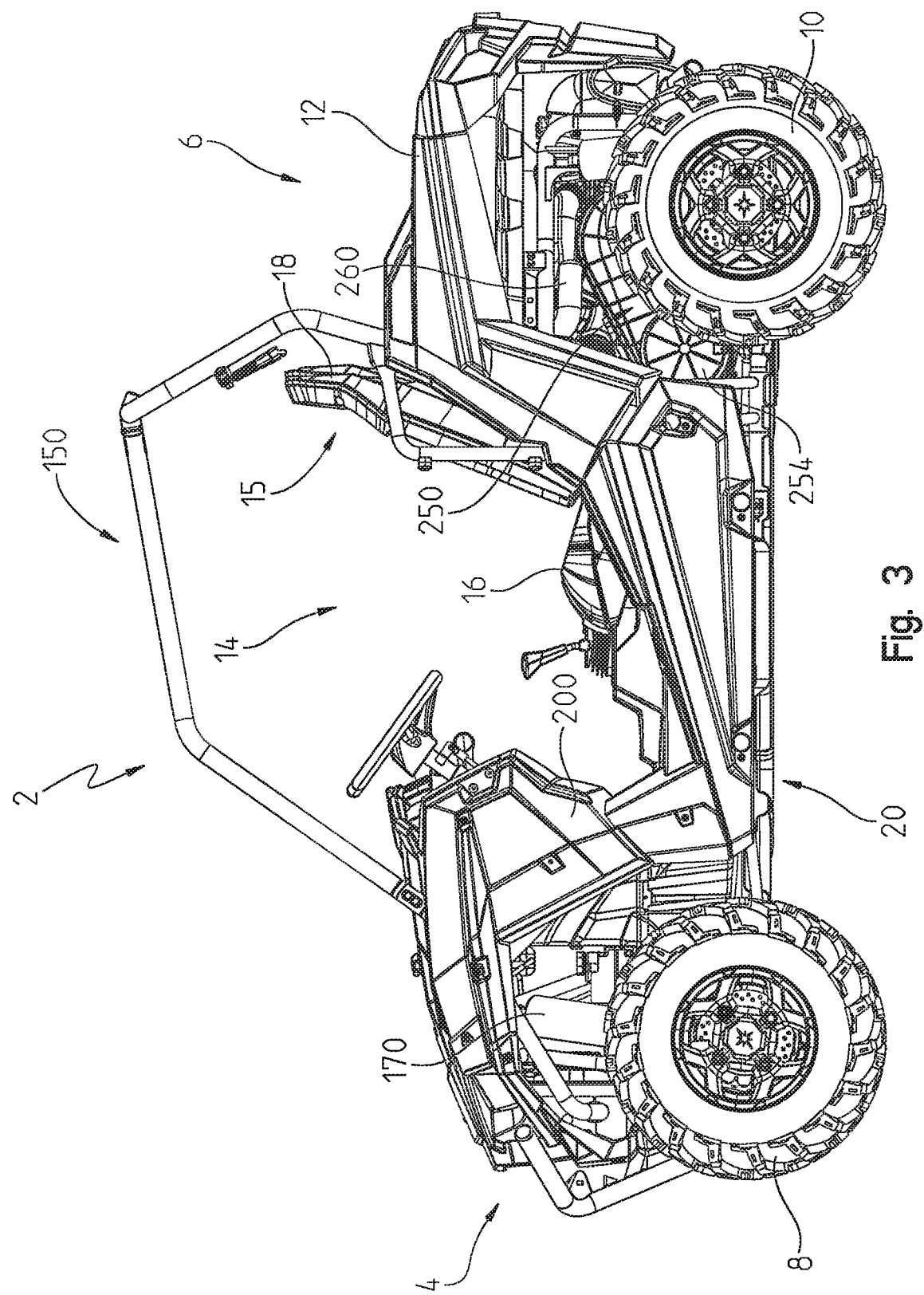
FIG. 3 is a left side view of the vehicle of FIG. 1.
Figure 4:
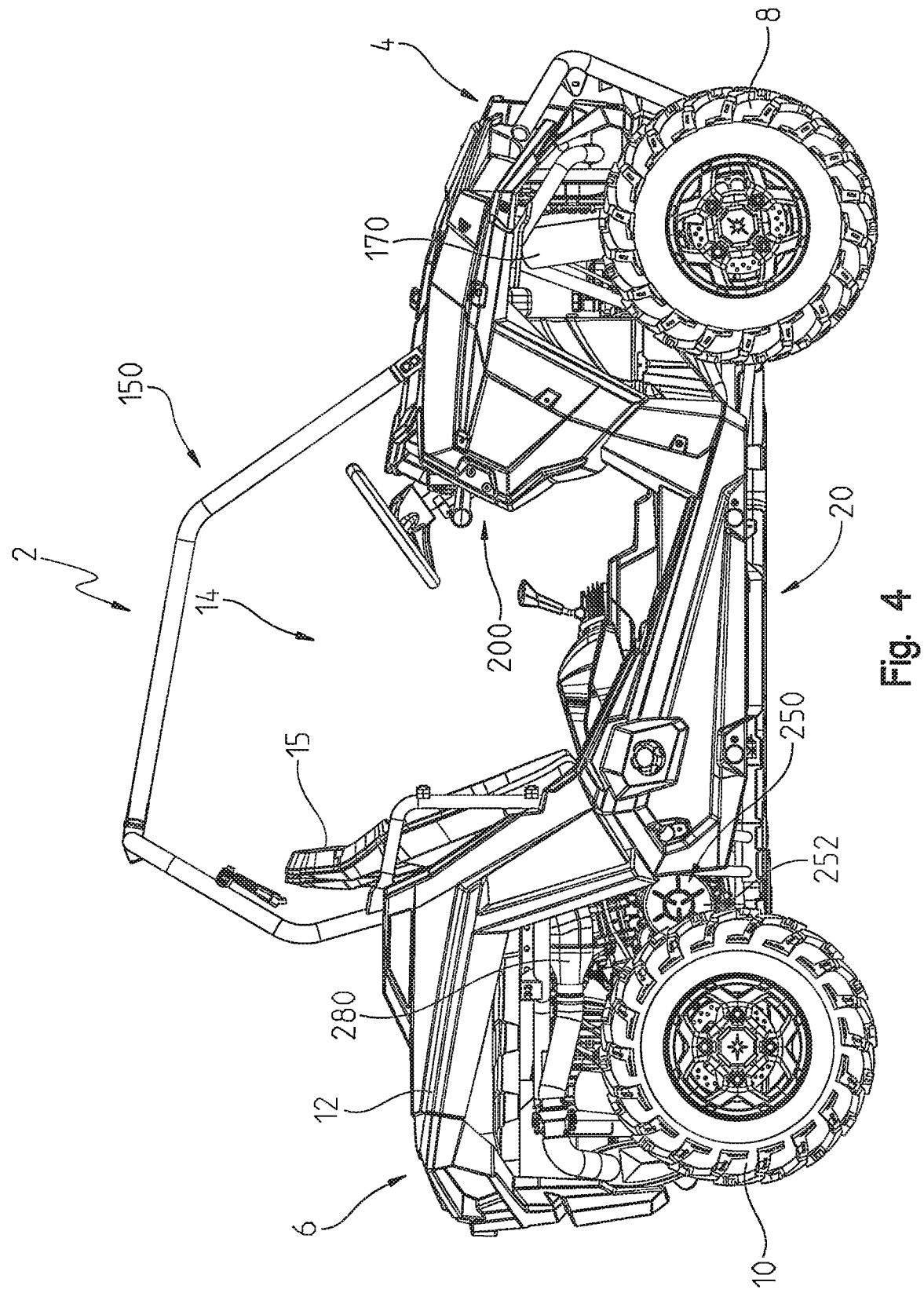
FIG. 4 is right side view of the vehicle of FIG. 1.

As shown in FIG. 2, vehicle 2 includes a dashboard assembly 200 and a floorboard assembly 210. Floorboard assembly 210 extends forward of seats 15 and is coupled to dashboard assembly 200. Floorboard assembly 210 includes a plurality of horizontal boards 212 and a plurality of dead pedals 214. Illustratively, one horizontal board 212 supports the operator's feet and another horizontal board 212 supports the passenger's feet. Additionally, as shown in FIG. 5, horizontal boards 212 may include at least one drain 216. Horizontal boards 212 may include a cap configured to fit within an opening in horizontal boards 212. The cap is removably coupled to horizontal boards 212 and may be opened or removed in order to allow fluids, dirt, and debris to flow out of operator area 14 when cleaning operator area 14.

Referring back to FIG. 2, dead pedals 214 are angled upwardly from horizontal boards 212 in order to also support the operator's feet and the passenger's feet. Illustrative dead pedals 214 may be integral with horizontal boards 212, or alternatively, may be separate therefrom and coupled thereto with conventional fasteners. Further details about floorboard assembly 210 of vehicle 2 may be disclosed in U.S. Provisional Patent Application Ser. No. 61/829,743, filed on May 31, 2013, the complete disclosure of which is expressly incorporated by reference herein.

Referring to FIGS. 9A-11, frame assembly 20 extends along a longitudinal axis L of utility vehicle 2 (FIG. 6) and includes a front frame portion 22, a mid-frame portion 24, and a rear frame portion 26. Frame assembly 20 includes forward longitudinally-extending members 28 extending between front frame portion 22 and rear frame portion 26. A plurality of cross-members 30, 32, and 34 extend transversely to longitudinal axis L and are coupled to both forward longitudinally-extending members 28. Additionally, a skid plate 86 may be coupled to forward longitudinally-extending members 28 and/or cross-members 30, 32, and 34. Skid plate 86 also extends between front frame portion 22 and rear frame portion 26 and is positioned below forward longitudinally-extending members 28 and cross-members 30, 32, and 34.

At front frame portion 22, forward longitudinally-extending members 28 are coupled to alignment arm brackets 36 for a front suspension assembly 170, as detailed further herein. Illustratively, front frame portion 22 includes at least four alignment arm brackets 36. Additionally, forward longitudinally-extending members 28 are coupled to a lower plate member 38, which is spaced apart from and positioned below an upper plate member 39. Upper plate member 39 includes brackets 40, which may be integrally formed with upper plate member 39 or, alternatively, welded or otherwise coupled thereto.

Figure 11:
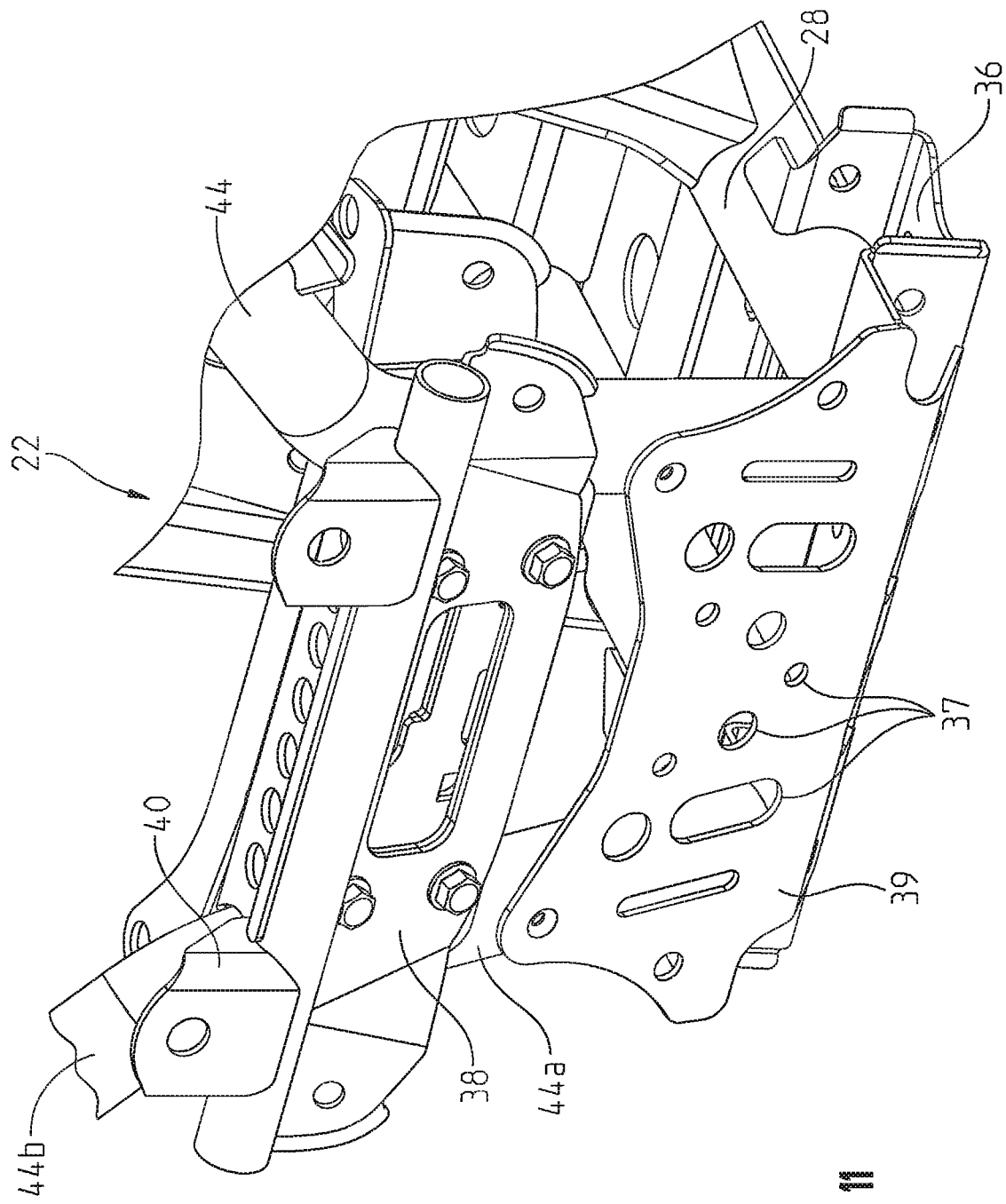
FIG. 11 is a left front perspective view of a front frame portion of the frame of FIG. 9A.
Figure 12:
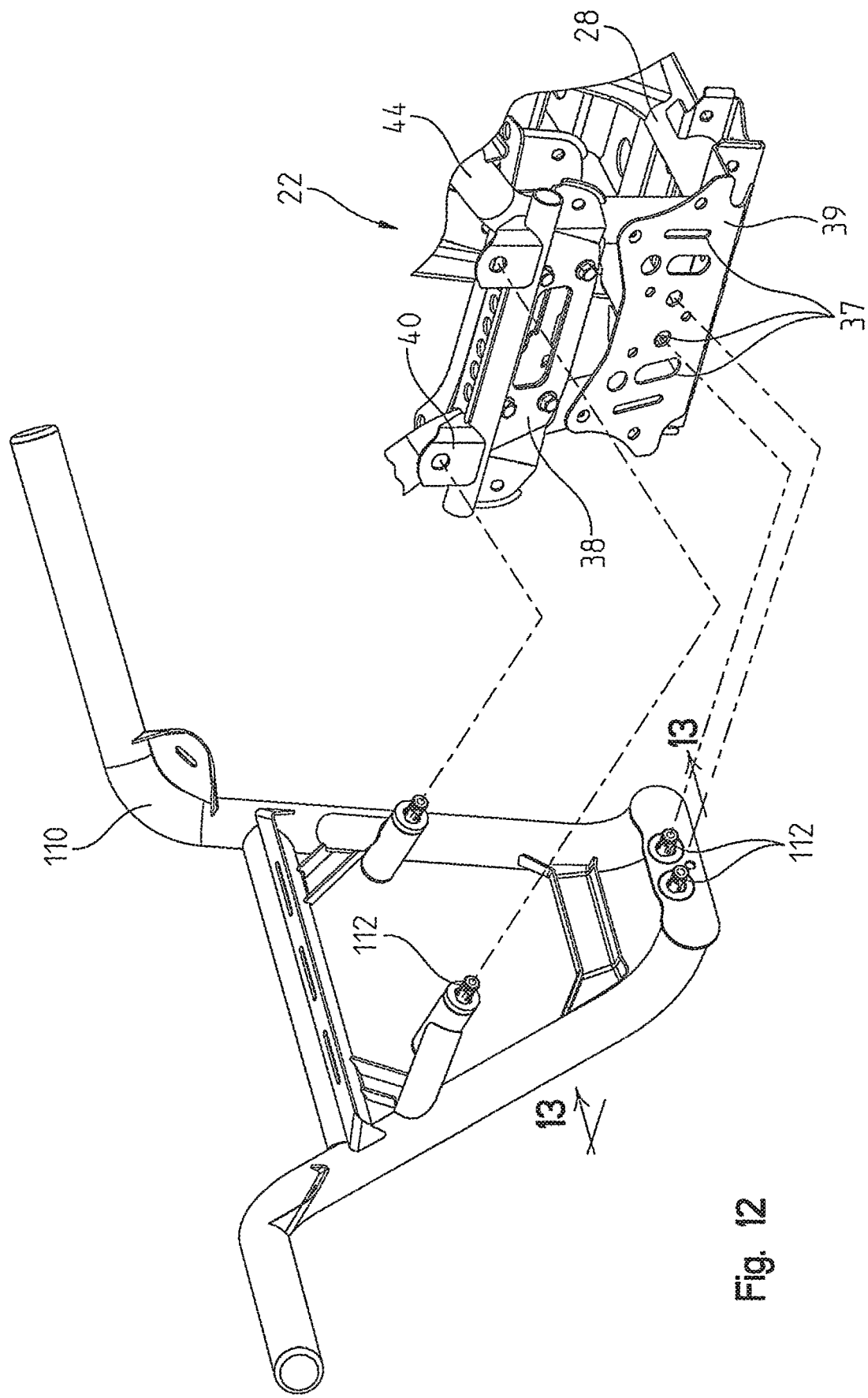
FIG. 12 is an exploded view of a bumper and the front frame portion of FIG. 11.

As shown in FIG. 11, upper plate member 38 includes an opening, which may be configured to cooperate with a winch assembly (not shown). Lower plate member 39 includes a plurality of accessory mounts, illustratively openings 37, which may be configured to couple with accessories and/or cargo. Additionally, some of openings 37 are configured as tie-downs for receiving a hook or other coupling device for coupling cargo to vehicle 2. As such, frame assembly 20 integrally includes mounts for accessories and cargo. Referring to FIG. 12, lower and upper plate members 38, 39 may support an accessory 110, such as a bumper, brush guard, or other similar member configured to protect front end 4 of vehicle 2 from damage. For example, accessory 110 may be coupled to lower plate member 38 and brackets 40 of upper plate member 39 with coupling assemblies 112.

Figure 13:
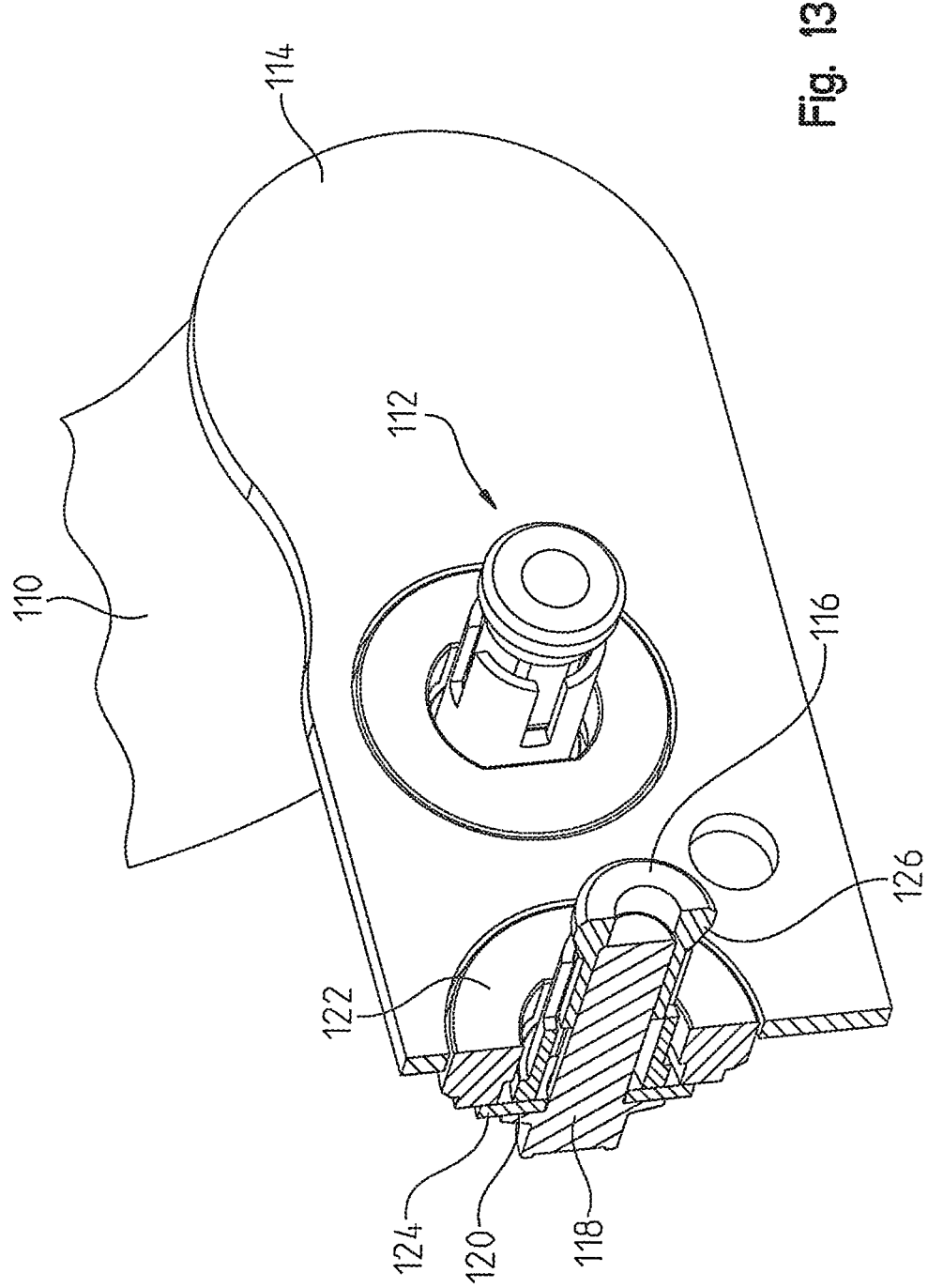
FIG. 13 is a cross-sectional view of a coupler assembly of the bumper of FIG. 12, taken along line 13-13 of FIG. 12.
Figure 14:
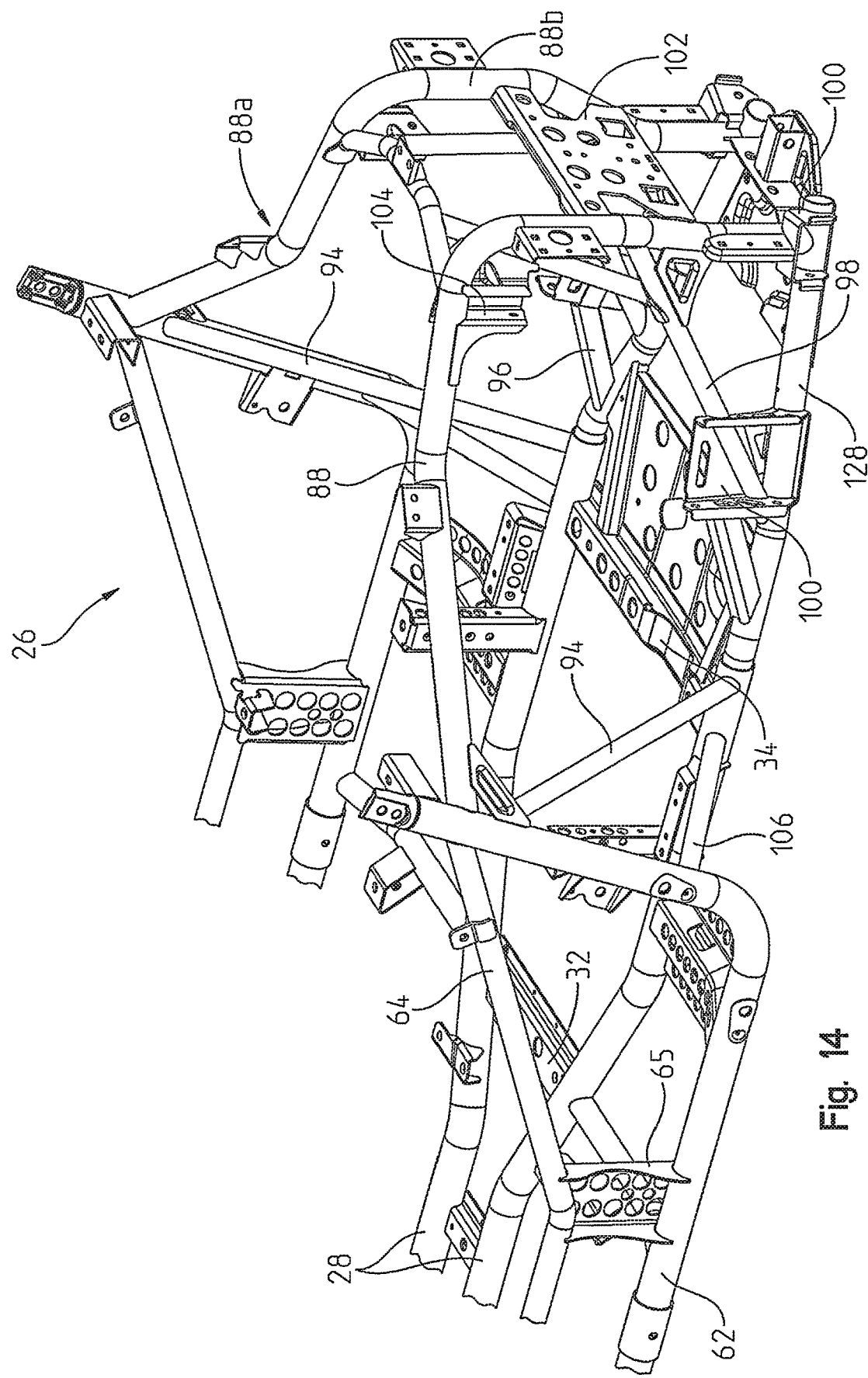
FIG. 14 is a left rear perspective view of a rear frame portion of the frame of FIG. 9A.
Figure 15:
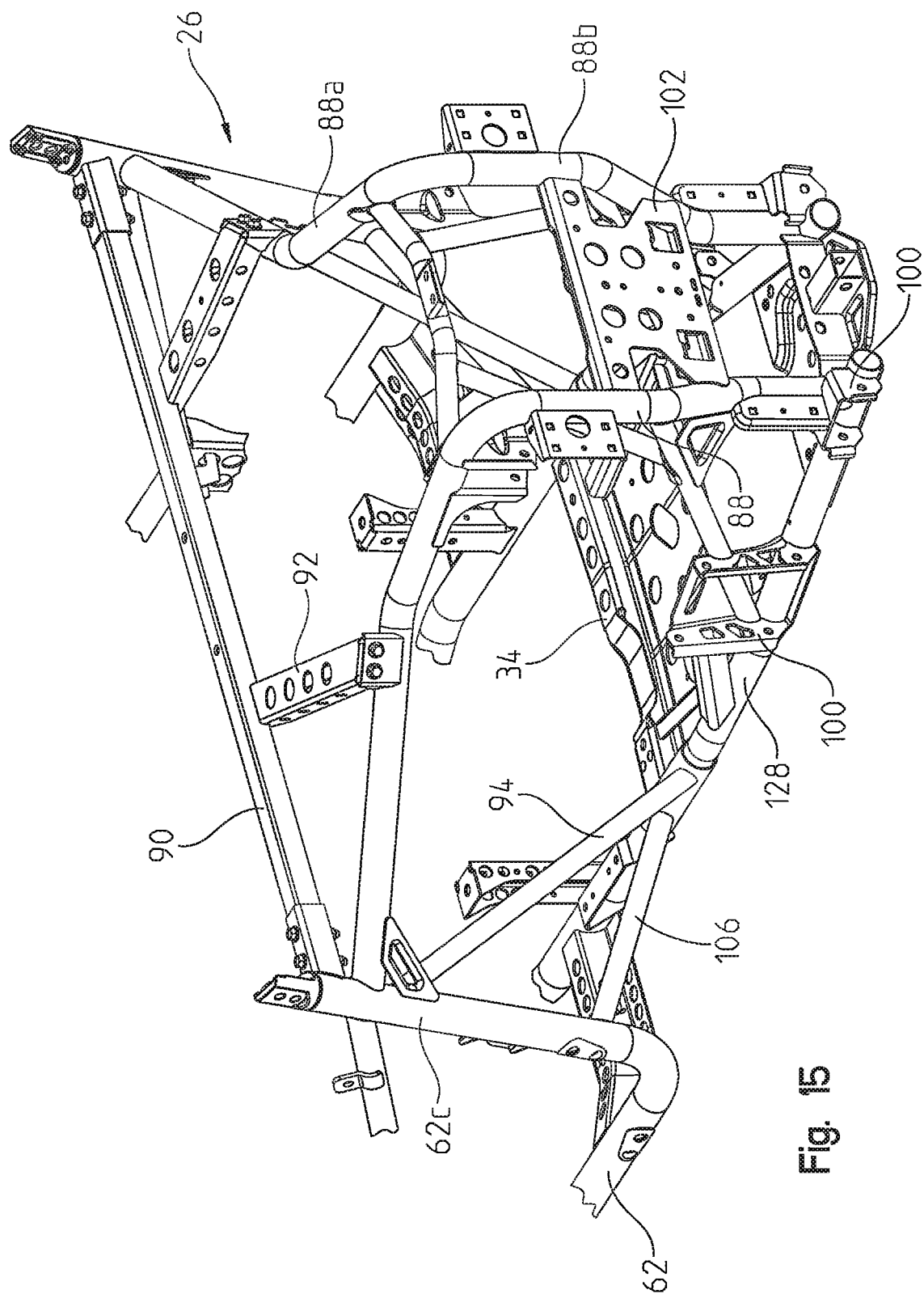
FIG. 15 is a further left rear perspective view of the rear frame portion of FIG. 14.
Figure 16:
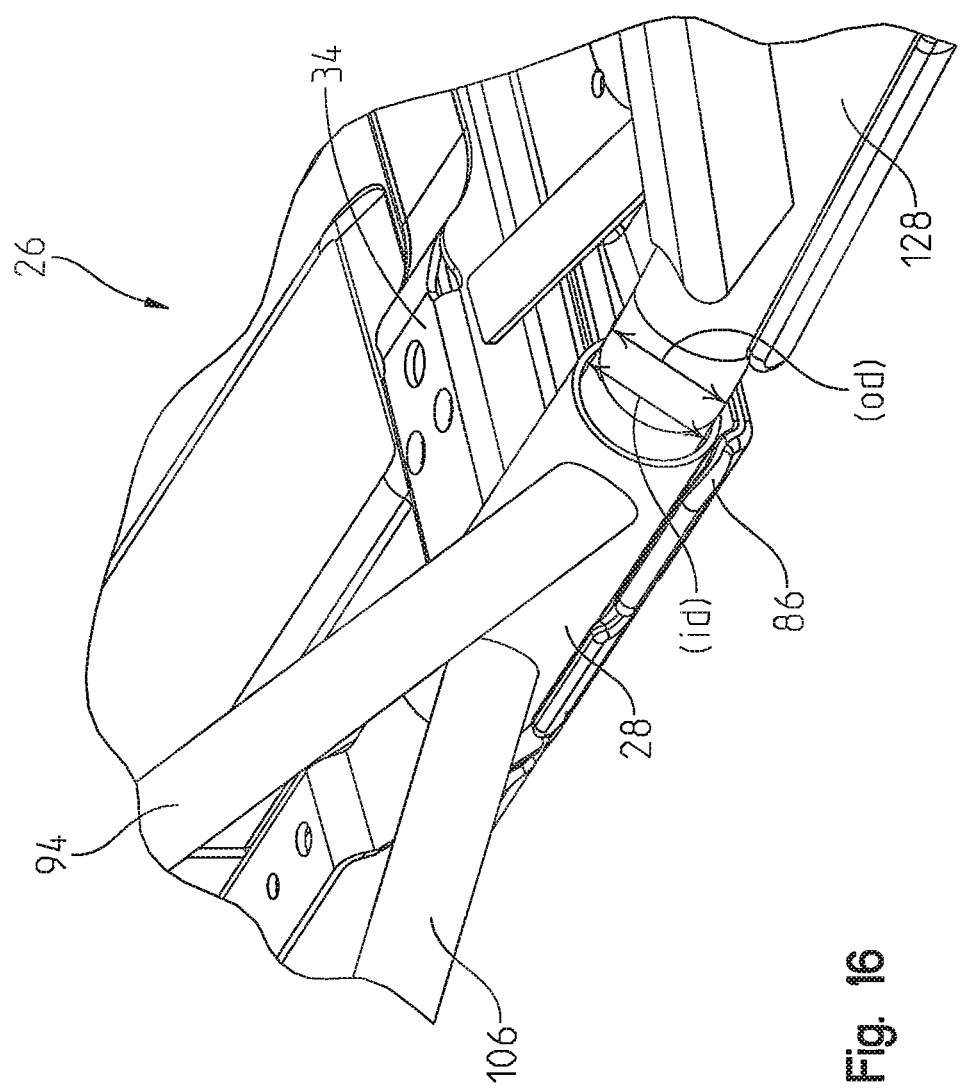
FIG. 16 is a left rear perspective view of a coupler assembly of the rear frame portion of FIG. 15.
Figure 17:
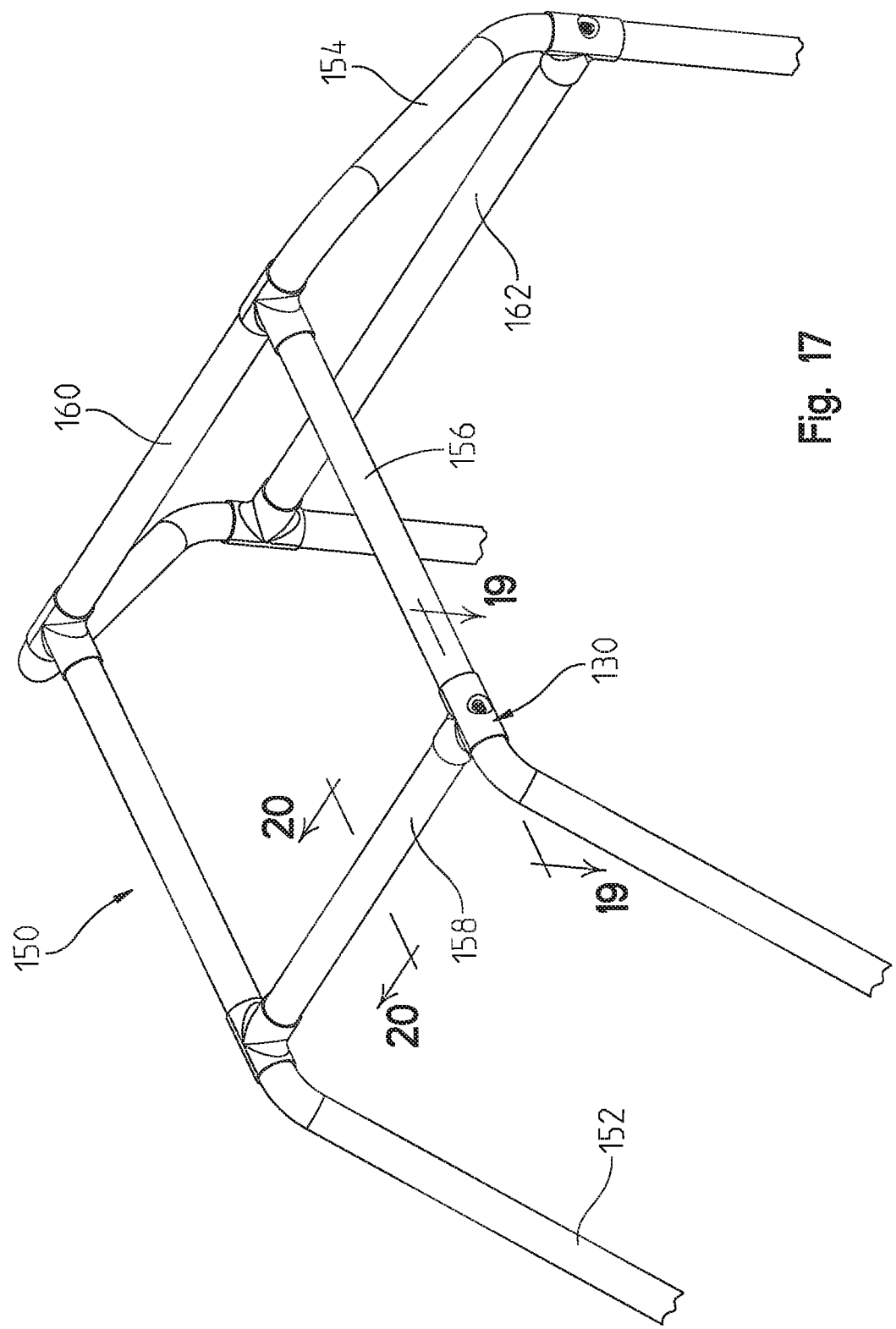
FIG. 17 is left front perspective view of a cab frame assembly of the vehicle of FIG. 1.

Referring to FIGS. 12 and 13, coupling assemblies 112 may be configured as expansion members, such as expansion bolts, configured to extend through openings in bracket 40 and openings 37 in lower plate member 39 in order to secure accessory 110 to front frame portion 22. Coupling assemblies 112 include a support member 122, a washer 124, a sleeve 116, and a bolt 118. Support member 122 is coupled to a frame member 114 of accessory 110. Washer 124 is positioned against the front surface of support member 122. Bolt 118 is inserted through washer 124 and support member 122 until a flange 120 of bolt 118 contacts washer 124. Bolt 118 is received within a cylindrical opening of sleeve 116.

In order to couple accessory 110 with front frame portion 22, sleeve 116 extends through integral openings 37 in lower plate member 39 and brackets 40 of upper plate member 38. A lip 126 of sleeve 116 engages an inner surface of lower plate member 38 and/or brackets 40. Bolt 118 is received within sleeve 116 such that sleeve 116 expands when bolt 118 is tightened in order to secure accessory 110 to front frame portion 22. As such, frame assembly 20 integrally includes various mounting points for accessories, such as accessory 110. Additionally, the configuration of coupling assemblies 112 is such that it is not necessary for accessory 110 to be held in place at front end 4 of vehicle 2 while assembling accessory 110 on vehicle 2.

Referring again to FIGS. 9A-10, a forward powertrain support member 42 is coupled to forward longitudinally-extending members 28 and is positioned rearward of lower plate member 38. Forward powertrain support member 42 may be configured to support a portion of a powertrain assembly 250, for example front final drive unit 256 (FIG. 38).

Figure 9A:
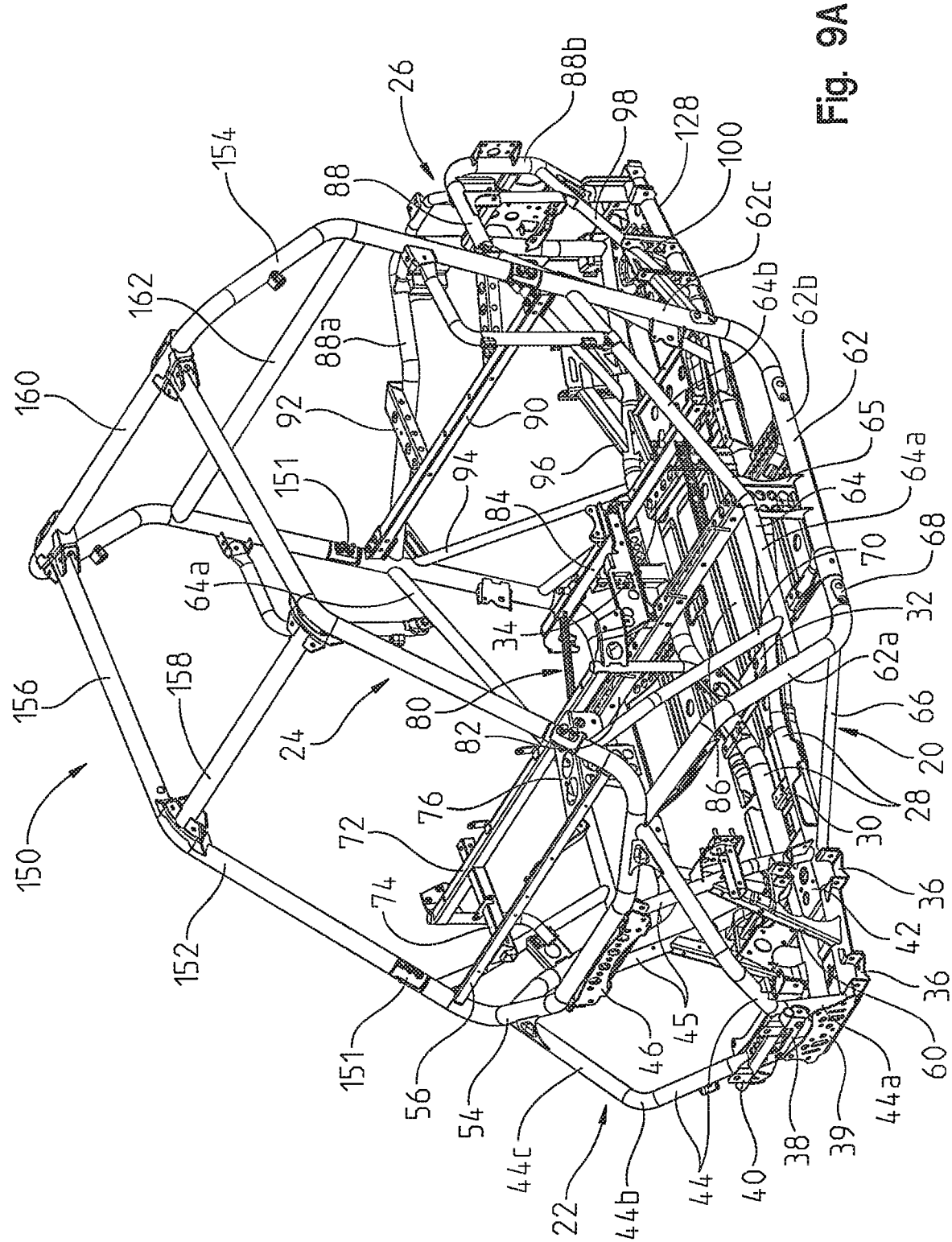
FIG. 9A is a left front perspective view of a frame of the vehicle of FIG. 1.
Figure 9B:
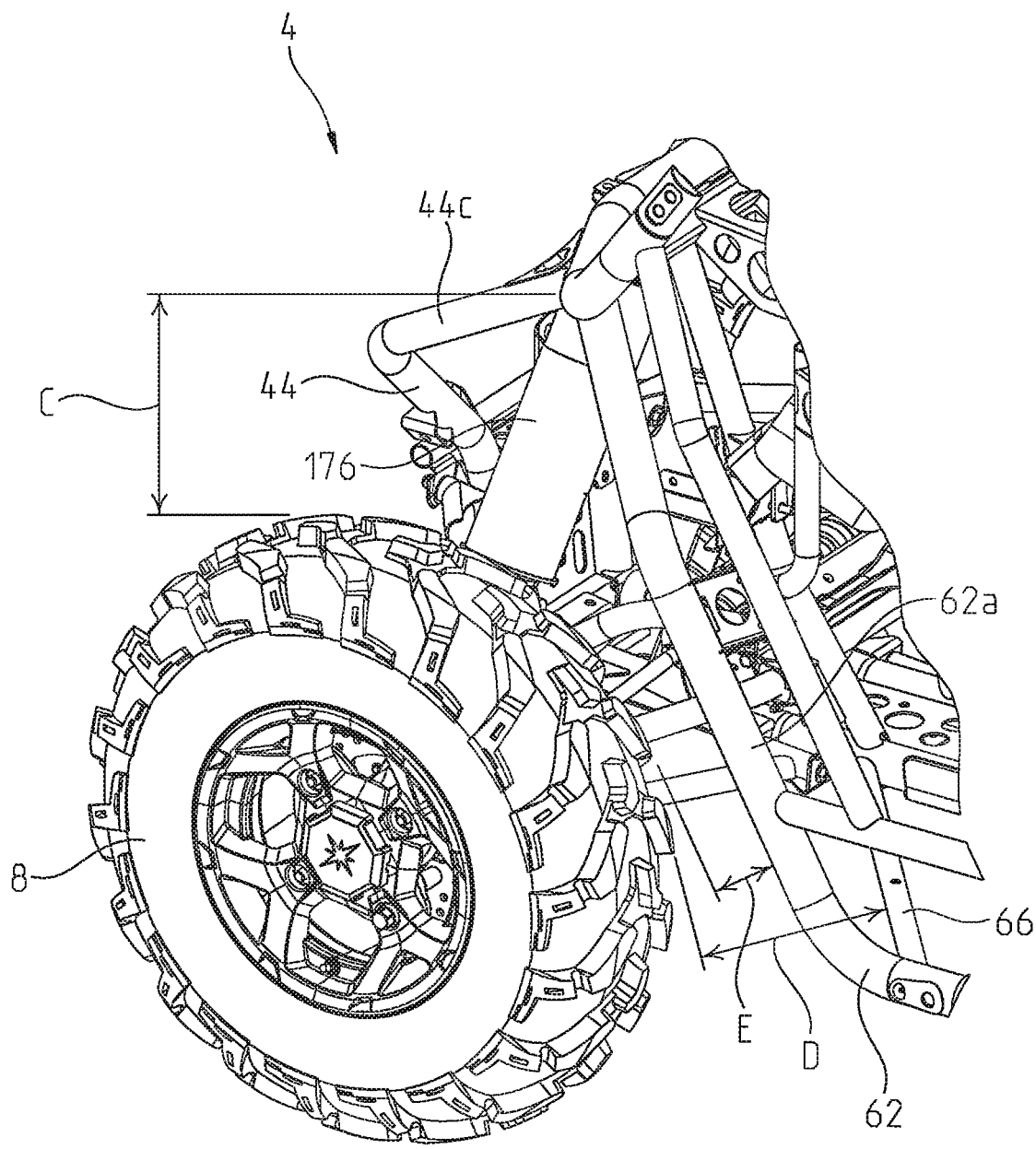
FIG. 9B is a left rear perspective view of a portion of the frame of FIG. 9A.

Additionally, as shown in FIGS. 9A-10, forward longitudinally-extending members 28 are coupled to first upstanding members 44 and second upstanding member 45 at front frame portion 22. Illustratively, front frame portion 22 includes two first upstanding members 44 and two second upstanding members 45. First upstanding members 44 include generally vertical portions 44a, generally angled portions 44b, and generally rearward portions 44c. Vertical portions 44a are coupled to upper plate member 39 and lower plate member 38. Rearward portions 44c of first upstanding members 44 of front frame portion 22 are angled upwardly. In one embodiment, rearward portions 44c are at an angle α of approximately 30-32 degrees from horizontal and are approximately 8-12 inches above the top surface of the front tires along a line C, as shown in FIG. 9B. Illustratively, angle α is approximately 31.3 degrees and the distance along line C is approximately 10.1 inches. As such, first upstanding members 44 are sufficiently spaced apart from front wheels 8 to provide sufficient space in the wheel well area for maximum turning radius. In other words, the geometry of front frame portion 22 does not interfere with or limit the turning radius of front wheels 8. In one embodiment, the front tires have a diameter of approximately 30 inches and the configuration of front end 4 of vehicle 2 does not interfere with or limit the turning radius of front wheels 8.

First upstanding members 44 also support a generally U-shaped frame member 54 coupled to the upper ends thereof. More particularly, vertical portions 44a of first upstanding members 44 are coupled to forward longitudinally-extending members 28 and rearward portions 44c of first upstanding members 44 are coupled to U-shaped frame member 54, such that U-shaped frame member 54 is positioned above forward longitudinally-extending members 28. U-shaped frame member 54 includes a cross-member 56 and a support member 58.

Second upstanding members 45 support a brace 46 extending therebetween. Brace 46 is coupled to U-shaped frame member 54. Additionally, second upstanding members 45 are coupled to braces 60, which are angled forwardly. The lower ends of braces 60 are coupled to forward longitudinally-extending members 28 and the upper ends of braces 60 are coupled to second upstanding members 45.

Referring to FIGS. 9A-10, mid-frame portion 24 includes lower longitudinally-extending members 62 and upper longitudinally-extending members 64. Lower longitudinally-extending members 62 are coupled to forward longitudinally-extending member 28 with frame members 66. Lower longitudinally-extending members 62 include front portions 62a, which are coupled to U-shaped frame member 54, horizontal portions 62b, which are coupled to frame members 66, and rear portions 62c, which are coupled to a cab frame assembly 150, as detailed further herein. Front portions 62a may be approximately 4-8 inches from the outer surface of the tire of front wheel 8 along a line D, as shown in FIG. 9B. Illustratively, the distance along line D is approximately 6.0 inches. Additionally, frame members 66 may be approximately 6-10 inches from the outer surface of the tire of front wheel 8 along a line E, as shown in FIG. 9B. Illustratively, the distance along line E is approximately 8.3 inches. The distance from front wheel 8 to frame members 66 and front portions 62a provides sufficient space within the wheel well of front wheels 8 such that the turning radius of front wheels 8 is not compromised.

Illustratively, horizontal portions 62b may be coupled to front and rear portions 62a, 62c with coupler assemblies 68. Alternatively, horizontal portions 62b may be integrally formed with front and rear portions 62a, 62c, or may be coupled thereto with conventional fasteners (e.g., welds, rivets, bolts, and/or adhesive). Lower longitudinally-extending members 62 may be coupled to upper longitudinally-extending members 64 with brackets 65.

Upper longitudinally-extending members 64 include horizontal portions 64a and angled portions 64b. Horizontal portions 64a are coupled to front portions 62a of lower longitudinally-extending members 62. Additionally, horizontal portions 64a may be coupled to U-shaped frame member 54 with frame members 70. Horizontal portions 64a may be integrally formed with angled portions 64b, or alternatively, may be separate therefrom and coupled thereto with conventional fasteners (e.g., welds, rivets, bolts, and/or adhesive). Angled portions 64b extend rearwardly from horizontal portions 64a and are coupled to rear portions 62c of lower longitudinally-extending members 62.

Referring to FIG. 10, mid-frame portion 24 also includes a dashboard support member 72 coupled to cross-member 56 with an arm member 74 and a steering support member 76. Additionally, dashboard support member 72 is coupled to front portions 62a of lower longitudinally-extending members 62 with members 78 and brackets 79. In one embodiment, dashboard support member 72 and members 78 may be comprised of a light-weight material. In one embodiment, members 72, 78 are comprised of polymeric material, a carbon fiber material, and/or an aluminum material to lower the center of gravity of vehicle 2.

Mid-frame portion 24 also includes a seat frame assembly 80. Seat frame assembly 80 includes a front cross-member 82 and a rear cross-member 84 generally parallel to front cross-member 82. Seats 15 are configured to be removably coupled to seat frame assembly 80.

Referring to FIGS. 9A-10, and 14-16, rear frame portion 26 includes upper rearward longitudinally-extending members 88 which have upper portions 88a and lower portions 88b. Illustratively, upper portions 88a and lower portions 88b may be integrally formed with each other. Alternatively, upper portions 88a and lower portions 88b may be separate from each other and coupled thereto with conventional fasteners (e.g., welds, rivets, bolts, and/or adhesive). Upper portions 88a may be coupled to rear portions 62a of lower longitudinally-extending members 62 and/or a rear cross-member 90. Additionally, braces 92 may be coupled to upper portions 88a and rear cross-member 90. Rear cross-member 90 and braces 92 may be removably coupled to rear frame portion 26 with bolts in order to provide access to powertrain assembly 250.

Rear frame portion 26 also includes lower rearward longitudinally-extending members 128, which are coupled to forward longitudinally-extending members 28. More particularly, as shown best in FIGS. 14-16, the outer diameter (od) of lower rearward longitudinally-extending members 128 is smaller than the inner diameter (id) of forward longitudinally-extending members 28. Illustratively, the outer diameter (od) of lower rearward longitudinally-extending members 128 may be approximately 36-40 mm and the inner diameter (id) of forward longitudinally-extending members 28 may be approximately 38-42 mm. In one embodiment, the outer diameter (od) of lower rearward longitudinally-extending members 128 may be approximately 38 mm and the inner diameter (id) of the forward longitudinally-extending members 28 may be approximately 40 mm. As such, lower rearward longitudinally-extending members 128 are received within a portion of forward longitudinally-extending members 28. Conventional fasteners, such as welds, rivets, bolts, and/or adhesive may be used to secure lower rearward longitudinally-extending members 128 within forward longitudinally-extending members 28. Illustratively, lower rearward longitudinally-extending members 128 are welded to forward longitudinally-extending members 28.

Rear frame portion 26 further includes a plurality of angled members 94, 96, and 98. Angled members 94 may be coupled to rear portions 62c of lower longitudinally-extending members 62 and forward longitudinally-extending members 28. Angled members 96 and 96 are coupled to lower rearward longitudinally-extending members 128. Angled members 96 and 98 may be coupled to alignment arm brackets 100 for a rear suspension assembly 300. A bracket 104 may be coupled to upper rearward longitudinally-extending members 88. A plate member 102 is coupled to lower portions 88b of upper rearward longitudinally-extending members 88 and is positioned rearward of angled members 94, 96, and 98. Further details about frame assembly 20 of vehicle 2 may be disclosed in U.S. Provisional Patent Application Ser. No. 61/829,743, filed on May 31, 2013, the complete disclosure of which is expressly incorporated by reference herein.

Referring to FIGS. 17-21, a cab frame assembly 150 is coupled to frame assembly 20 and includes front upstanding members 152, rear upstanding members 154, and longitudinal members 156 extending therebetween. Additionally, cab frame assembly 150 includes a front cross-member 158, a rear upper cross-member 160, and a rear lower cross-member 162. Front cross-member 158 is coupled to an upper end of front upstanding members 152 and/or longitudinal members 156. In one embodiment, front upstanding members 152 are integrally formed with longitudinal members 156. The lower end of front upstanding members 152 may be coupled to frame assembly 20 with couplers 151. Couplers 151 may be bolted, adhered, or otherwise coupled to frame assembly 20 and/or front upstanding members 152.

Rear upper cross-member 160 is coupled to an upper end of rear upstanding members 154 and/or longitudinal members 156. Rear lower cross-member 162 is also coupled to rear upstanding members 154. In one embodiment, rear upstanding members 154 are integrally formed with rear upper cross-member 160. The lower end of rear upstanding members 154 may be coupled to frame assembly 20 with couplers 151, which may be bolted, adhered, or otherwise coupled to frame assembly 20 and/or rear upstanding members 154.

Figure 18:
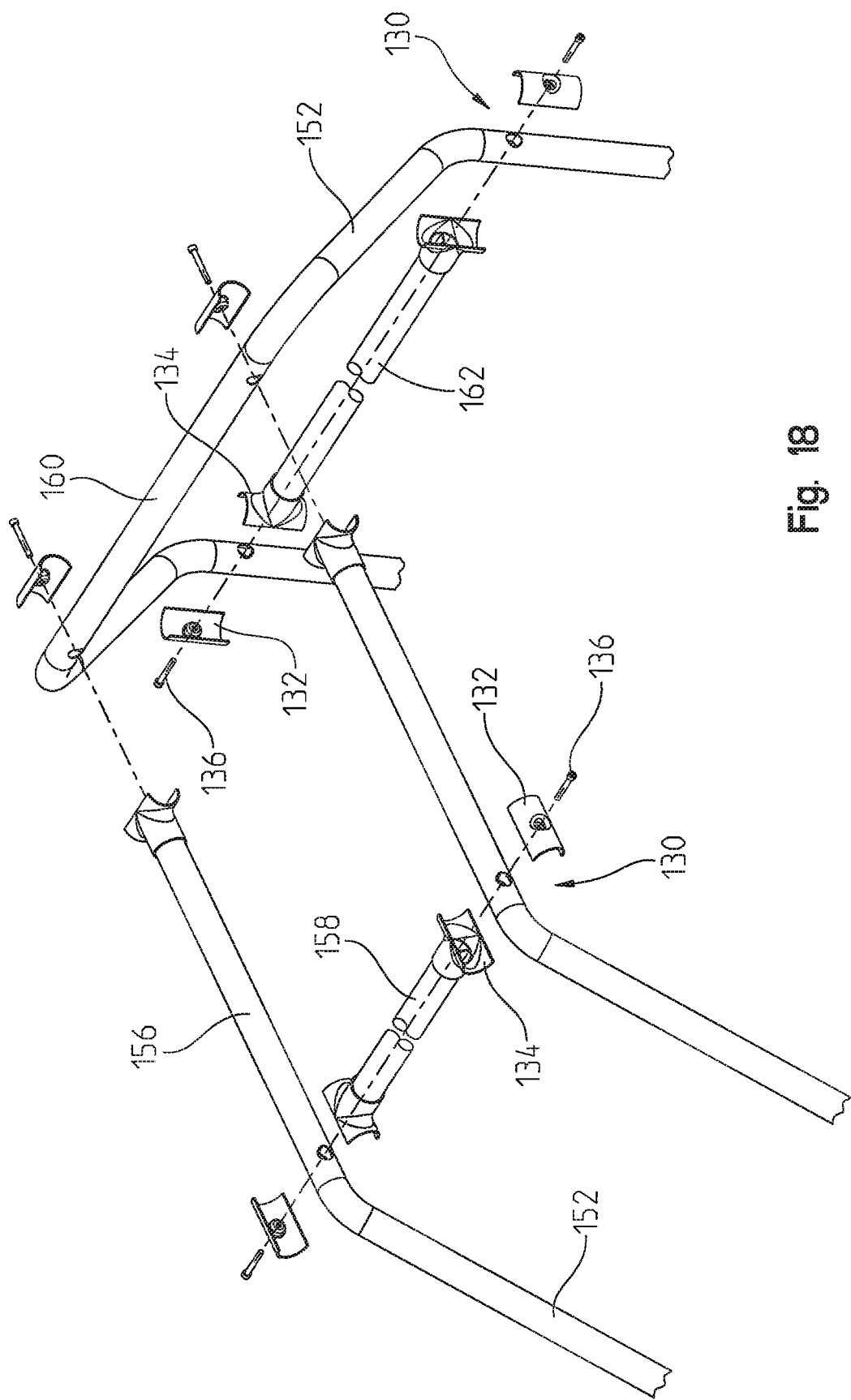
FIG. 18 is an exploded view of the cab frame assembly of FIG. 17.
Figure 21:
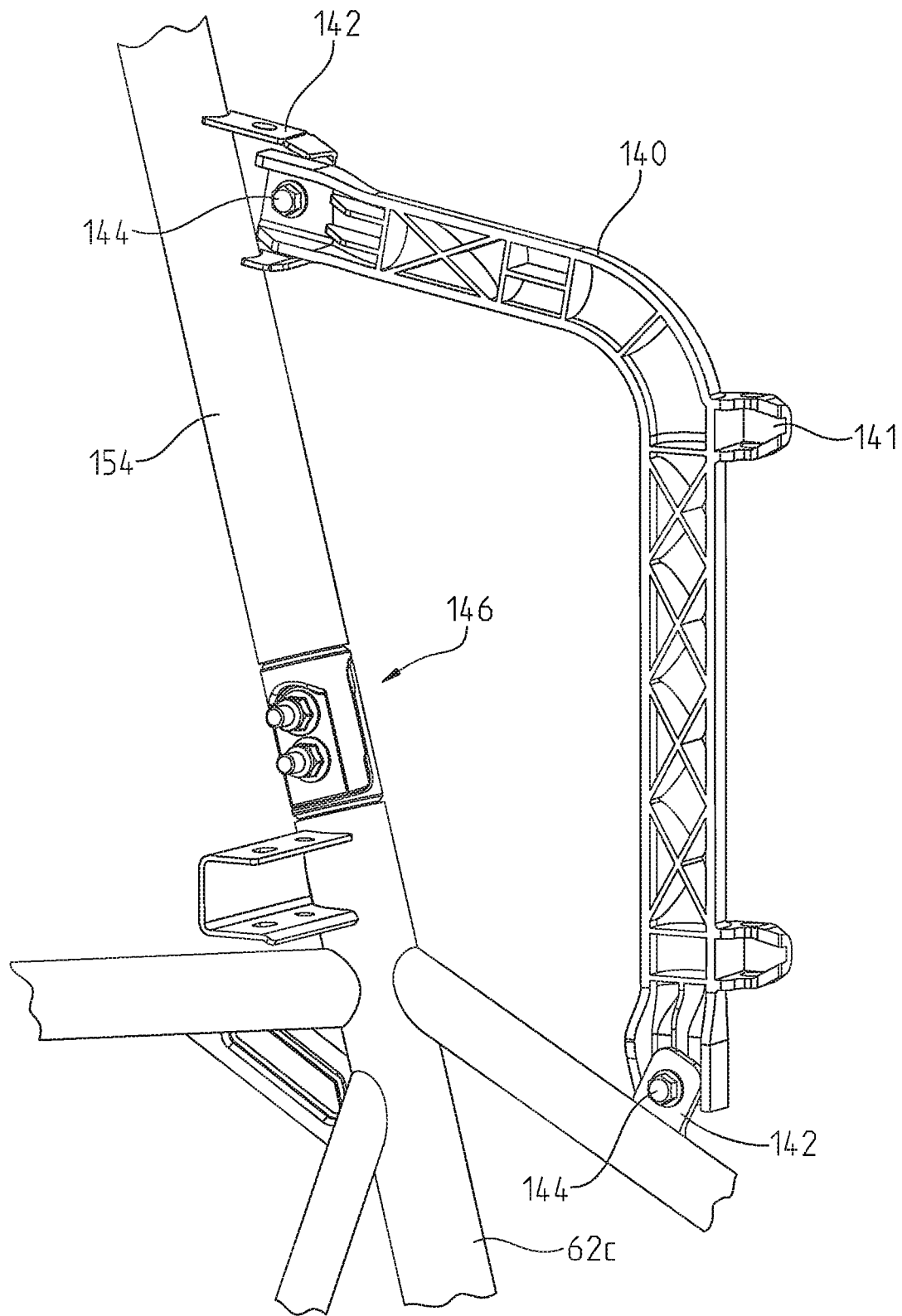
FIG. 21 is a right front perspective view of an inner surface of a retainer bar of the cab frame assembly of FIG. 17.

As shown in FIGS. 18 and 19, front cross-member 158 may be coupled to front upstanding members 152 and/or longitudinal members 156 with a coupler assembly 130. Similarly, longitudinal members 156 are coupled to rear upper cross-member 160 and rear upstanding members 154 with coupler assemblies 130. Additionally, rear lower cross-member 162 is coupled to rear upstanding members 154 with coupler assemblies 130. Coupler assemblies 130 include an outer bracket 132, an inner bracket 134, and a fastener 136. More particularly, front upstanding members 152 and longitudinal members 156 are received within opposing ends of outer and inner brackets 132, 134 and may be coupled thereto with conventional fasteners (e.g., adhesive). Front cross-member 158 is received within an inner end of inner bracket 134 and may be coupled thereto with adhesive or other conventional fasteners. As such, front upstanding members 152, longitudinal members 156, and front cross-member 158 are bought together in a T-configuration by coupler assemblies 130. Fastener 136 is received within an opening of outer bracket 132 and extends into an inner channel 166 of front cross-member 158 in order to couple together front upstanding members 152, longitudinal members 156, and front cross-member 158. Fastener 136 may be threadedly coupled or otherwise secured within inner channel 166. In a similar way, upper rear cross-member 160 is coupled to rear upstanding members 154 and longitudinal members 156. Additionally, lower rear cross-member 162 is coupled to rear upstanding members 154 with coupler assemblies 130.

Cab frame assembly 150 may be at least partially comprised of a metallic material. For example, illustrative cab frame assembly 150 is comprised of a material that weighs less, or has a lower density, than the material of frame assembly 20. Illustrative cab frame assembly 150 may be comprised of aluminum, whereas illustrative frame assembly 20 may be at least partially comprised of steel. More particularly, at least some of front upstanding members 152, rear upstanding members 154, longitudinal members 156, front cross-member 158, rear upper cross-member 160, and rear lower cross-member 162 are comprised of aluminum. Alternative embodiments of cab frame assembly 150 may be comprised of other light-weight materials, such as polymeric materials and/or carbon fiber materials. By using aluminum, polymeric materials, and/or carbon fiber materials, cab frame assembly 150 may be light-weight and decrease the overall weight of vehicle 2. As such, the center of gravity of vehicle 2 may be lowered. For example, when cab frame assembly 150 is comprised of aluminum, the weight of cab frame assembly 150 may be reduced by approximately 40% compared to a cab frame assembly 150 comprised of steel. Alternatively, members 152, 154, 156, 158, 160, and/or 162 of cab frame assembly 150 may be comprised of 16-gauge tubes, rather than 14-gauge tubes, and the decreased size of members 152, 154, 156, 158, 160, and/or 162 may decrease the weight of cab frame assembly 150 and, therefore, lower the center of gravity of vehicle 2.

When cab frame assembly 150 is comprised of aluminum, the bending stiffness or strength of at least some of front upstanding members 152, rear upstanding members 154, longitudinal members 156, front cross-member 158, rear upper cross-member 160, and rear lower cross-member 162 may be increased by including at least one structural reinforcement member. Illustratively, the at least one structural reinforcement member defines a plurality of internal ribs 164 and inner channel 166. Internal ribs 164 and inner channel 166 may be extruded with members 152, 154, 156, 158, 160, and 162. As shown if FIG. 20, front upstanding members 152, rear upstanding members 154, longitudinal members 156, front cross-member 158, rear upper cross-member 160, and/or rear lower cross-member 162 may include at least four internal ribs 164. Internal ribs 164 extend inwardly from the inner surface of front upstanding members 152, rear upstanding members 154, longitudinal members 156, front cross-member 158, rear upper cross-member 160, and/or rear lower cross-member 162 and engage with inner channel 166. By including at least four internal ribs 164, the bending stiffness of each member 152, 154, 156, 158, 160, and/or 162 is increased in two directions—both direction $B_1$ and direction $B_2$. As shown in FIGS. 19 and 20, inner channel 166 extends along the length of front upstanding members 152, rear upstanding members 154, longitudinal members 156, front cross-member 158, rear upper cross-member 160, and/or rear lower cross-member 162 and is generally hollow in order to receive fastener 136 of coupler assemblies 130. Additionally, electrical wires may be routed through inner channel 166 and/or the channels defined between internal ribs 164 in order to conceal and protect the wires.

At least some of front upstanding members 152, rear upstanding members 154, longitudinal members 156, front cross-member 158, rear upper cross-member 160, and rear lower cross-member 162 may be extruded and profiled. For example, front upstanding members 152, rear upstanding members 154, longitudinal members 156, front cross-member 158, rear upper cross-member 160, and/or rear lower cross-member 162 may be extruded with a generally hourglass or FIG. 8 profile to allow accessories, such as doors 222 (FIG. 35), a roof (not shown), a front windshield (not shown), and/or a rear windshield (not shown) to be coupled to cab frame assembly 150. Additional details about the profile of cab frame assembly 150 may be disclosed in U.S. patent application Ser. No. 13/429,589, filed on Jun. 8, 2012, the complete disclosure of which is expressly incorporated by reference herein.

Additionally, cab frame assembly 150 also includes a retainer or bolster bar 140, which may be coupled to rear upstanding members 154. More particularly, rear upstanding members 154 may include tabs 142 for coupling with bolster bars 140. A fastener 144 may be received within openings of bolster bars 140 and corresponding openings in tabs 142 in order to couple bolster bars 140 to rear upstanding members 154. Bolster bar 140 includes tabs 141, which are configured to support a door 222 (FIG. 35), as detailed further herein. Illustrative bolster bars 140 may be comprised of a light-weight or low-density metallic material, polymeric material, and/or carbon fiber material. For example, bolster bar 140 may be comprised of aluminum. With the use of aluminum or other light-weight materials, the center of gravity of vehicle 2 may be lowered.

Figure 22:
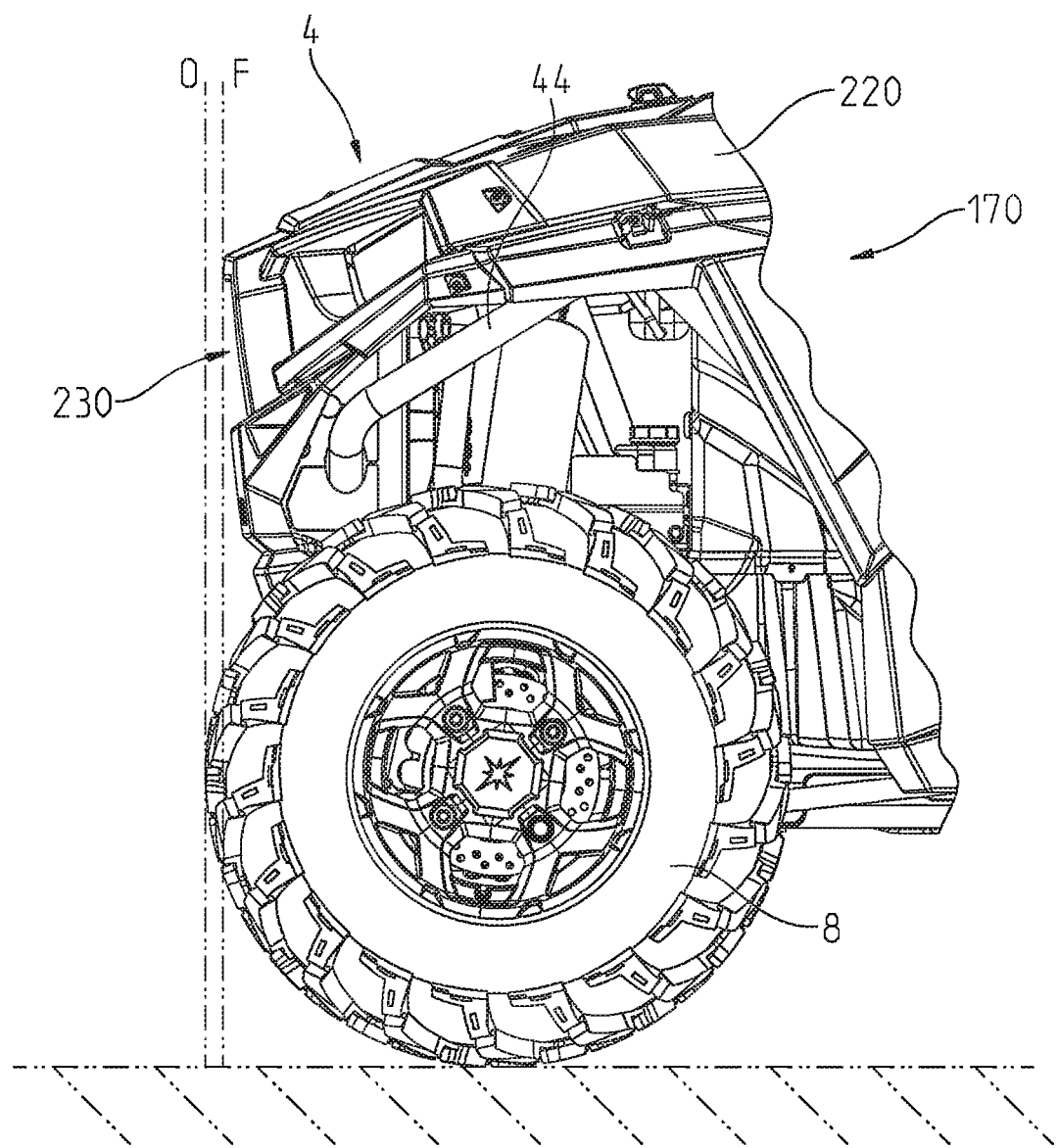
FIG. 22 is a left side view of a front end of the vehicle of FIG. 1.

Referring to FIG. 22, frame assembly 20 may be coupled to a body of vehicle 2. For example, the body of vehicle 2 may include a hood 220 at front end 4, as well as dashboard assembly 200 and floorboard assembly 210 with operator area 14 (FIG. 2). As shown in FIG. 22, the forward-most portion of vehicle 2 is defined by upstanding members 44 along line F. However, the forward-most portion of front wheels 8 are forward of the line F. As such, if vehicle 2 contacts an obstacle (e.g., rock or tree) at a position along line O, only front wheels 8 will contact the obstacle. The remainder of vehicle 2 is rearward of line O and, therefore, does not contact the obstacle. In this way, the approach angle at front frame portion 22 of frame assembly 20 minimizes damage to vehicle 2 by ensuring that front wheels 8 will contact an obstacle before any other portion of vehicle 2. For example, angle α of first upstanding members 44 defines the approach angle, which allows front wheels 8 to be configured to contact an obstacle at line O before the remainder of vehicle 2 reaches the obstacle. Further details about the body of vehicle 2 may be disclosed in U.S. Provisional Patent Application Ser. No. 61/829,743, filed on May 31, 2013, the complete disclosure of which is expressly incorporated by reference herein.

Figure 23:
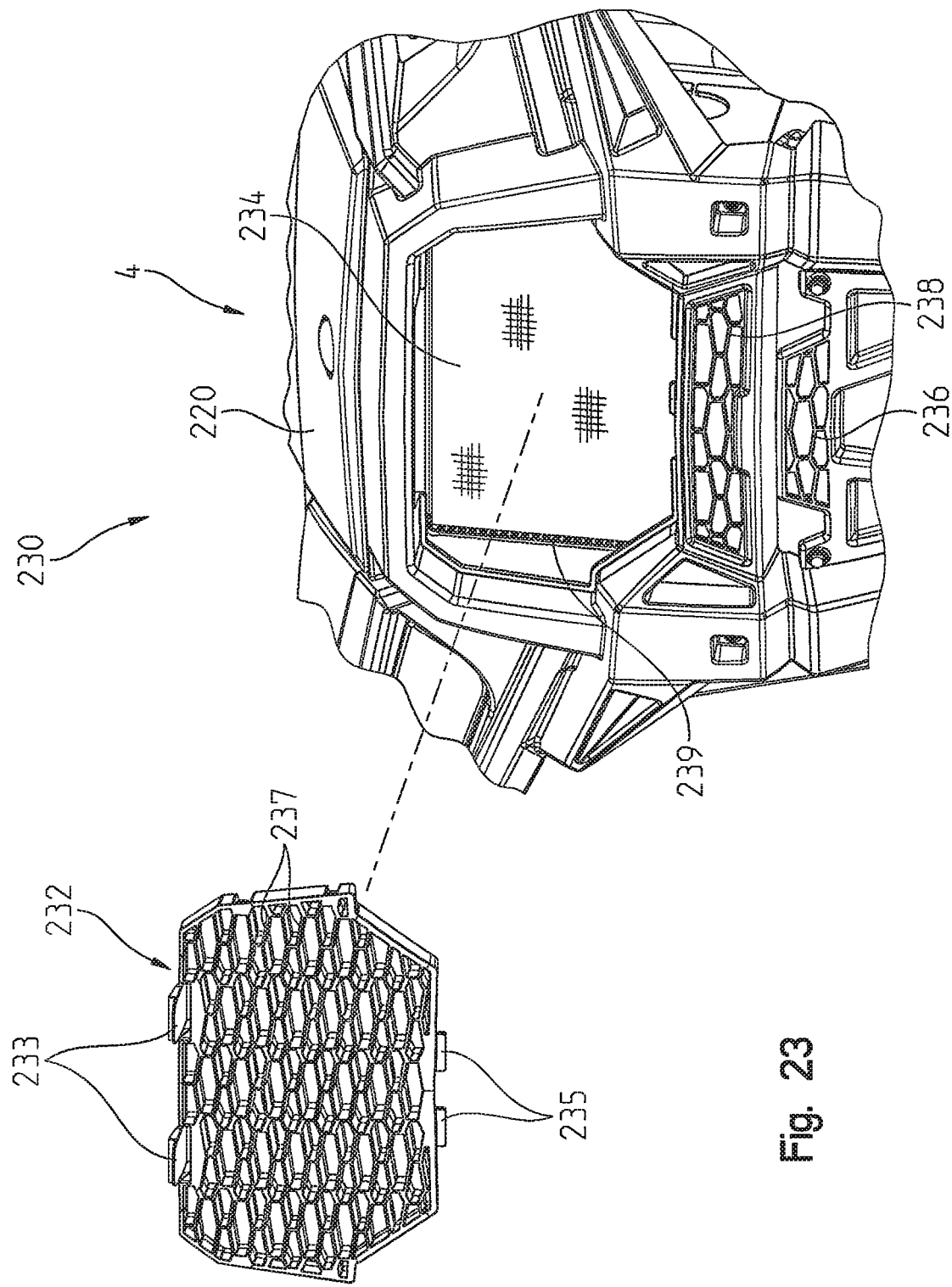
FIG. 23 is an exploded view of a grille of a cooling assembly of the vehicle of FIG. 1.
Figure 24:
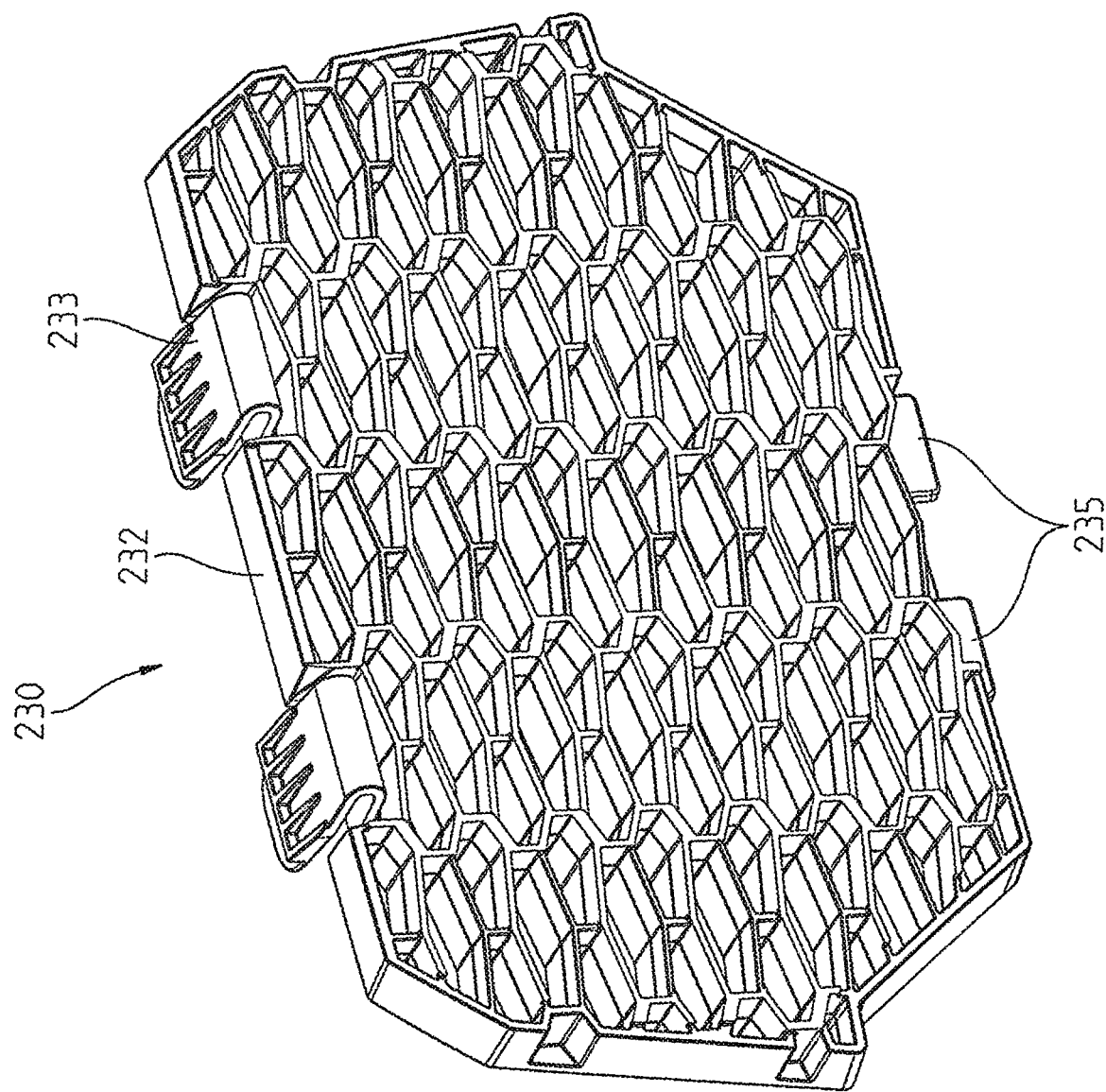
FIG. 24 is a left rear perspective view of the grille of FIG. 23.

Referring to FIGS. 23 and 24, a cooling system 230 is positioned at front end 4 of vehicle 2 and, therefore, the approach angle of frame assembly 20 also protects cooling system 230 from damage if front end 4 vehicle 2 contacts an obstacle. Cooling system 230 includes a main grille 232, at least one heat exchanger 234, and secondary grilles 236, 238. Main grille 232 is positioned forward of heat exchanger 234 and above secondary grilles 236, 238. Main grille 232 is removably coupled to the body of vehicle 2, for example hood 220, with tabs 233 and 235. As shown in FIG. 24, tabs 233 are positioned along the top edge of main grille 232 and tabs 235 are positioned along the bottom edge of main grille 232. Tabs 233 are configured to compress when main grille 232 is assembled at front end 4 of vehicle 2; however, tabs 233 are biased to an expanded position in order to secure main grille 232 against hood 220 and other components at front end 4 of vehicle 2.

Main grille 232 includes a plurality of louvers 237 to allow air to flow therethrough in order to provide cooling air to heat exchanger 234. In one embodiment, louvers 237 may be angled in order to deflect dirt, mud, and other debris away from heat exchanger 234. Additionally, the angled configuration of louvers 237 may be such that the flow of air therethrough is laminar. Also, by keeping main grille 232 clean and free of dirt and mud, air flow through louvers 237 is more efficient. Additionally, a removable deflector 239 may be coupled to heat exchanger 234 in order to further deflect dirt, mud, and debris away from heat exchanger 234. Illustratively, deflector 239 may extend around the perimeter of heat exchanger 234.

Referring to FIG. 25, the body of vehicle 2 also includes a plurality of panels within operator area 14. For example, an access panel 240 may be included within operator area 14, which is positioned between seats 15, as shown in FIG. 5. In this way, access panel 240 may be positioned generally rearward of seats 15 and encloses an engine compartment for powertrain assembly 250 from operator area 14. More particularly, an engine 252 of powertrain assembly 250 may be positioned rearward of access panel 240. As such, access panel 240 prevents the operator or passenger from accidentally contacting components of powertrain assembly 250 within the engine compartment and also prevents transfer of noise, heat, fluids, dirt, and/or debris from the engine compartment into operator area 14. Access panel 240 is removably coupled to the body, which also provides access to the engine compartment for repairing, changing, and/or monitoring components of engine 252 or other portions of powertrain assembly 250. For example, engine 252 may be oriented such that the oil dipstick and/or engine filter is adjacent access panel 240. In this way, the operator is able to monitor or change the oil level and/or filter of engine 252 without removing seats 15.

Figure 26:
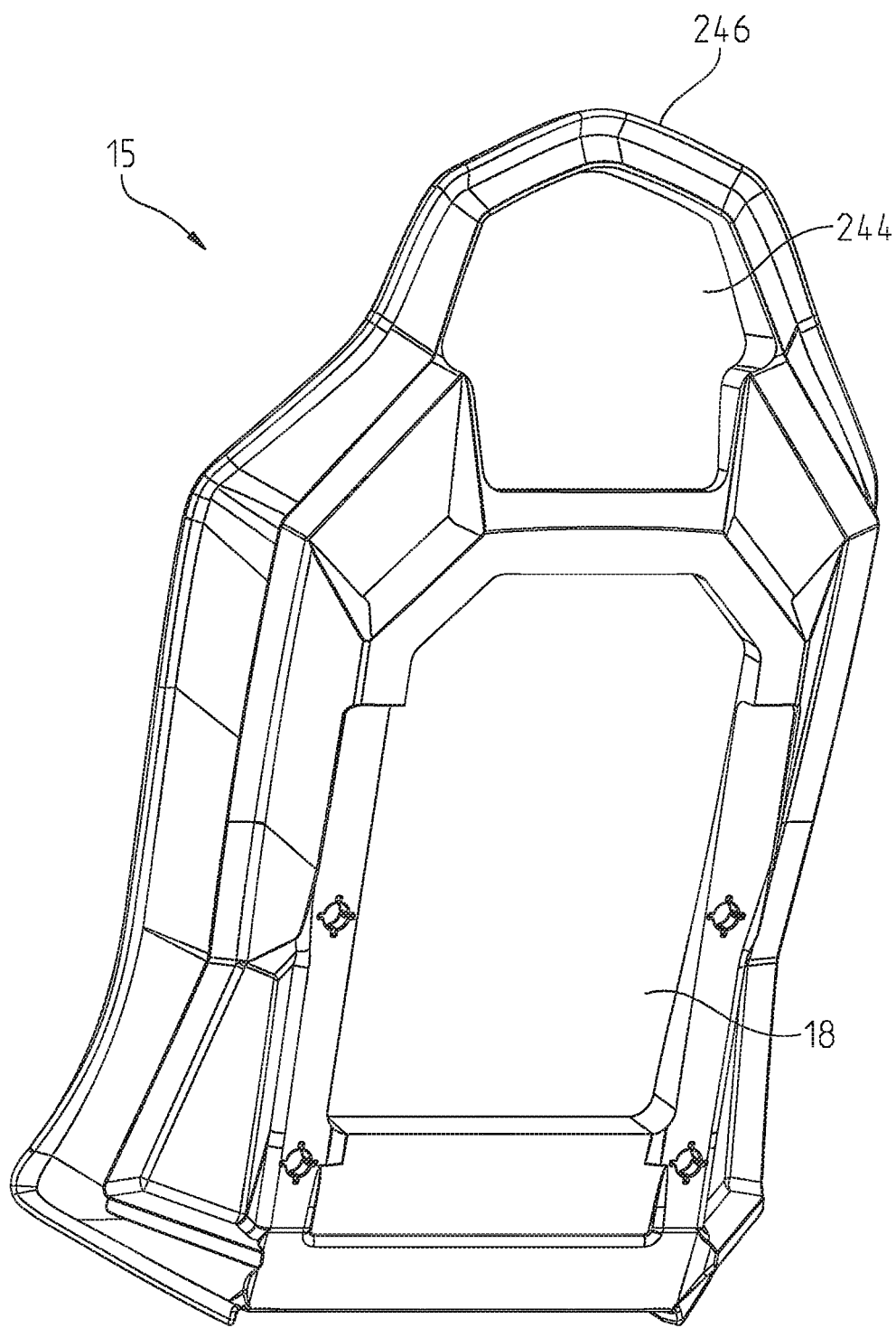
FIG. 26 is a left rear perspective view of a seat of the vehicle of FIG. 1.

As shown in FIG. 26, operator area 14 includes seats 15, which include seat bottoms 16 and seat backs 18. The rearward surface of seat backs 18 may include a recessed portion 244 rearward of a head rest 246 of seats 15. By including recessed portion 244 on seats 15, the weight of seats 15 may be reduced. For example, the weight of seats 15 may be reduced by approximately 15%. As such, the overall weight of vehicle 2 may be reduced, which may lower the center of gravity of vehicle 2.

Figure 27:
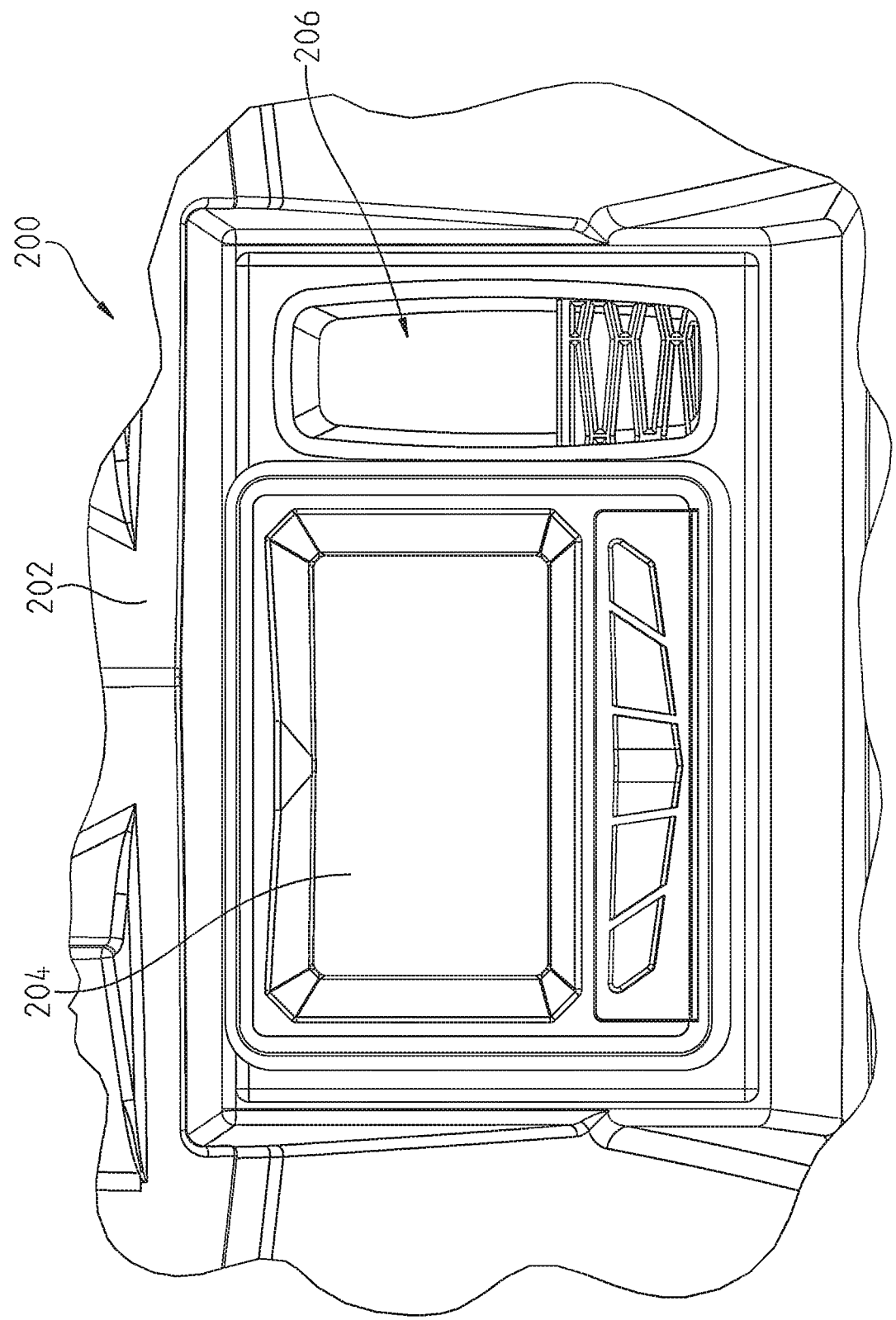
FIG. 27 is a rear view of a display screen within a dashboard assembly of the vehicle of FIG. 1.

Referring to FIG. 27, operator area 14 also includes dashboard assembly 200 positioned generally forward of seats 15 and generally above floorboard assembly 210 (FIG. 2). Dashboard assembly 200 includes an upper dashboard member 202, which may include at least one opening for a multi-functional display screen or gauge 204. Illustratively, screen 204 may be configured with to output information about navigation, radio, cellular telephones, and/or data about vehicle 2. For example, display screen 204 may be configured to output GPS coordinates, information about the terrain, and data received from sensors about the fuel levels, output of powertrain assembly 250, and other similar data from vehicle 2. Additionally, upper dashboard member 202 may support integrated accessories 206, such as integrated speakers and/or heating and cooling vents.

Additionally, upper dashboard member 202 may support a passenger grab bar 208 (FIG. 2). The passenger may hold on to grab bar 208 during operation of vehicle 2 to stabilize himself or herself in seat 15. Grab bar 208 may be comprised of a metallic material generally surrounded by a polymeric cover. In one embodiment, grab bar 208 may be at least partially comprised of aluminum. As such, grab bar 208 may weigh less and/or have a lower density than a grab bar comprised of other materials, for example steel and, and therefore, may lower the center of gravity of vehicle 2.

Figure 28:
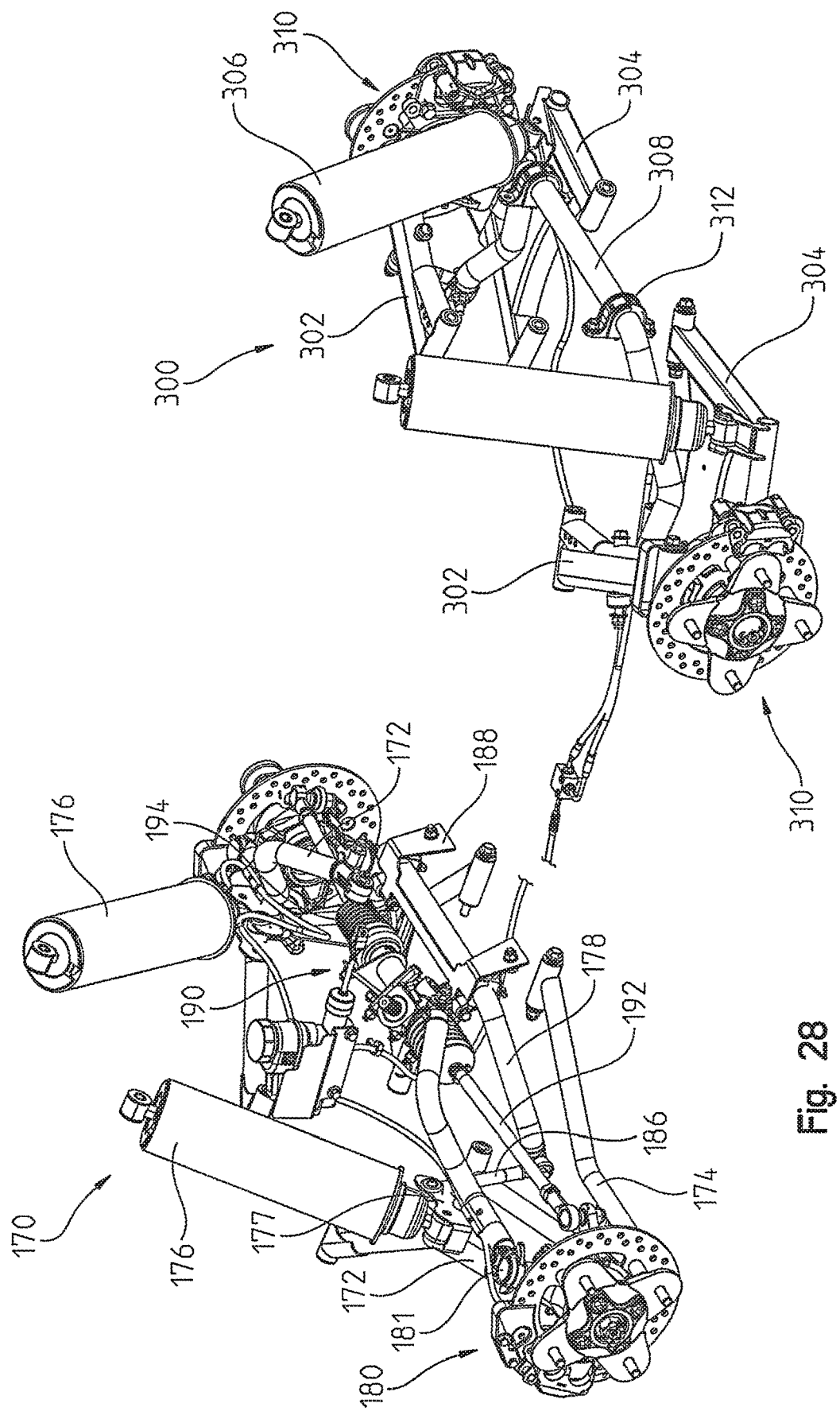
FIG. 28 is a left rear perspective view of a front suspension assembly and a rear suspension assembly of the vehicle of FIG. 1.
Figure 28A:
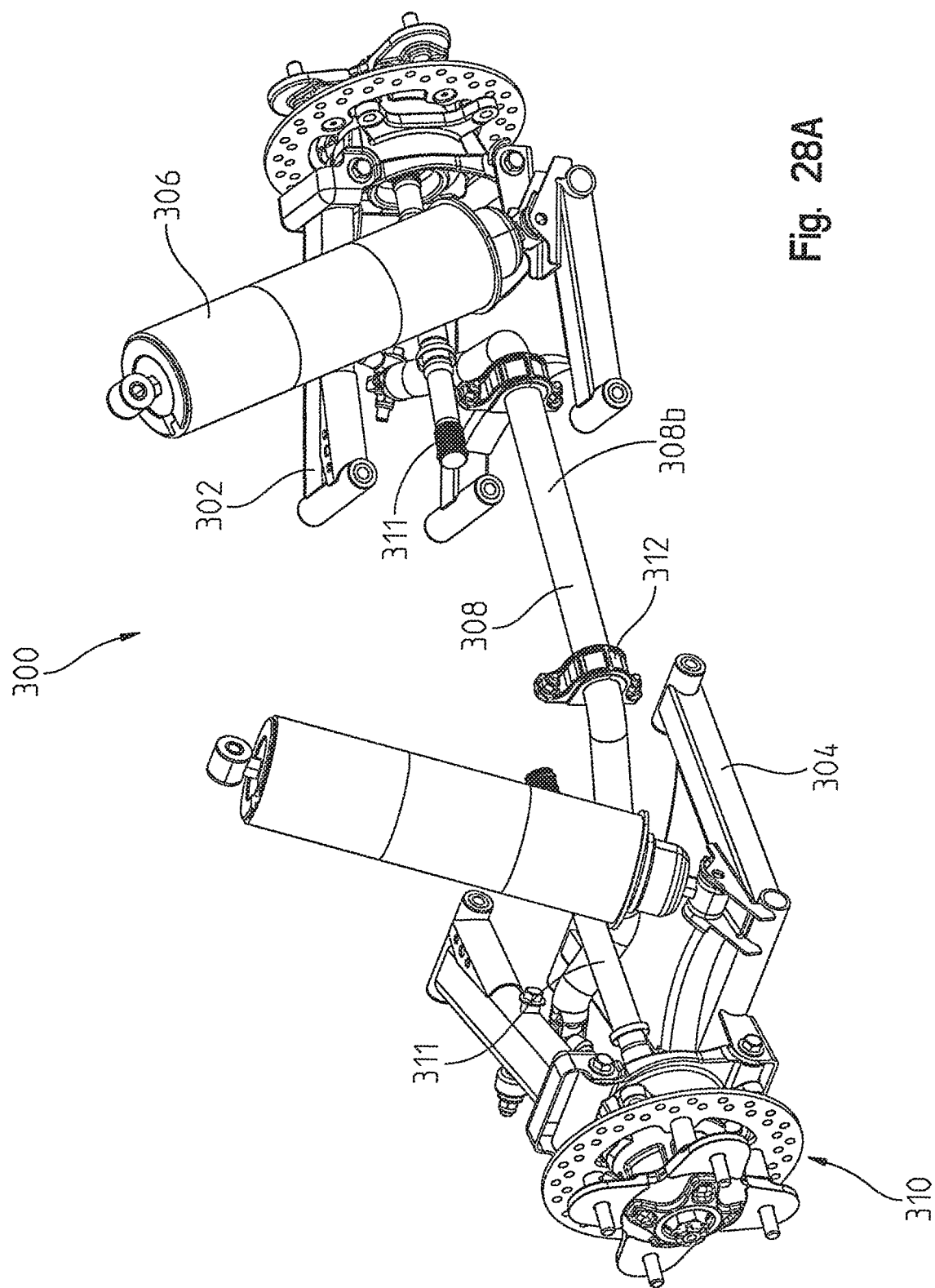
FIG. 28A is a left rear perspective view of the rear suspension assembly of FIG. 28.
Figure 28B:
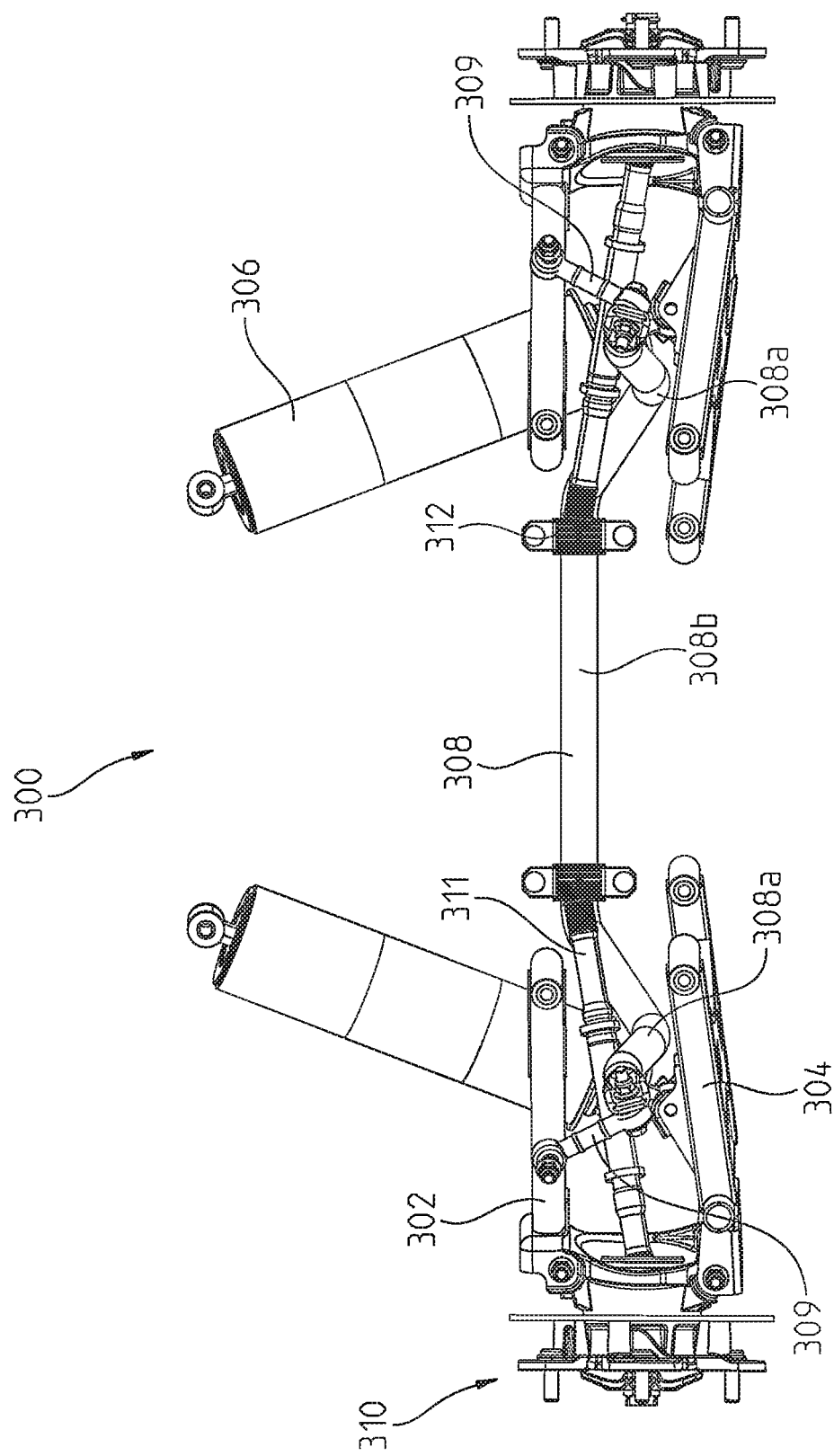
FIG. 28B is a front view of the rear suspension assembly of FIG. 28A.
Figure 28C:
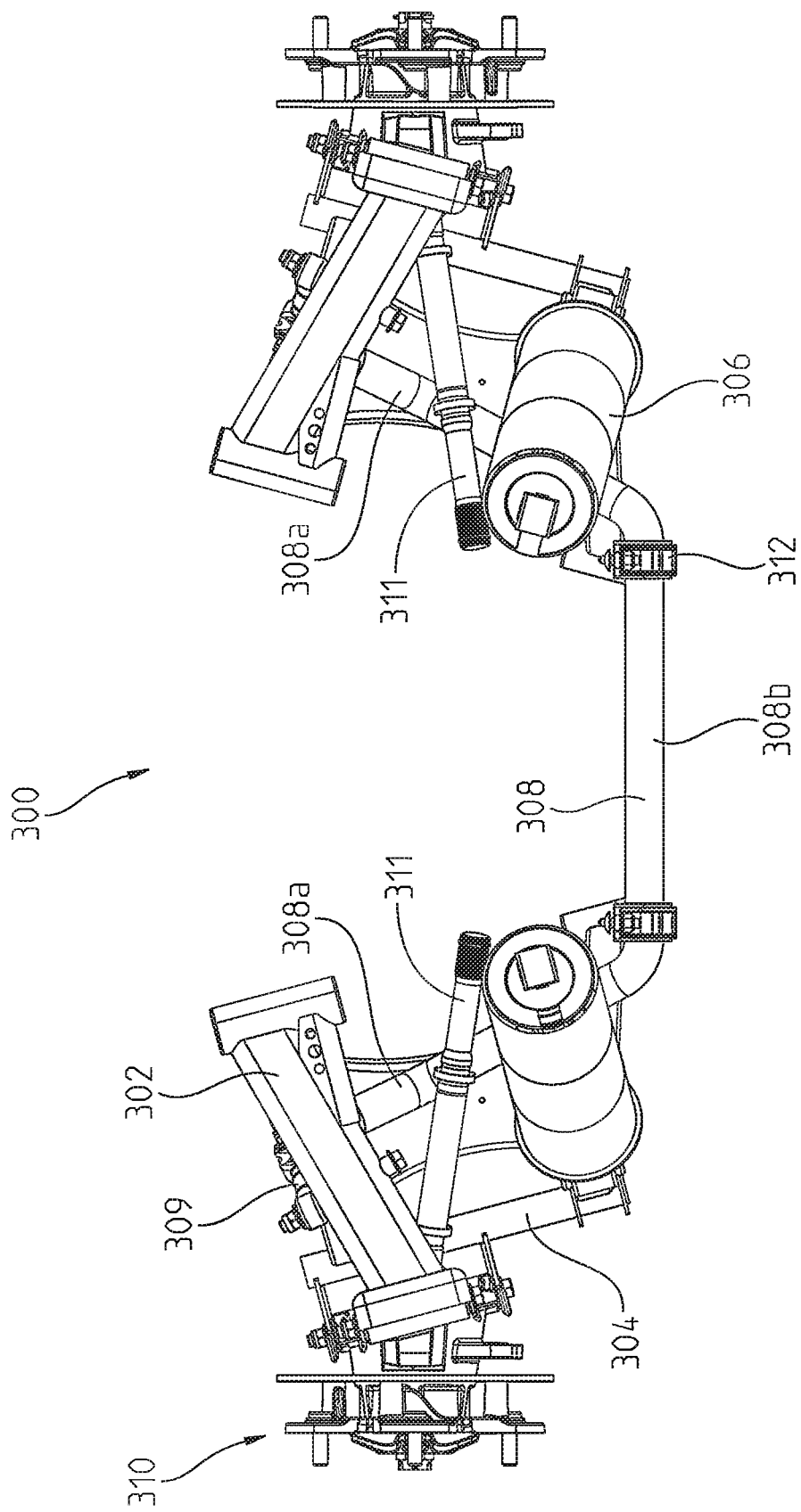
FIG. 28C is a top view of the rear suspension assembly of FIG. 28B.

As shown in FIGS. 28-28C, vehicle 2 includes front suspension assembly 170 and rear suspension assembly 300. In one embodiment, rear suspension assembly 300 is configured for approximately 8-12 inches of travel. Illustratively, rear suspension assembly 300 is configured for approximately 10 inches of travel. Rear suspension assembly 300 is positioned generally rearward of engine 252 at rear end 6 of utility vehicle 2. Referring to FIGS. 28-28C, rear suspension assembly 300 may be configured as a dual alignment arm-type suspension assembly and includes upper alignment arms 302, lower alignment arms 304, shock absorbers 306, and a torsion bar 308. An inner end of upper and lower alignment arms 302, 304 are coupled to alignment arms brackets 100 of rear frame portion 26, and an outer end of upper and lower alignment arms 302, 304 are coupled to hub assemblies 310 of rear wheels 10.

A lower end of shock absorber 306 is coupled to lower alignment arm 304, and an upper end of shock absorber 306 is coupled to brackets 104 on upper rearward longitudinally-extending members 88. In one embodiment, brackets 104 are approximately 15-20 inches above skid plate 86, and illustratively, are approximately 17.8 inches above skid plate 86.

Shock absorbers 306 may be self-leveling or load-leveling shocks, for example Nivomat® shocks available from ZF Sachs AG Corporation of Germany. In one embodiment, shocks 306 include an incompressible fluid, such as oil, and a coil-over spring. When cargo and passengers are supported within vehicle 2, the ground clearance of vehicle 2 (i.e., the distance between the bottom of frame assembly 20 and the ground surface) may be affected such that the ground clearance is reduced and vehicle 2 sits lower to the ground. As such, the bottom surface of vehicle 2 may scrape against the ground, obstacles, or other objects, during operation. However, shocks 306 are configured to selectively or automatically adjust the ride height of vehicle 2 to accommodate a load on vehicle 2 in order to maintain a consistent ground clearance. In other words, shocks 306 are configured to maintain the same ground clearance when vehicle 2 supports cargo and passengers as when vehicle 2 does not include any passengers or cargo. Additional details about shocks 306 may be disclosed in U.S. Pat. No. 8,079,602, issued on Dec. 20, 2011, the complete disclosure of which is expressly incorporated by reference herein.

In one embodiment, shocks 306 are configured to automatically adjust the ride height in response to a load on vehicle 2 in order to maintain a predetermined ground clearance. In another embodiment, the operator may be able to selectively adjust the ride height, either by manually adjusting a portion of shocks 306 or by activating an operator input from operator area 14. For example, if the terrain suddenly changes and includes large obstacles, the operator may selectively adjust shocks 306 to increase the ground clearance to accommodate the terrain.

Also, in a further embodiment, shocks 306 may be configured for continuous damping control, as detailed further in U.S. Provisional Patent Application Ser. No. 61/723,623, filed on Nov. 7, 2012, the complete disclosure of which is expressly incorporated by reference herein.

Figure 8:
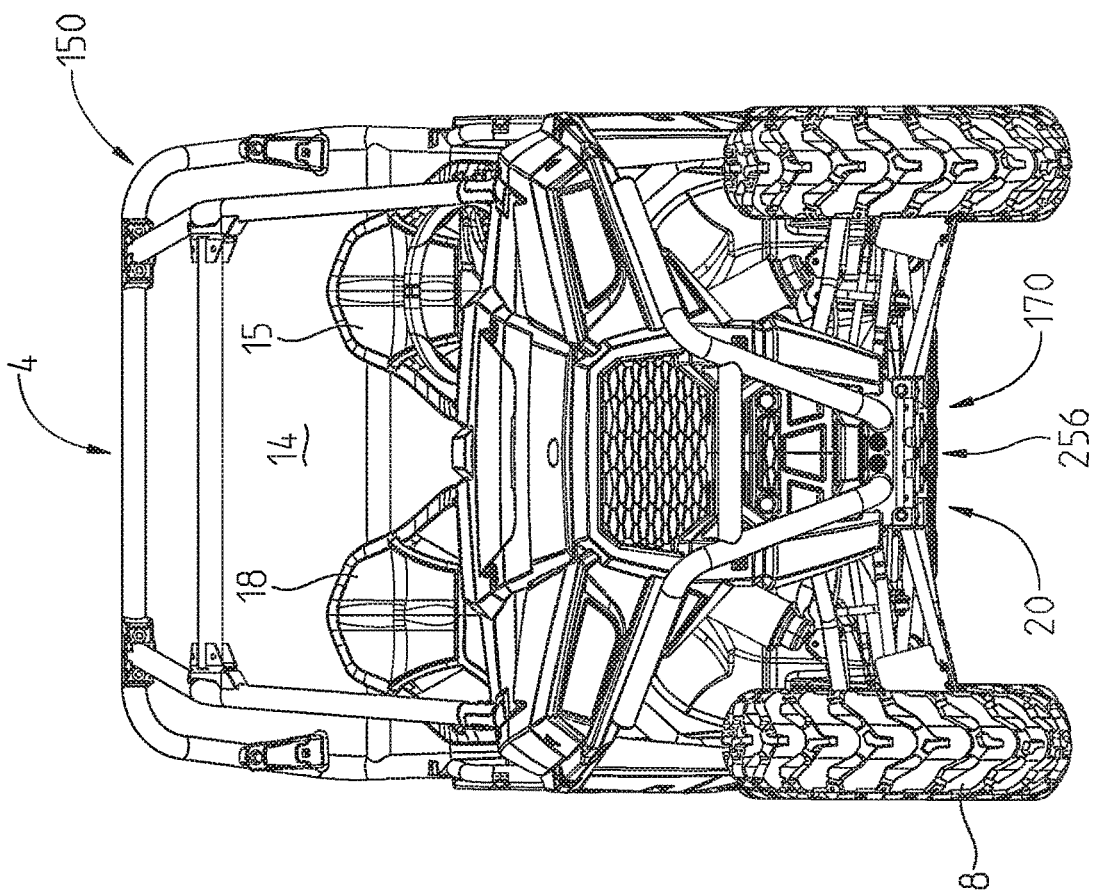
FIG. 8 is a rear view of the vehicle of FIG. 1.

Torsion bar 308 of rear suspension assembly 300 extends generally in a U-shape and is generally positioned along the inner sides of shock absorbers 306. Torsion bar 308 is coupled to upper alignment arms 302 through rods 309, as shown in FIG. 28B. Illustratively, an upper end of rod 308 is coupled to a front surface of upper alignment arms 302 and a lower end of rod 308 extends below upper alignment arm 302 in order to couple with torsion bar 308. Torsion bar 308 is positioned vertically intermediate upper and lower alignment arms 302, 304. As shown in FIG. 28C, forwardly-extending portions 308a of torsion bar 308 may be positioned below upper alignment arms 302 and half shafts 311 of rear final drive unit 258 (FIG. 38). More particularly, as shown in FIG. 28B, forwardly-extending portions 308a of torsion bar 308 may be bent and angled downwardly relative to a center portion 308b of torsion bar 308 in order to extend below half shafts 311 and couple with the lower ends of rods 309. In one embodiment, center portion 308b of torsion bar 308 may be approximately 4-7 inches above skid plate 86, and illustratively is approximately 5.9 inches above skid plate 86. As such, torsion bar 308 occupies a lower position on vehicle 2, which may lower the center of gravity of vehicle 2. Torsion bar 308 includes isolators 312. Torsion bar 308 is positioned below an exhaust assembly 280 of powertrain assembly 250 and isolators 312 may be configured to couple with frame assembly 20 and contact exhaust assembly 280, as shown in FIG. 8.

Figure 29A:
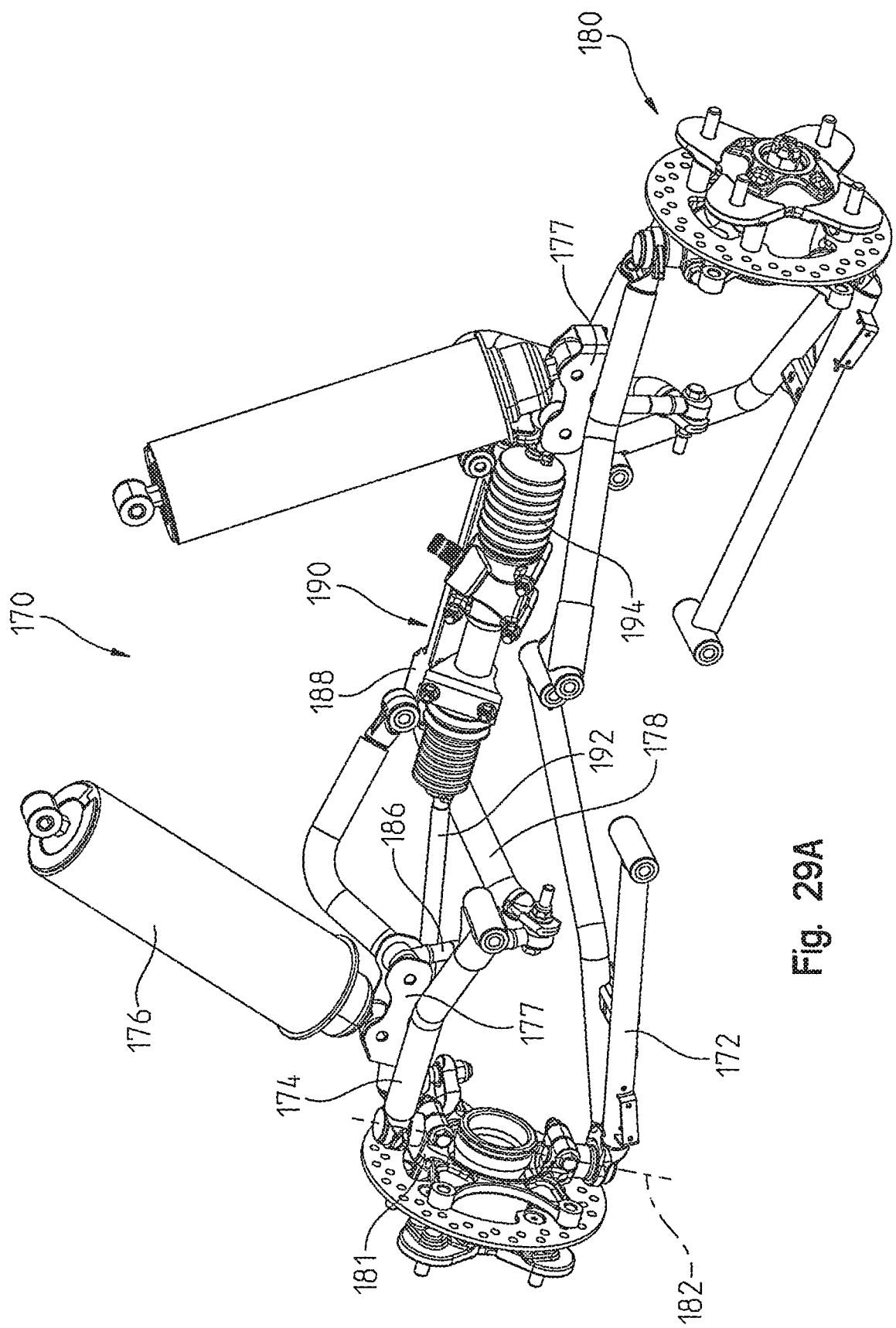
FIG. 29A is a left front perspective view of the front suspension assembly of FIG. 28.
Figure 29B:
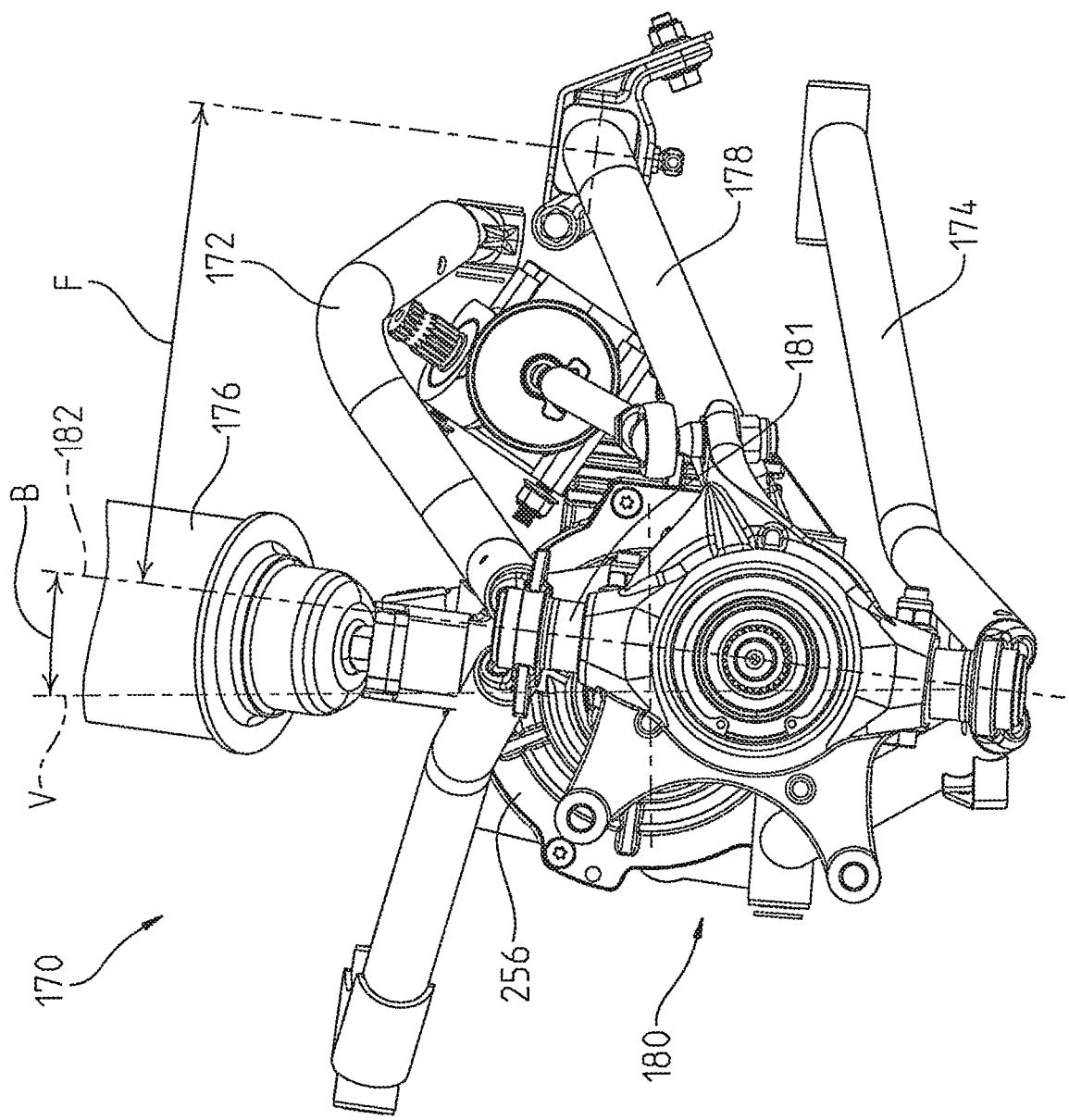
FIG. 29B is a left side view of a hub assembly of the front suspension assembly of FIG. 29A.
Figure 29C:
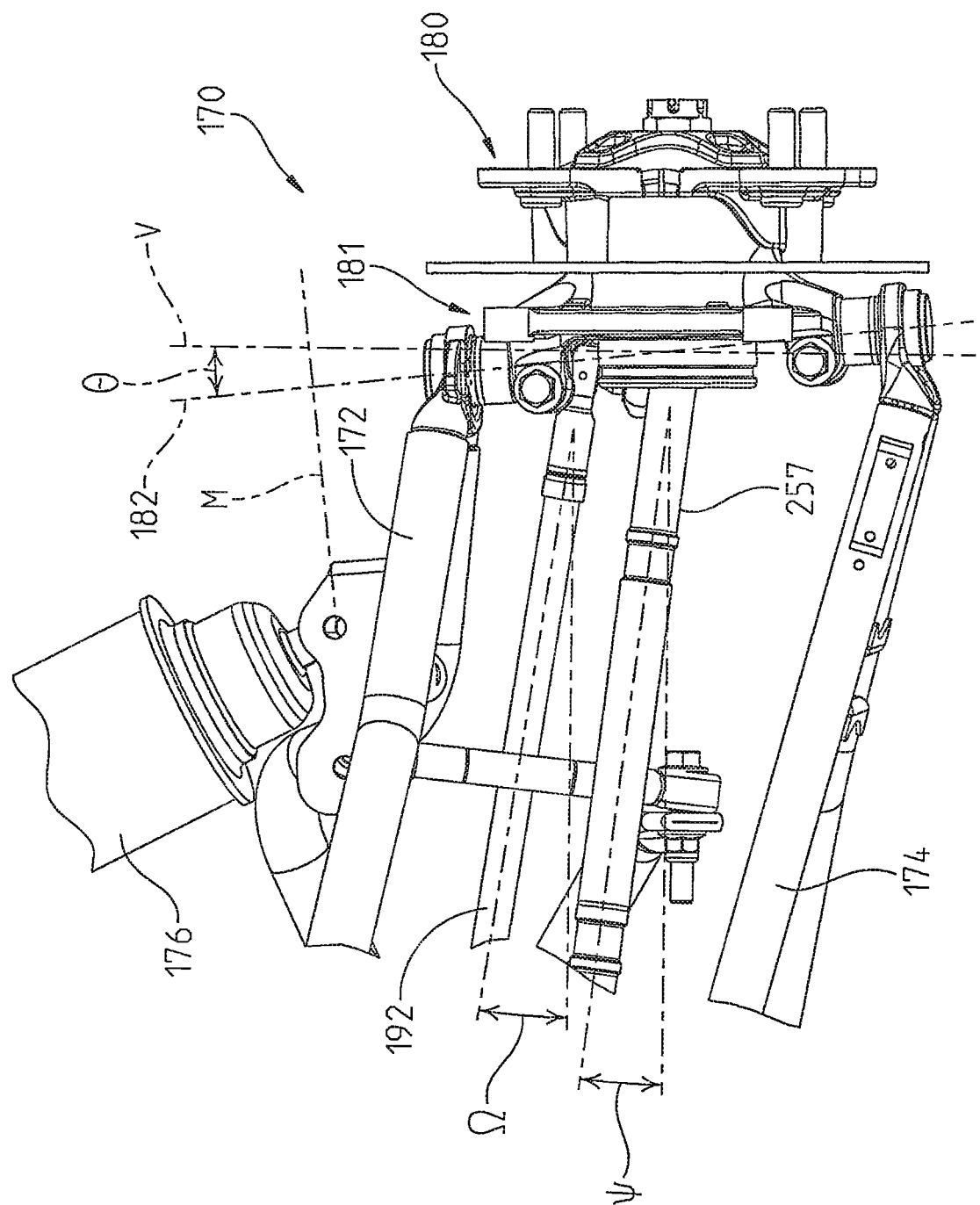
FIG. 29C is a front view of a portion of the front suspension assembly of FIG. 29A.
Figure 30:
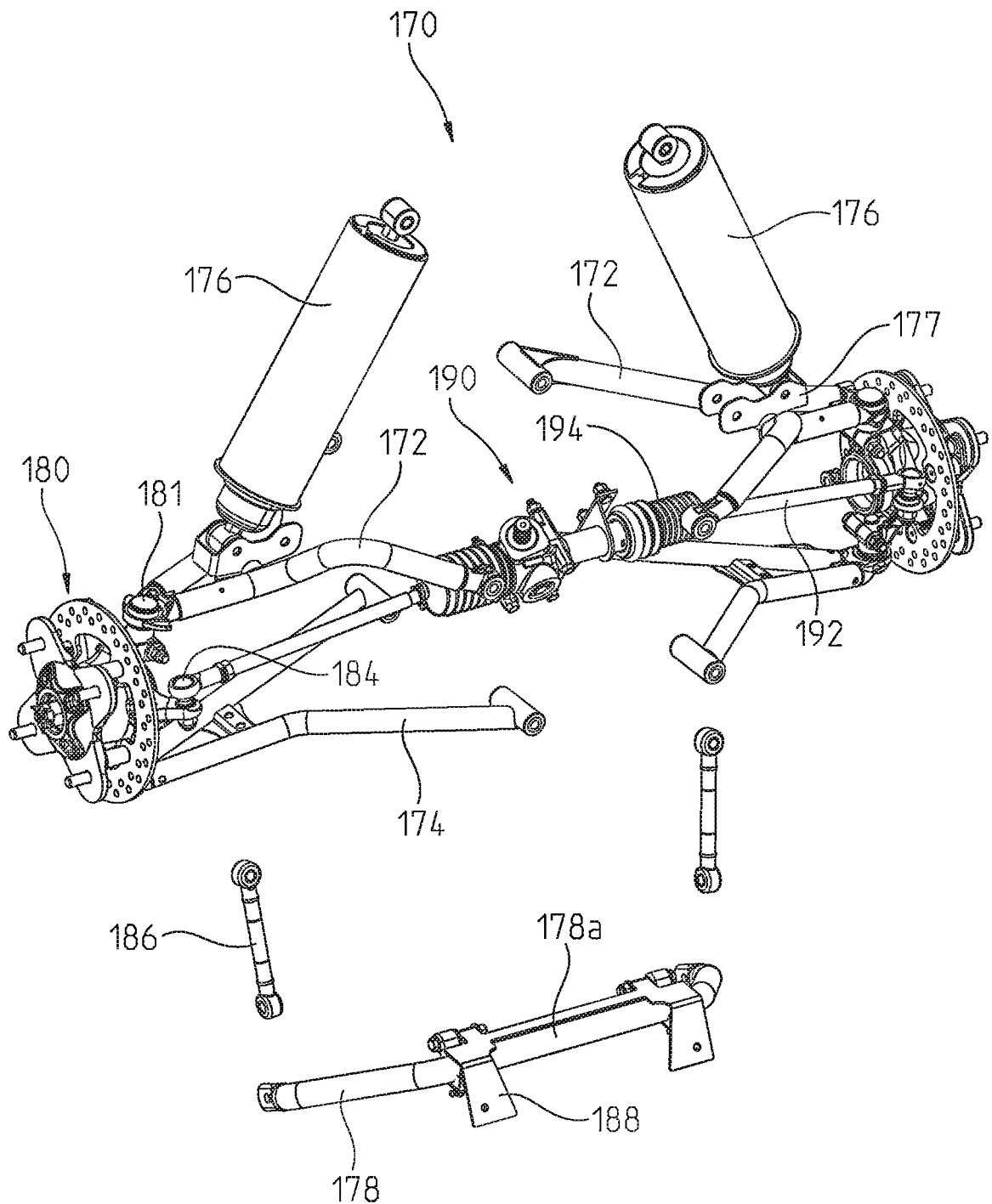
FIG. 30 is an exploded view of the front suspension assembly of FIG. 29A.
Figure 31A:
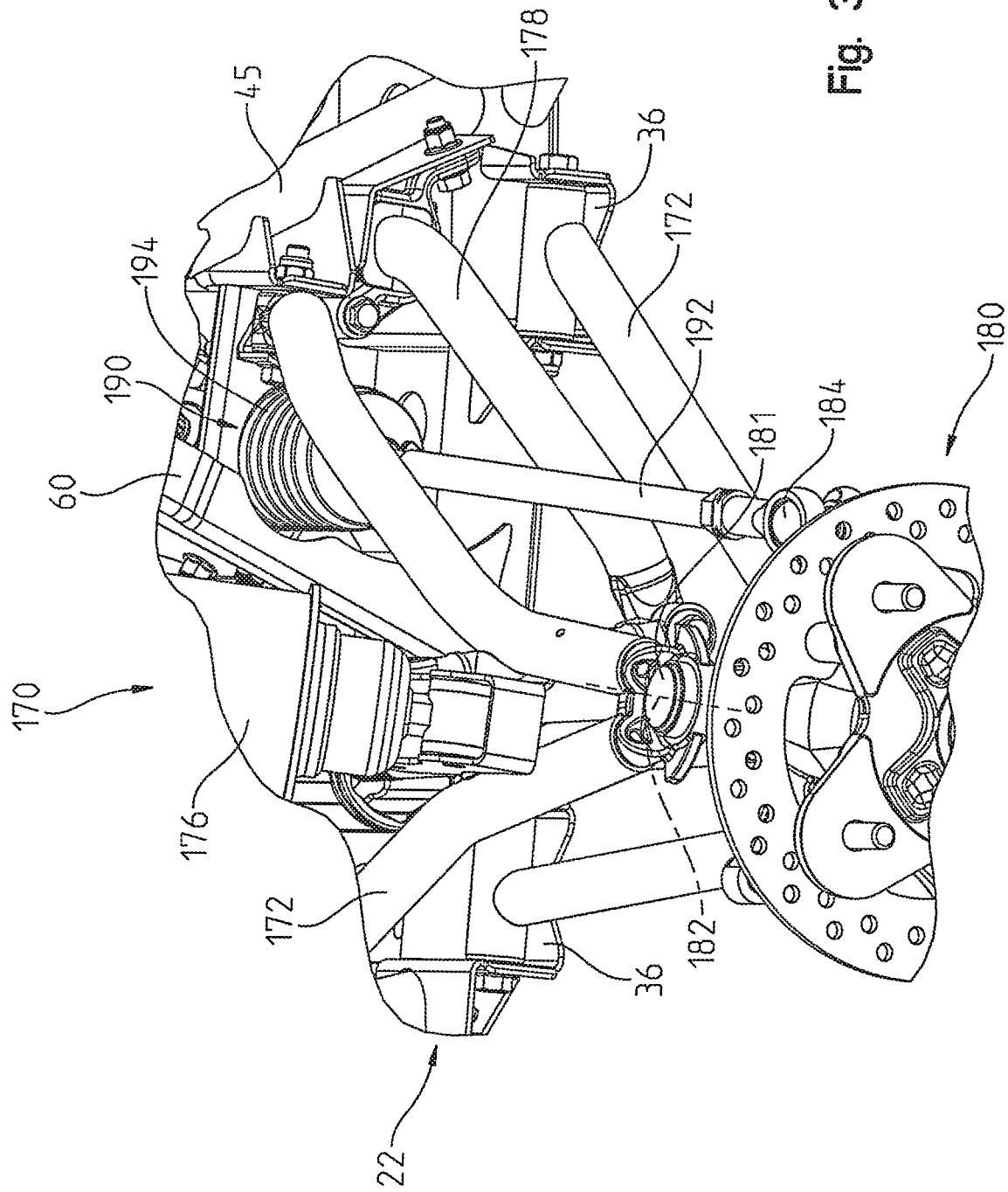
FIG. 31A is a left side view of the front suspension assembly of FIG. 29A and a steering assembly.

As shown in FIGS. 29-31, front suspension assembly 170 is configured as a dual alignment arm-type suspension and includes upper alignment arms 172, lower alignment arms 174, shock absorbers 176, and a torsion bar 178. In one embodiment, front suspension assembly 170 is configured for approximately 8-12 inches of travel. Illustrative front suspension assembly 170 is configured for approximately 10 inches of travel. An inner end of lower alignment arms 174 is coupled to alignment arm brackets 36 and an outer end of lower alignment arms 174 is coupled to a hub assembly 180 of front wheels 8. Illustrative lower alignment arms 174 include a rearward arm 174a and a forward arm 174b which are angled toward each other in order to couple with hub assembly 180. Additionally, forward arm 174b includes a bend 175 to further position the outer end of forward arm 174b inward. By bending and angling forward arm 174b inward, forward arm 174b does not contact an obstacle before front wheels 8.

Upper alignment arms 172 include a rearward arm 172a and a forward arm 172b. As with forward arm 174b, forward arm 172b is angled inwardly toward rearward arm 172a and, as such, does not contact an obstacle before front wheels 8. An inner end of upper alignment arms 172 is coupled to upper plate member 39 and brackets at front frame portion 22. An outer end of upper alignment arms 172 is coupled to hub assembly 180 of front wheels 8. More particularly, upper and lower alignment arms 172, 174 are coupled to hub assemblies 180 via a knuckle 181. Knuckle 181 has a steering axis of rotation, also called a king pin axis, 182. As shown in FIG. 29B, steering axis of rotation or king pin axis 182 is angled rearwardly relative to a vertical axis V. Illustratively, steering axis of rotation 182 is at a rearward angle β of approximately 5-10 degrees, and more particularly, 7.5 degrees, from vertical axis V. Additionally, as shown in FIG. 29C, front wheels 8 are angled inwardly such that knuckle 181 is angled inwardly relative to vertical axis V. Illustratively, knuckle 181 is angled inwardly at an angle θ of approximately 2-8 degrees, and more particularly, 5.0 degrees, from vertical axis V.

Rearward arm 172a of upper alignment arms 172 may bend upwardly in order to accommodate steering arms 192 of a power steering assembly 190 and/or the half shafts of front final drive unit 256. More particularly, steering arms 192 are positioned intermediate upper alignment arms 172 and lower alignment arms 174. Additionally, steering arms 192 are coupled to hub assemblies 180 at a joint 184, which is rearward of knuckle 181. As shown in FIGS. 29A-C and 31, joint 184 of steering arms 192 is rearward of steering axis of rotation 182.

Figure 31B:
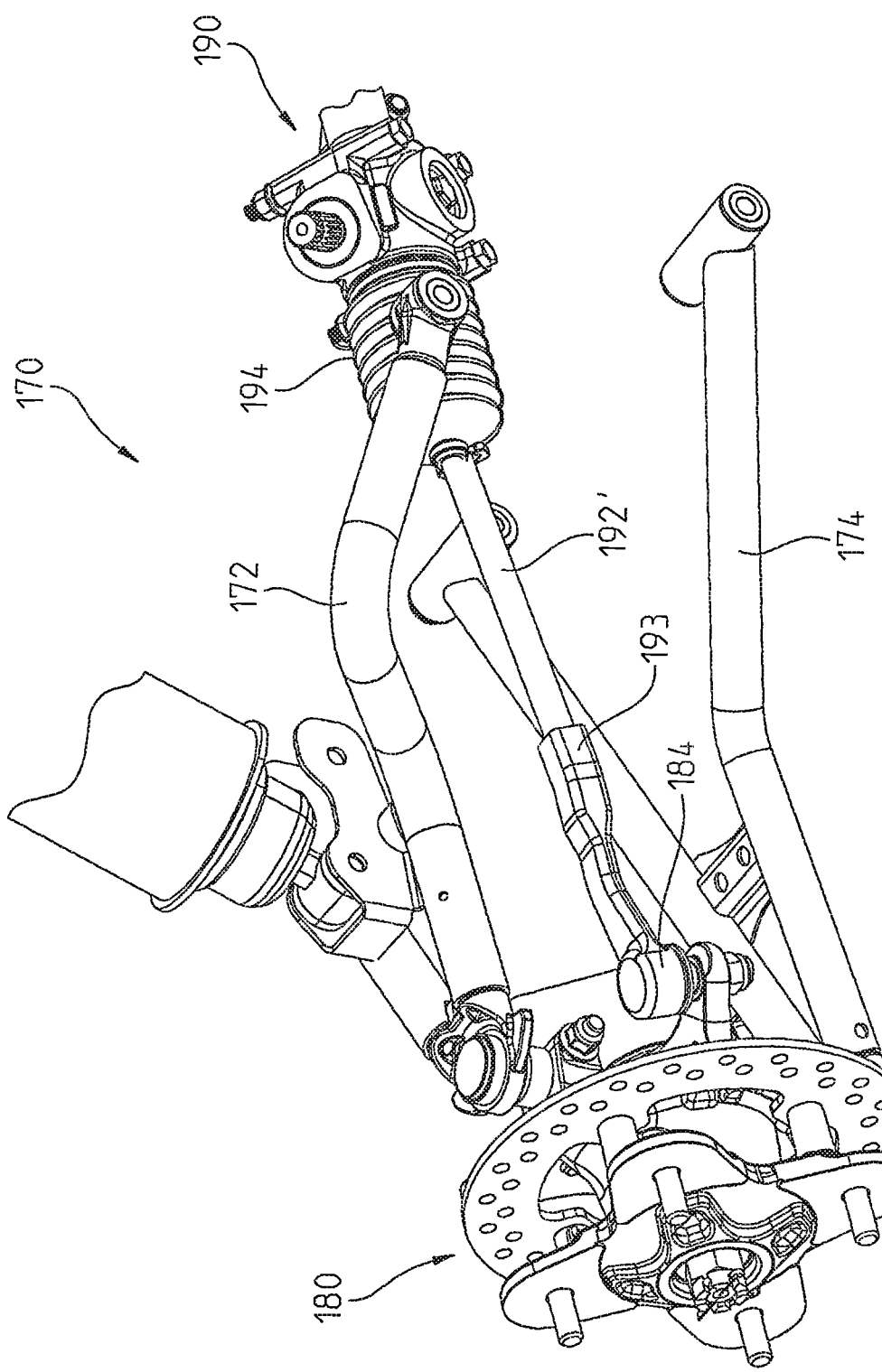
FIG. 31B is a left rear perspective view of an alternative embodiment steering arm of the steering assembly of FIG. 31A.

As shown in FIG. 31B, alternative steering arms 192' may be included with power steering assembly 190. For example, steering arms 192' may include a cast component 193 for coupling steering arms 192' to joint 184. Illustratively, cast component 193 may be comprised of aluminum. When power steering assembly 190 includes steering arms 192' with cast component 193, the weight of steering arms 192' may be reduced by approximately 40% compared to steering arms 192, which may include steel. As such, the center of gravity of vehicle 2 may be lowered by including steering arms 192' on vehicle 2.

Referring to FIGS. 28-31, the upper end of shock absorbers 176 is coupled to brace 46 at front frame portion 22. In one embodiment, brace 46 and the upper end of shock absorbers 176 may be approximately 18-23 inches above skid plate 86, and illustratively, is 21.6 inches above skid plate 86. The lower end of shock absorbers 176 are coupled to upper alignment arms 172 through a bracket 177. Additionally, referring to FIG. 29C, bracket 177 and the lower end of shock absorbers 176 may be approximately 2-6 inches from the steering axis of rotation 182 along line M, and illustratively, is approximately 4 inches from the steering axis of rotation 182. Bracket 177 is also coupled to rods 186, which extend generally vertically and also couple with torsion bar 178. Illustratively, shock absorbers 176 are operably coupled to torsion bar 178 with rods 186. As such, movement may be transmitted between torsion bar 178 and shock absorbers 176.

Shock absorbers 176 may be self-leveling or load-leveling shocks, for example Nivomat® shocks available from ZF Sachs AG Corporation of Germany. In one embodiment, shocks 176 include an incompressible fluid, such as oil, and a coil-over spring. When cargo and passengers are supported within vehicle 2, the ground clearance of vehicle 2 may be affected such that the ground clearance is reduced and vehicle 2 sits lower to the ground. As such, the bottom surface of vehicle 2 may scrape against the ground, obstacles, or other objects, during operation. However, shocks 176 are configured to selectively or automatically adjust the ride height of vehicle 2 to accommodate a load on vehicle 2 in order to maintain a consistent ground clearance. In other words, shocks 176 are configured to maintain the same ground clearance when vehicle 2 supports cargo and passengers as when vehicle 2 does not include any passengers or cargo.

In one embodiment, shocks 176 are configured to automatically adjust the ride height in response to a load on vehicle 2 in order to maintain a predetermined ground clearance. In another embodiment, the operator may be able to selectively adjust the ride height, either by manually adjusting a portion of shocks 176 or by activating an operator input from operator area 14. For example, if the terrain suddenly changes and includes large obstacles, the operator may selectively adjust shocks 176 to increase the ground clearance to accommodate the terrain.

In this way, because both shocks 176 of front suspension assembly 170 and shocks 306 of rear suspension assembly 300 include load-leveling shocks, vehicle 2 includes load-leveling shocks on all four corners thereof. Additionally, because shocks 176 and/or 306 are configured to adjust the ride height or ground clearance of vehicle 2, shocks 176 and/or shocks 306 are able to affect the center of gravity of vehicle 2. In one embodiment, the ride height of vehicle 2 may be lowered by approximately 1 inch in order to lower the center of gravity of vehicle 2.

Also, in a further embodiment, shocks 176 may be configured for continuous damping control, as detailed further in U.S. Provisional Patent Application Ser. No. 61/723,623, filed on Nov. 7, 2012, and U.S. Pat. No. 8,079,602, issued on Dec. 20, 2011, the complete disclosures of which are expressly incorporated by reference herein.

Torsion bar 178 is supported on frame assembly 20 with a bracket 188. More particularly, bracket 188 is coupled to second upstanding members 45 of front frame portion 22. Torsion bar 178 is positioned vertically intermediate upper alignment arm 172 and lower alignment arm 174. In one embodiment, a center portion 178a of torsion bar 178 (FIG. 30) is approximately 3-7 inches above skid plate 86, and illustratively, is approximately 4.9 inches above skid plate 86. Illustratively, torsion bar 178 extends rearwardly around a rear surface of a steering rack 194 of power steering assembly 190. Additionally, torsion bar 178 is positioned directly rearward of front final drive unit 256 such that steering rack 194 is positioned intermediate torsion bar 178 and front final drive unit 256. Illustratively, torsion bar 178 may be approximately 8-12 inches, and more particularly, 9.2 inches, rearward of front final drive unit 256 along a line F, as shown in FIG. 9B.

As with joint 184, steering rack 194 also is positioned rearward of steering axis of rotation 182 of knuckle 181. Additionally, steering rack 194 is positioned vertically intermediate upper alignment arm 172 and lower alignment arm 174, and is positioned longitudinally intermediate lower alignment arm brackets 36, as shown best in FIG. 31. In one embodiment, the center of steering rack 194 is positioned approximately 4-8 inches above skid plate 86, and illustratively, is approximately 5.6 inches above skid plate 86. By positioning steering rack 194 and torsion bar 178 intermediate upper and lower alignment arms 172 and 174, steering rack 194 and torsion bar 178 are at a low position on vehicle 2, which may lower the center of gravity of vehicle 2. Additional components of power steering assembly 190, for example an electric power steering unit (not shown), also may be positioned adjacent upper and lower alignment arms 172, 174 of front suspension assembly 170 to further lower the center of gravity of vehicle 2. In one embodiment, the electric power steering unit may be adjacent or incorporated into a top portion of steering rack 194 in order to lower the center of gravity of vehicle 2.

As shown in FIG. 29C, steering arms 192 are angled downwardly from steering rack 194 in order to couple with hub assemblies 180 at joint 184. In one embodiment, steering arms 192 may be at an angle $\Omega$ of approximately 6-10 degrees, and more particularly 8.6 degrees, from horizontal. By angling steering arms 192 downwardly, the suspension travel of front suspension assembly 170 may be increased without compromising the turning radius of front wheels 8. Additionally, half shafts 257 are operably coupled to hub assemblies 180 and front final drive unit 256 and also may be angled downwardly from front final drive unit 256 in order to couple with hub assemblies 180. For example, in one embodiment, half shafts 257 may be at an angle $\Psi$ of approximately 5-8 degrees, and more particularly 6.9 degrees, from horizontal. By angling the half shafts downwardly, the suspension travel also may be increased without compromising the steering angle or turning radius for front wheels 8.

Additional details of front suspension assembly 170 may be disclosed in U.S. Pat. No. 8,302,711, filed on Dec. 8, 2011, and issued on Nov. 6, 2012, the complete disclosure of which is expressly incorporated by reference herein.

Figure 32:
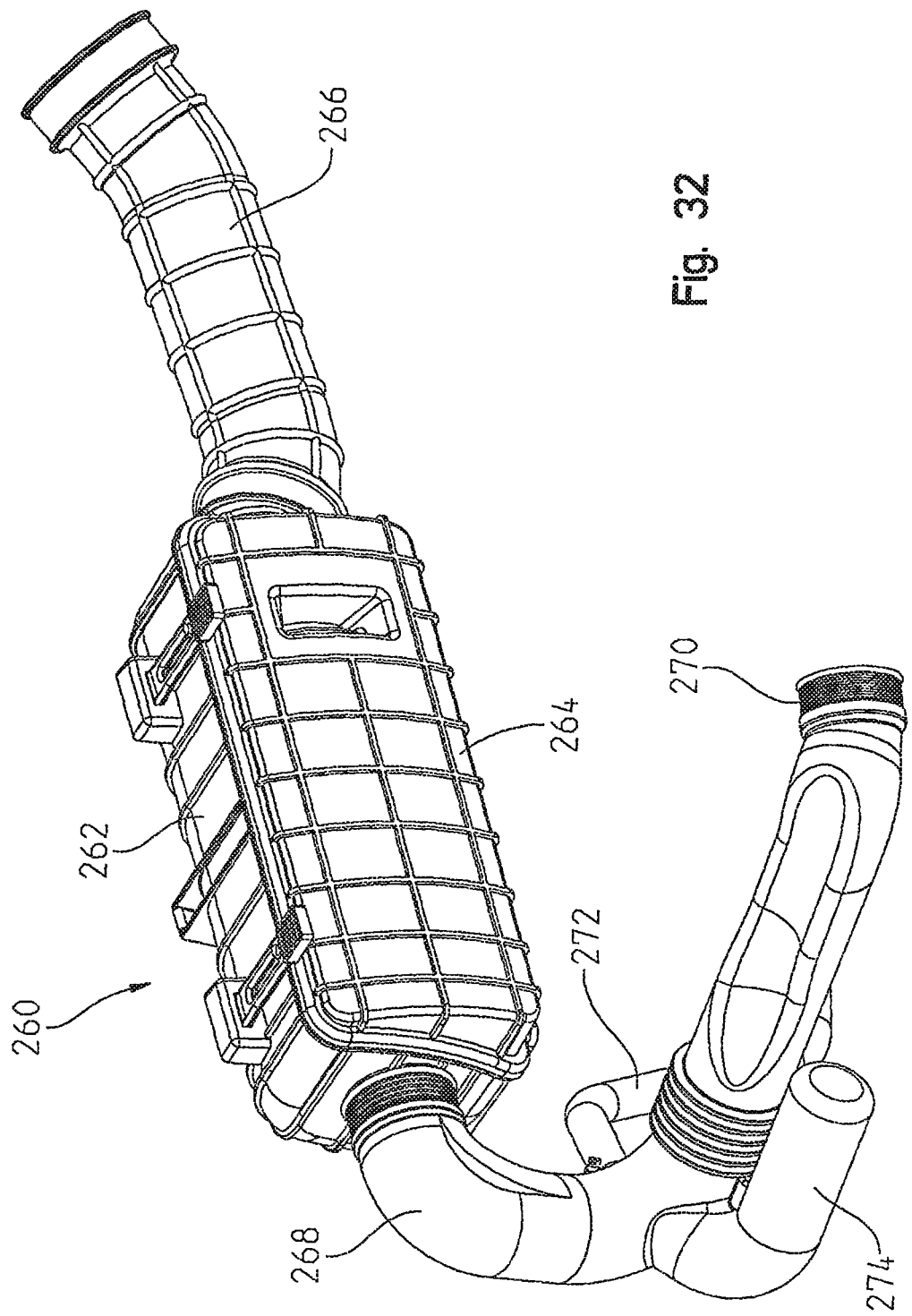
FIG. 32 is a left rear perspective view of an air intake assembly of the vehicle of FIG. 1.

Referring to FIG. 32, an air intake assembly 260 of vehicle 2 is shown. Air intake assembly 260 includes a filter housing 262 for supporting a filter (not shown) therein, a lid 264 removably coupled to filter housing 262, an intake tube 266, an outlet tube 268, a breather inlet tube 272, and a resonator tube, illustratively a quarter-wave tube 274. In one embodiment, the position of filter housing 262 may be adjusted to lower the center of gravity of vehicle 2. As shown, intake tube 266 pulls air from the right or passenger side of vehicle 2 and the air flows into filter housing 262 in order to flow through the filter therein. The filter removes particles, dust, dirt, and/or other debris from the air. Once cleaned, the air flows out of filter housing 262 and into outlet tube 268. Outlet tube 268 directs air toward engine 252 of powertrain assembly. More particularly, a port 270 of outlet tube 268 is fluidly coupled to the throttle bodies of engine. Additionally, a smaller portion of air in outlet tube 268 may flow through breather inlet tube 272, which directs air to the breather of engine 252.

Quarter-wave tube 274 is also fluidly coupled to outlet tube 268 in order to decrease the noise of air intake assembly 260. More particularly, air intake assembly 260 is positioned rearward of seats 15 and, therefore, noise from air intake assembly 260 may be heard within operator area 14. However, by providing a resonator, such as quarter-wave tube 274, the noise from air intake assembly 260 may be reduced. As shown in FIG. 32, quarter-wave tube 274 is positioned on the "clean" side of filter housing 262 (i.e., is fluidly coupled to outlet tube 268). Alternatively, as shown in FIG. 32A, an alternative embodiment quarter-wave tube 274' may be positioned on the "dirty" side of filter housing 262 such that quarter-wave tube 274' may be fluidly coupled to an intake tube 266'.

Figure 32A:
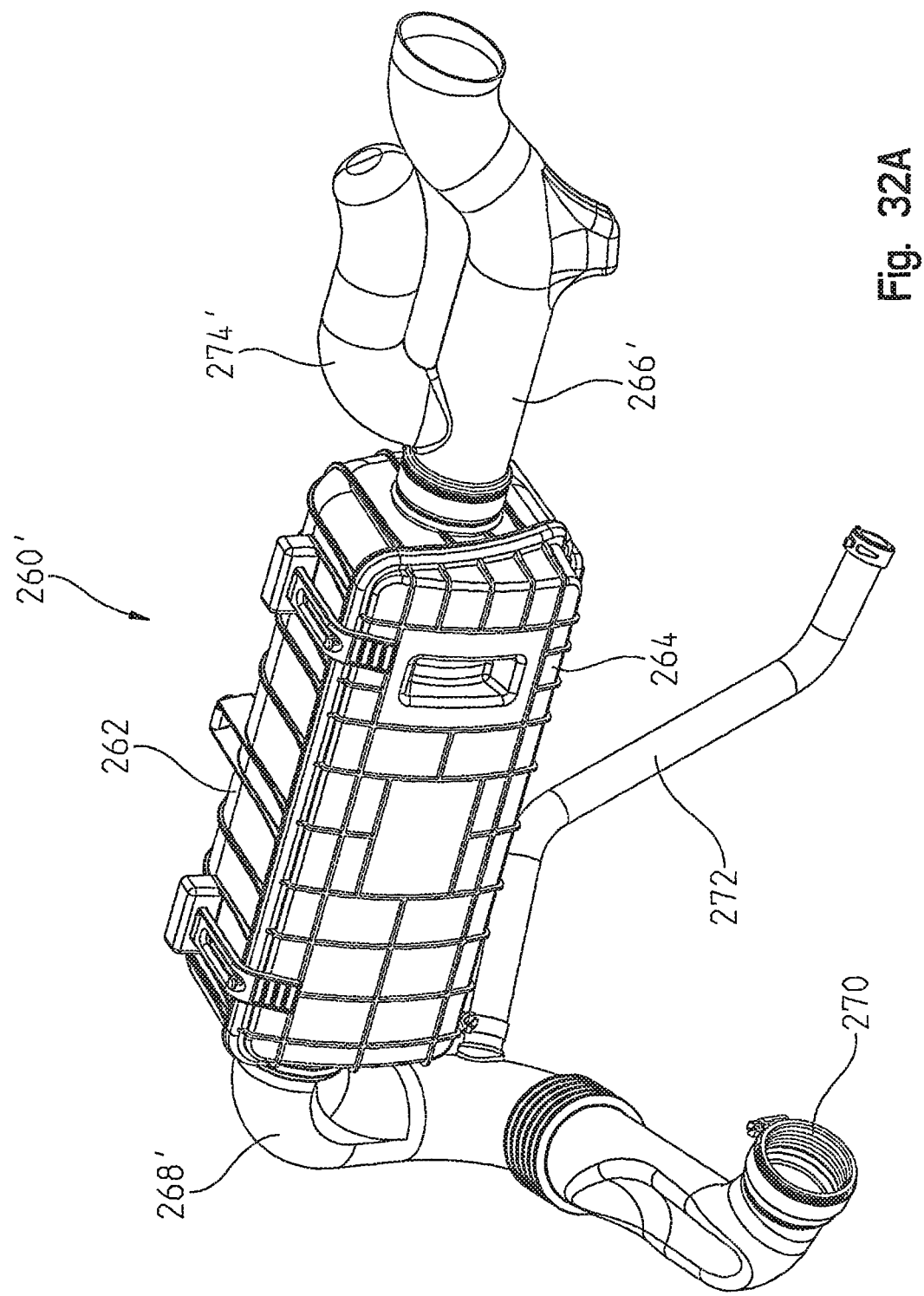
FIG. 32A is a right rear perspective view of an alternative embodiment air intake assembly of the vehicle of FIG. 1.
Figure 32C:
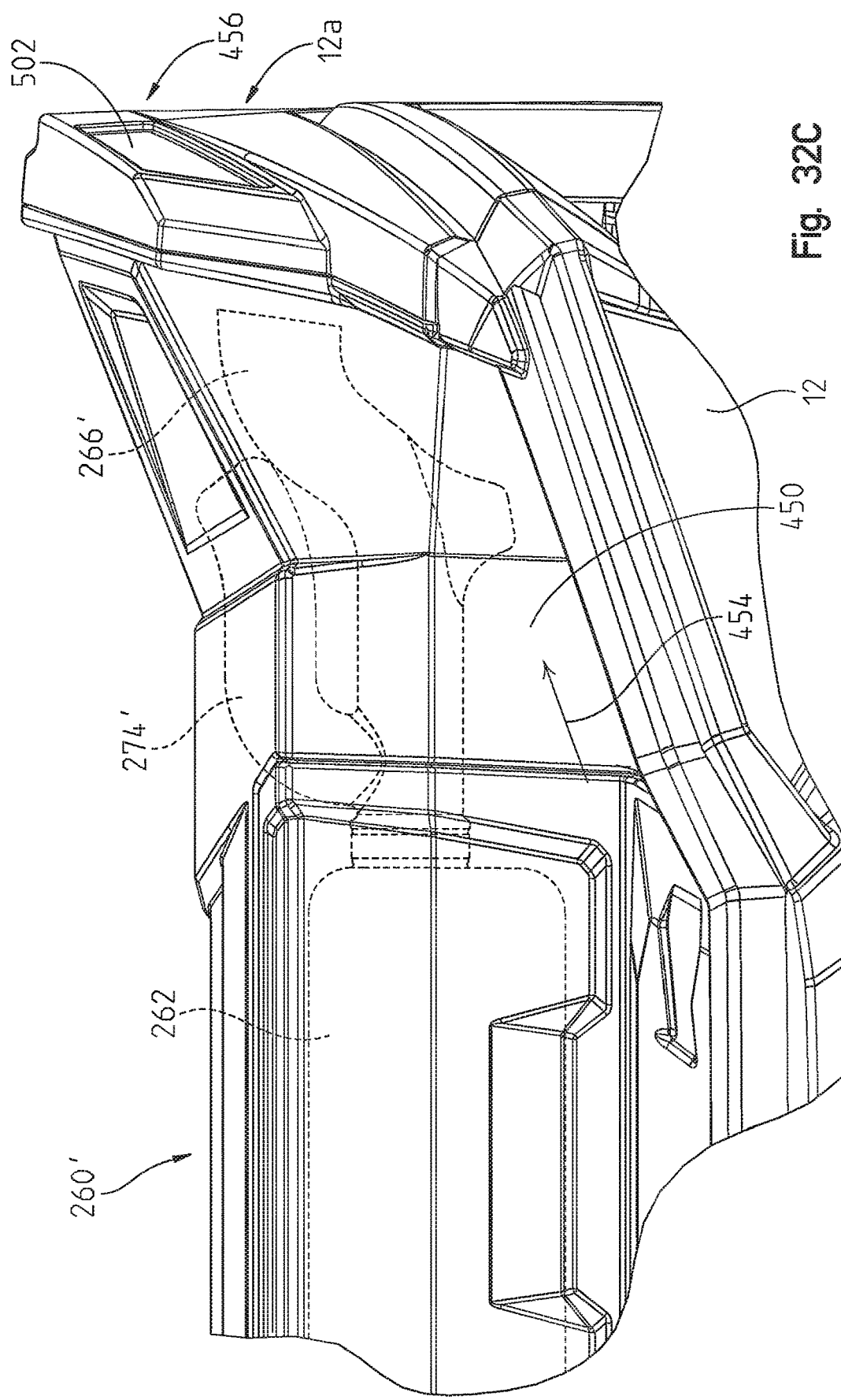
FIG. 32C is a rear view of a portion of the air intake assembly of FIG. 32B.
Figure 32E:
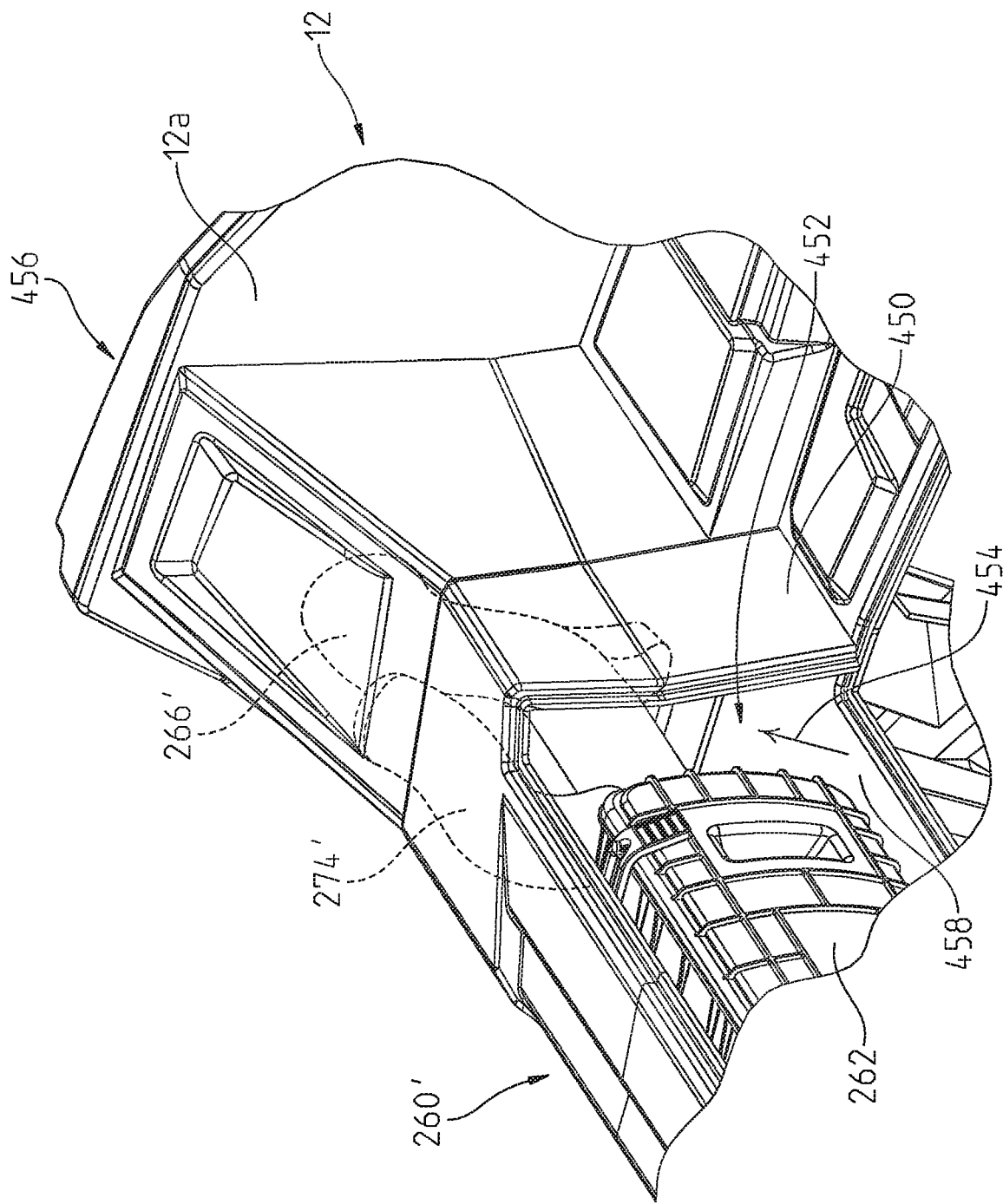
FIG. 32E is a left rear perspective view of the portion of the air intake assembly of FIG. 32D positioned within a portion of the cargo box.

An alternative embodiment of air intake assembly 260 is shown as air intake assembly 260' in FIGS. 32A-32E. Air intake assembly 260' includes filter housing 262, intake tube 266', an outlet tube 268', breather inlet tube 272, and quarter-wave tube 274'. The configuration and operation of illustrative air intake assembly 260' is described herein. It should be understood that the configuration and operation of air intake assembly 260 may be the same as that for air intake assembly 260'. As shown in FIG. 32A, air intake assembly 260' is positioned within a forward portion of cargo box 12. More particularly, air intake assembly 260' is positioned between side walls 12a and 12b of cargo box 12, such that intake tube 266' is positioned adjacent or generally in proximity to side wall 12a, and outlet tube 268' is adjacent or generally in proximity to side wall 12b. Additionally, air intake assembly 260' is positioned forward of removable panel 13 (FIG. 5). A cover 450 of cargo box 12 is positioned generally around air intake assembly 260', as shown in FIGS. 32C and 32E. Illustratively, air intake assembly 260' is positioned with a chamber 452 defined by cover 450 and a top surface 458 of cargo box 12.

As shown in FIGS. 32C and 32D, intake tube 266' is spaced apart from side wall 12a of cargo box. As such, intake tube 266' also is spaced apart from engine intake port 502. In this way, intake tube 266' is not in direct contact with side wall 12a of cargo box 12 or engine intake port 502. With intake tube 266' spaced apart from side wall 12a, intake tube 266' can pull air into filter housing 262 from multiple locations. For example, as shown in FIGS. 32C-32E, air may flow in the direction of arrow 456 in order to flow into intake tube 266' through engine intake port 502. Additionally, air may flow in the direction of arrow 454 in order to flow into intake tube 266' through chamber 452. As such, if engine intake port 502 becomes clogged with dirt, debris, snow, mud, or is otherwise blocked, air can continue to flow into air intake assembly 260' through chamber 452. In one embodiment, a primary air volume for air intake assembly 260' is defined by the volume of air flowing in direction 456, and a secondary air volume for air intake assembly 260' is defined by the volume of air flowing in direction 454. In other embodiments, the balance of air flowing into intake tube 266' through engine intake port 502 and chamber 452 may be balanced, regulated, or otherwise. In a further embodiment, air may be pulled into variable clutch assembly 254 (FIG. 38) in the same manner described herein for engine 252.

Figure 33:
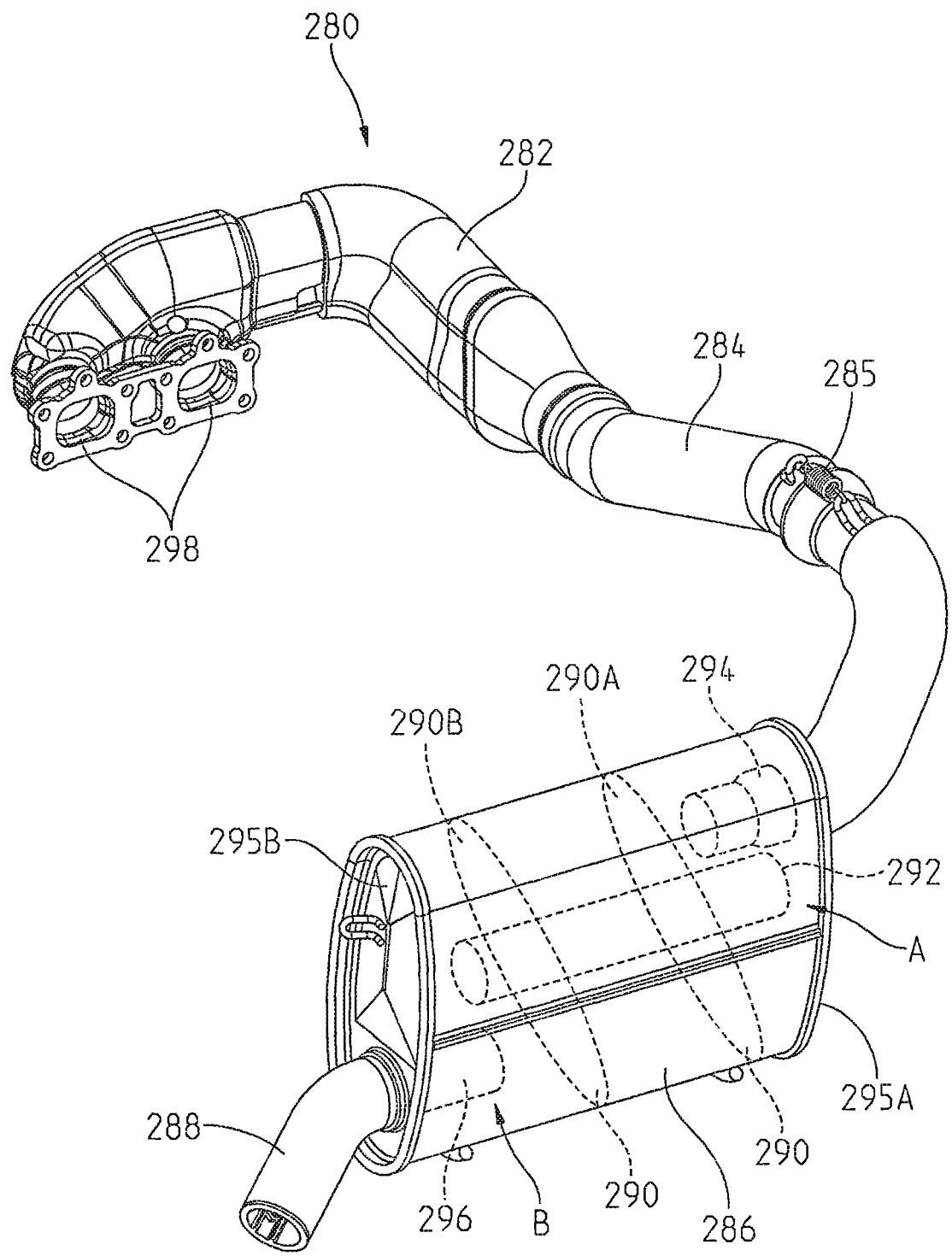
FIG. 33 is a left rear perspective view of an exhaust assembly of the vehicle of FIG. 1.

As shown in FIG. 33, exhaust assembly 280 of powertrain assembly 250 includes an inlet body 282, an inlet tube 284, an outlet tube or tailpipe 288, and an exhaust body or muffler 286. In one embodiment, inlet tube 284 may be configured with multiple tube portions, which are coupled together with a coupler 285. Exhaust body 286 may include a plurality of baffle plates 290 and a filter tube 292. Exhaust assembly 280 is supported by rear frame portion 26 at rear end 6 of vehicle 2. As shown in FIG. 8, exhaust body 286 may be further supported on isolators 312 of rear suspension assembly 300.

The outer surface of exhaust assembly 280 may be wrapped or otherwise surrounded by an insulation material, for example a fiberglass insulation wrap available from The 3M Company. In assembly, the wrap may be wound around exhaust assembly 280, heated, and then allowed to cool such that the wrap ultimately forms a hard cast-type material around exhaust assembly 280. In one embodiment, at least exhaust body 286 may be perforated such that when the insulation wrap is applied thereto and heated, the insulation may expand and a portion of the insulation will penetrate the perforations and generally extend into the interior of exhaust body 286. Alternative embodiments of insulation material also may be used. By using the insulation wrap, rather than a rigid shield, the thickness of the wrap and, therefore, the insulation provided to exhaust assembly 280, may be customized and adjusted.

Figure 33A:
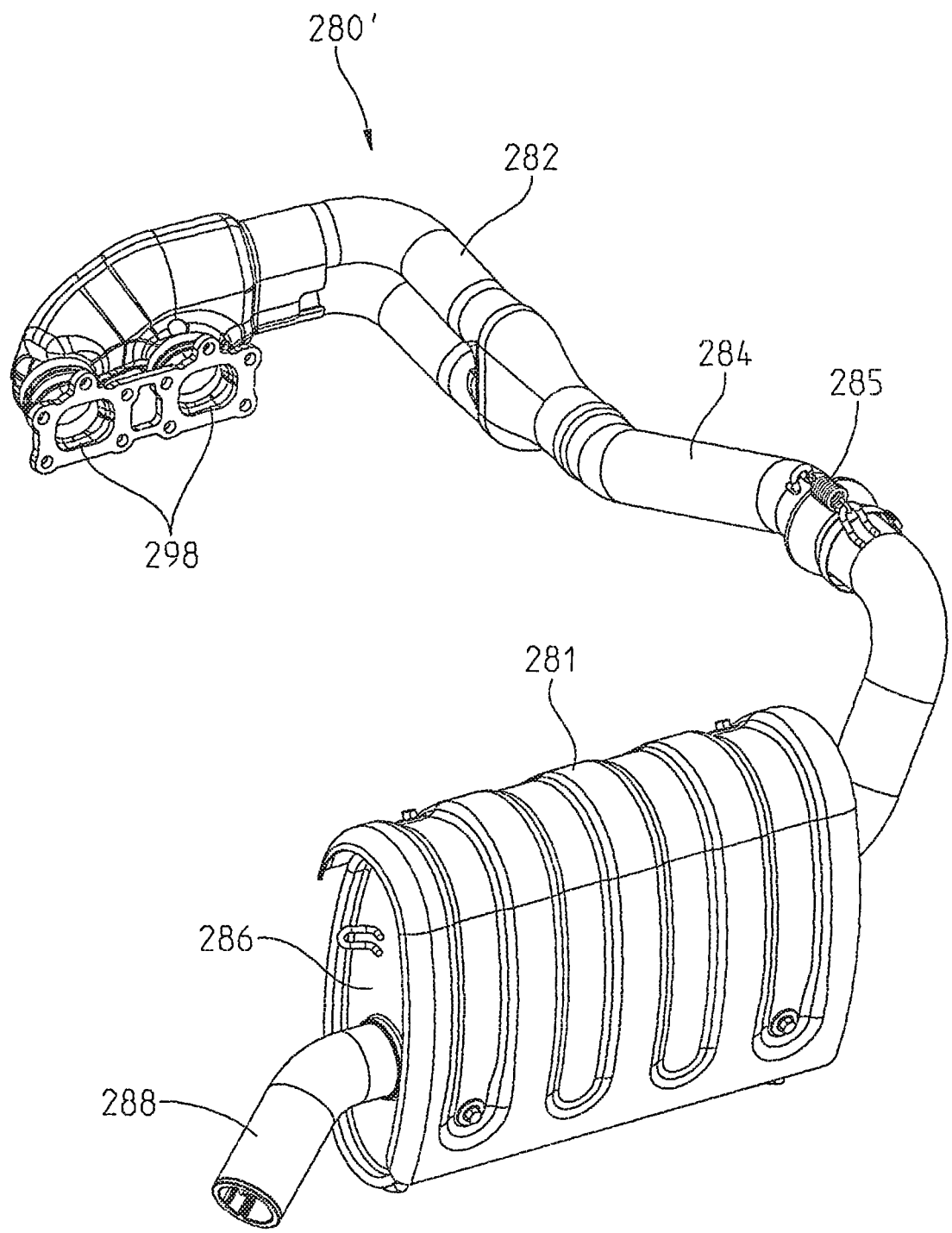
FIG. 33A is a left rear perspective view of an alternative embodiment exhaust assembly of the vehicle of FIG. 1.

As shown in FIG. 33A, an alternative embodiment exhaust assembly 280' includes inlet body 282, inlet tube 284, outlet tube or tailpipe 288, and exhaust body 286. Additionally, exhaust assembly 280' includes a heat shield 281, rather than a fiberglass insulation wrap or other insulating material or object, to insulate exhaust body 286. Illustratively, heat shield 281 is coupled to exhaust body 286 with conventional fasteners, for example bolts, screws, welds, rivets, and/or adhesive.

In operation, exhaust from engine 252 flows through ports 298 and into inlet body 282. The exhaust in inlet body 282 flows into inlet tube 284, into exhaust body 286 through an inlet port 294, and exits vehicle 2 through port 296 of outlet tube 288.

The internal geometry of exhaust body 286 may affect the sound emanating from exhaust assembly 280. More particularly, the internal geometry of exhaust body 286 may be configured to reduce or eliminate the effects of acoustical standing waves therein. It is known that mufflers may include parallel baffle walls to define an expansion chamber volume within the muffler. The baffle plates are typically oriented in a generally vertical configuration such that the baffle plates may be generally perpendicular to the flow of air and sound within the muffler. As such, the muffler may include a plurality of parallel surfaces. However, as sound reflects off of these parallel surfaces within the muffler, it can create standing waves in the expansion chamber, which may create frequencies at which the muffler is less effective.

In order to reduce or eliminate the amplification effects due to reflections, baffle plates 290 within exhaust body 286 are angled and oriented in a diagonal configuration therein. Additionally, by positioning filter tube 292 between baffle plates 290, amplification effects due to the reflections may be further reduced or eliminated altogether.

In operation, as sound enters exhaust body 286 through inlet port 294, the sound may reflect off of diagonal baffle plates 290. As such, the sound is reflected at an angle away from inlet port 294 and bounces around a first chamber A, which is defined by a first baffle plate 290A, a first wall 295A of exhaust body 286, and the corresponding inner surface of exhaust body 286. Illustratively, first chamber A is generally triangularly shaped. By reflecting the sound in an angled manner about triangularly-shaped chamber A, the sound does not reinforce on itself because the sound does not bounce off of parallel walls. The sound is then transferred through filter tube 292 and a filter therein dampens the sound before the sound exits into a second chamber B. Despite the generally parallel configuration of baffle plates 290, the sound flowing between baffle plates 290 is negligible because filter tube 292 dampens the sound. Furthermore, an alternative embodiment of baffle plates 290 may include curved surfaces such that the surfaces of baffle plates 290 are not parallel to each other.

Second chamber B is similar to first chamber A in that second chamber B also is generally triangularly shaped and is defined by a second wall 295B of exhaust body 286, a second baffle plate 290B, and the corresponding inner surface of exhaust body 286. By reflecting the sound in an angled manner about triangularly-shaped chamber B, the sound does not reinforce on itself because the sound does not bounce off of parallel walls. As such, the sound exiting exhaust body 286 through port 296 and outlet tube 288 is not reinforced, but rather, is reduced or generally eliminated.

Referring to FIG. 34, an alternative embodiment of exhaust assembly 280 is shown as exhaust assembly 280', with like reference numerals indicating like parts having like structure and functionality. Exhaust assembly 280' may be configured as an active exhaust assembly and includes a first exhaust body 297, a second exhaust body 286', an inlet tube 284', an outlet tube or tailpipe 288', an first tube 291, a second tube 293, and a valve assembly 299. Exhaust assembly 280' is configured to operate in a high-flow mode and a low-flow mode. In the high-flow mode, a substantial amount or all of the exhaust flowing from engine 252 flows through exhaust assembly 280' along an unrestricted path and exits from outlet tube 288'. As a result of the unrestricted flow path, little backpressure builds within exhaust assembly 280' and a loud sound emanates from exhaust assembly 280' such that vehicle 2 operates in a high-performance, sport mode. Conversely, when vehicle 2 is in the low-flow mode, the exhaust from engine 252 is reduced when flowing through exhaust assembly 280'. Additionally, the exhaust may flow through a restricted path. As a result, the backpressure increases within exhaust assembly 280' and a quieter sound emanates from exhaust assembly 280 such that vehicle 2 operates in a restrained and muted or quiet mode.

Exhaust assembly 280' may be configured to toggle only between the high-flow mode and the low-flow mode. Alternatively, exhaust assembly 280' may be configured for an infinite number of flow options between the two modes. For example, the operator may be able to switch between the high-flow mode and the low-flow mode with a mechanical valve system, which may include a lever and a pulley to regulate the flow of exhaust through exhaust assembly 280'. Additionally, the operator may switch between the high-flow mode and the low-flow mode with an electrical system, which may include an electrical switch to toggle between the high-flow mode and the low-flow mode. Alternatively, the electrical system may include a solenoid-operated butterfly valve, which may be configured to open and close in an infinite number of positions to regulate the flow of exhaust through exhaust assembly 280. Further still, exhaust assembly 280' may include an electrical valve operably coupled to the engine control unit ("ECU") of vehicle 2 in order to regulate the flow of exhaust based on the throttle position.

In one embodiment, exhaust assembly 280' operates by coupling a butterfly valve 299a and a solenoid 299b of valve assembly 299 to first tube 291. First tube 291 is fluidly coupled to outlet tube 288' and provides an unrestricted flow path for the exhaust between inlet tube 284' and outlet tube 188'. Second tube 293 is positioned below first tube 291 and is fluidly coupled to first exhaust body 297 and second exhaust body 286'. The flow of exhaust through second tube 293 and second exhaust body 286' may be restricted. For example, a plurality of baffle plates/walls or a series of cross-over tubes may be positioned within second exhaust body 286' in order to restrict the flow of exhaust therethrough.

In operation, when the operator desires to operate vehicle 2 in the high-flow, loud, sport mode, for example when the operator drives vehicle 2 in sparsely-populated areas or at open throttle, solenoid 299b will receive a signal to open valve 299a to allow a substantial portion or all of the exhaust entering first exhaust body 297 from inlet tube 284' to flow into first tube 291 and into outlet tube 288' through an unrestricted path. As such, the exhaust bypasses the restricted flow path through second tube 293 and, therefore, little backpressure builds within exhaust assembly 280'. As a result, a loud and sportier sound is produced. The high-flow mode may correspond to an open throttle position such that the high-flow mode may be engaged when vehicle 2 is accelerating, operating at high speeds, and/or in a sport or high-performance drive mode. Exhaust assembly 280' may be configured to allow the operator to selectively engage the high-flow mode when it is desirable to operate vehicle 2 in the sport drive mode. Alternatively, the ECU may automatically operate exhaust assembly 280' in the high-flow mode when vehicle 2 is in the high-performance, sport drive mode or at open throttle.

Conversely, when the operator desires to operate vehicle 2 in the low-flow, quiet, restrained mode, for example when the operator drives vehicle 2 in cruise control or in a densely-populated area, such as a neighborhood, solenoid 299b will receive a signal to at least partially close valve 299a to restrict the amount of exhaust entering first exhaust body 297 from inlet tube 284' to flow into first tube 291 and outlet tube 288'. Rather, a substantial portion or all of the exhaust entering first exhaust body 297 from inlet tube 284' is diverted to second tube 293, where the exhaust flows into second tube 293 and through a restricted flow path in second exhaust body 286'. As such, backpressure builds within exhaust assembly 280' and only a quiet, muted noise is produced. The low-flow mode may correspond to a partially-closed throttle position such that low-flow mode may be engaged when vehicle 2 is decelerating, operating in cruise control, operating at low speeds, and/or in non-sport drive mode. Exhaust assembly 280' may be configured to allow the operator to selectively engage the low-flow mode when it is desirable to operate vehicle 2 in the non-sport drive mode, for example when driving in a neighborhood. Alternatively, the ECU may automatically operate exhaust assembly 280' in the low-flow mode, at specific throttle positions, or when vehicle 2 is in the non-sport drive mode.

In one embodiment, the position of exhaust assembly 280 or 280' may be lowered in order to lower the center of gravity of vehicle 2.

Figure 35:
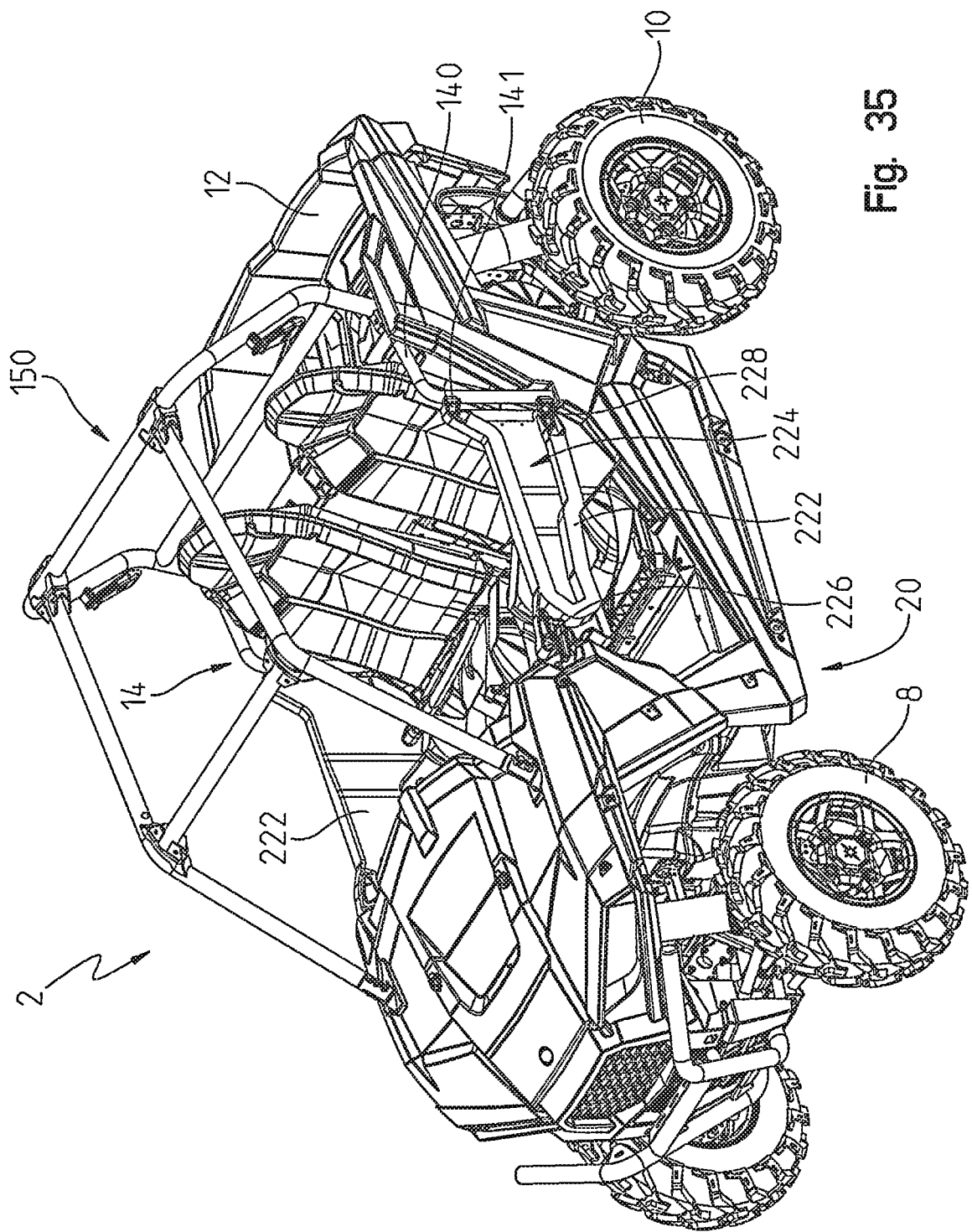
FIG. 35 is a left front perspective view of doors of the vehicle of FIG. 1.

As shown in FIG. 35, utility vehicle 2 may include doors 222. Doors 222 include a recessed outer portion 224. The recessed outer portion 224 decreases the weight of doors 222, which may decrease the overall weight of vehicle 2 and, therefore, lower the center of gravity of vehicle 2.

The inner surface of doors 222 is generally flat and smooth. In one embodiment, the inner surface of doors 222 may be angled or curved outwardly to increase the space within operator area 14 for the operator and passenger. Alternatively, doors 222 may include a living hinge which allows at least a portion of doors 222 to extend outwardly to further increase the space within operator area 14. With the curved or outwardly-extending configuration of doors 222, the comfort of the operator and the passenger within operator area 14 may be improved.

Doors 222 are coupled to bolster bars 140 with hinges 228. Hinges 228 are coupled to tabs 141 of bolster bars 140. Additionally, doors 222 include a latch assembly 226, which operably couples to frame assembly 20. In one embodiment, doors 222 may be at least partially comprised of aluminum and plastic, thereby making doors 222 light-weight. As such, doors 222 may decrease the weight of vehicle 2 and lower the center of gravity of vehicle 2. In one embodiment, vehicle 2 may include side nets, rather than doors 222. The side nets may be configured to latch in a similar manner to latch assembly 226. Further details about doors 222 of vehicle 2 may be disclosed in U.S. Provisional Patent Application Ser. No. 61/829,743, filed on May 31, 2013, the complete disclosure of which is expressly incorporated by reference herein.

Figure 36:
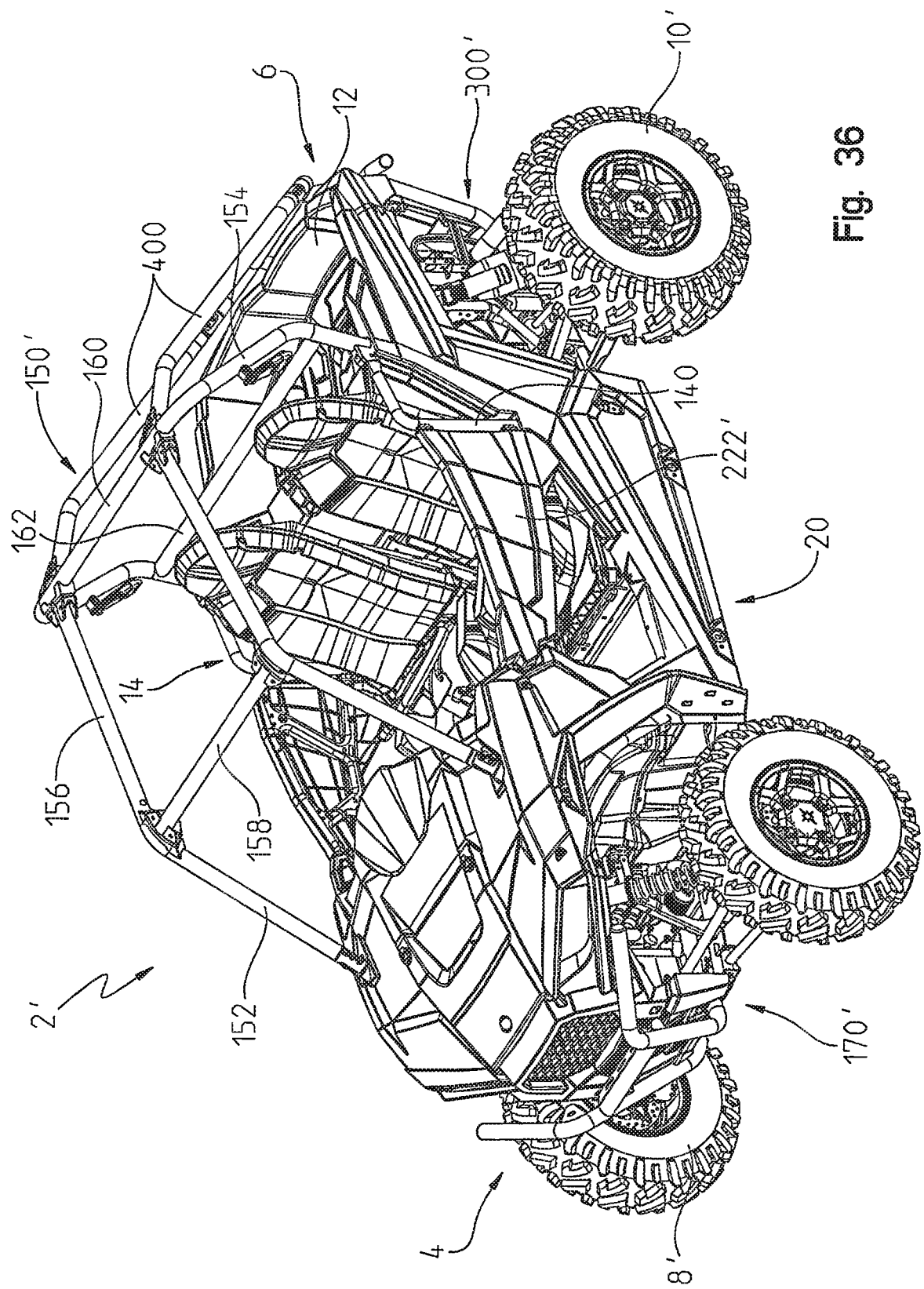
FIG. 36 is a left front perspective view of an alternative embodiment vehicle of the vehicle of FIG. 1.
Figure 37:
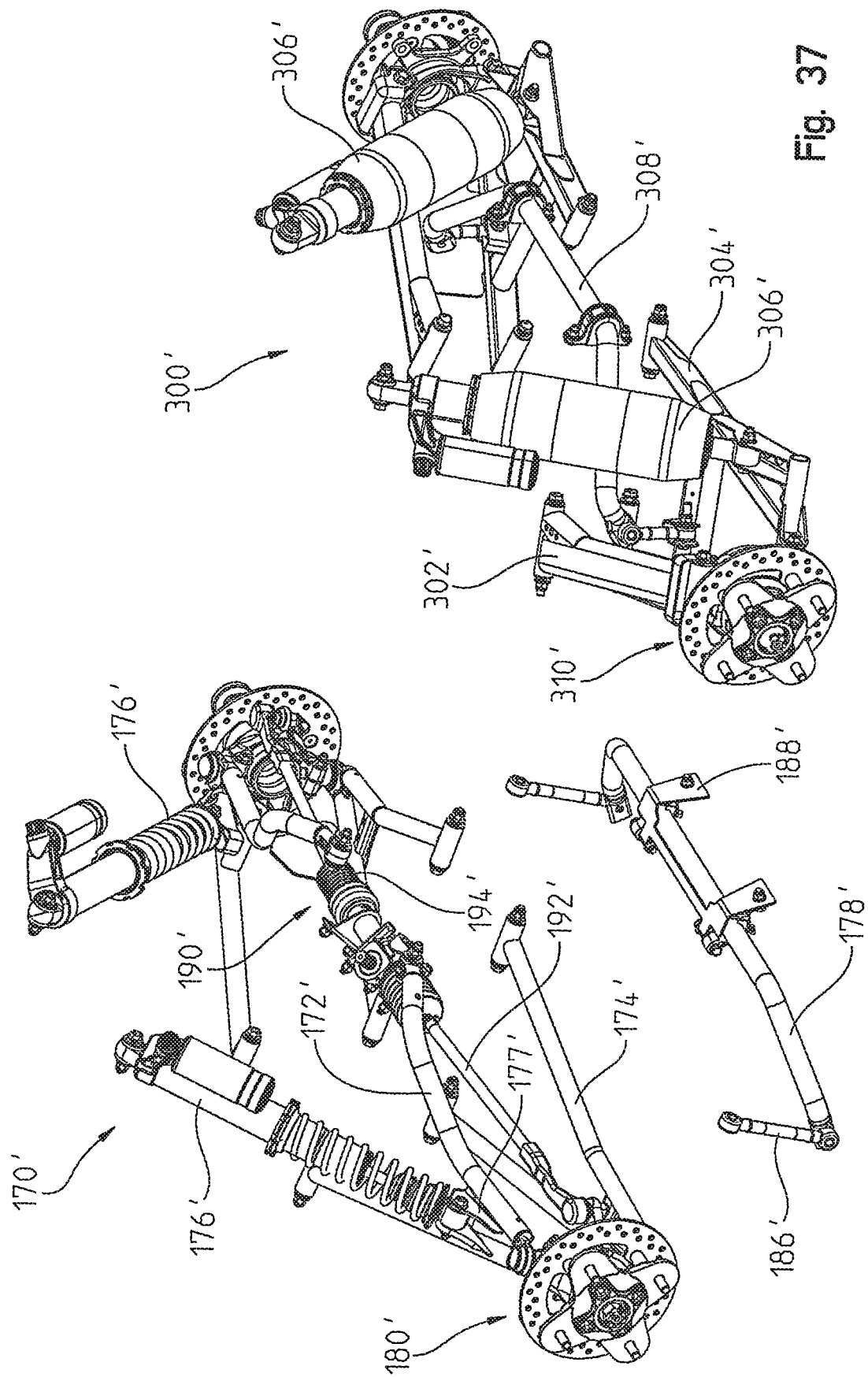
FIG. 37 is a left rear perspective view of a front suspension assembly and a rear suspension assembly of the alternative embodiment vehicle of FIG. 36.

Referring to FIGS. 36 and 37, an alternative embodiment of utility vehicle 2 is shown as utility vehicle 2'. Utility vehicle 2' of FIGS. 36 and 37 is similar to utility vehicle 2 of FIGS. 1-35, with like reference numerals indicating like parts having like structure and functionality, except as detailed herein. As shown in FIG. 36, utility vehicle 2' has front end 4 and rear end 6. A plurality of ground engaging members, including front wheels 8' and rear wheels 10', support utility vehicle 2' on the ground surface. Illustratively, the width between the outer sides of rear wheels 10' defines a width of vehicle 2', which may be approximately 50-65 inches. Illustratively, the width between the centers of the hubs of rear wheels 10 is approximately 60 inches, when measured at ride height without any payload.

Referring to FIG. 36, a cab frame assembly 150' is coupled to frame assembly 20 and includes front upstanding members 152, rear upstanding members 154, longitudinal members 156, front cross-member 158, rear upper cross-member 160, rear lower cross-member 162, and diagonal members 400. An upper end of diagonal members 400 is coupled to rear upper cross-member 160 with coupler assemblies 130 and a lower end of diagonal members 400 is coupled to rear frame portion 26. Illustratively, diagonal members 400 are angled downwardly over cargo box 12.

Additionally, vehicle 2' may include doors 222'. Doors 222' are coupled to bolster bars 140 and partially enclose operator area 14. Further details about doors 222' of vehicle 2' may be disclosed in U.S. Provisional Patent Application Ser. No. 61/829,743, filed on May 31, 2013, the complete disclosure of which is expressly incorporated by reference herein.

Referring to FIG. 37, vehicle 2' includes a front suspension assembly 170' and a rear suspension assembly 300'. Rear suspension assembly 300' is positioned generally rearward of powertrain assembly 250 at rear end 6 of utility vehicle 2'. Similar to rear suspension assembly 300 of FIG. 28, rear suspension assembly 300' of FIG. 37 includes upper alignment arms 302', lower alignment arms 304', shock absorbers 306', and a torsion bar 308'. In one embodiment, rear suspension assembly 300' is configured for approximately 12-14 inches of travel. Illustratively, rear suspension assembly 300' may be configured for approximately 13.2 inches of travel.

An outer end of upper and lower alignment arms 302', 304' is coupled to hub assemblies 310' of rear wheels 10'. A lower end of shock absorber 306' is coupled to lower alignment arm 304. Torsion bar 308' extends generally in a U-shape and is positioned along the inner sides of shock absorbers 306'. Torsion bar 308 is coupled to upper alignment arms 302'. Illustrative rear suspension assembly 300' of vehicle 2' may be approximately 10 inches wider than rear suspension assembly 300 of vehicle 2 (FIG. 28).

As shown in FIG. 37, front suspension assembly 170' includes upper alignment arms 172', lower alignment arms 174', shock absorbers 176', and a torsion bar 178'. Upper and lower alignment arms 172', 174' are coupled to a hub assembly 180' of front wheels 8'. Steering arms 192' are positioned intermediate upper alignment arms 172' and lower alignment arms 174'. Additionally, steering arms 192' are coupled to hub assemblies 180'. In one embodiment, front suspension assembly 170' is configured for approximately 10-13 inches of travel. Illustratively, front suspension assembly 170' may be configured for approximately 12.3 inches of travel.

The lower end of shock absorbers 176' is coupled to upper alignment arms 172' through a bracket 177'. Bracket 177' is also coupled to rods 186', which extend generally vertically and also couple with torsion bar 178'. Illustratively, shock absorbers 176' are operably coupled to torsion bar 178' with rods 186'. As such, movement may be transmitted between torsion bar 178' and shock absorbers 176'. Illustrative front suspension assembly 170' of vehicle 2' may be approximately 10 inches wider than front suspension assembly 170 of vehicle 2 (FIG. 28).

As with vehicle 2 of FIGS. 1-35, the center of gravity of vehicle 2' may be lowered by positioning various components of powertrain assembly 250, power steering assembly 190, front suspension assembly 170', and/or rear suspension assembly 300' lower on vehicle 2'. Additionally, the center of gravity of vehicle 2' may be lowered by comprising portions of frame assembly 20 and cab frame assembly 150' of light-weight materials, such as aluminum, carbon fiber, and/or polymeric materials, rather than steel. As such, portions of vehicle 2' may be adhered or otherwise bonded together, rather than welded.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A utility vehicle, comprising:
  a plurality of ground engaging members; a frame assembly supported by the ground engaging members; and
  a powertrain assembly supported by the frame assembly and including:
    an engine;
    a continuously variable transmission operably coupled to the engine; an air intake assembly fluidly coupled to the engine; and
    an exhaust assembly fluidly coupled to the engine, the exhaust assembly being configured to selectively regulate a flow of exhaust between a high-flow mode and a low-flow mode.

2. The utility vehicle of claim 1, wherein the exhaust assembly includes a first exhaust body, a second exhaust body, an inlet tube, an outlet tube, a first tube, a second tube, and a valve assembly.

3. The utility vehicle of claim 2, wherein the first tube is fluidly coupled to the outlet tube and is configured to provide an unrestricted flow path for the exhaust between the inlet tube and the outlet tube.

4. The utility vehicle of claim 3, wherein the second tube is positioned adjacent the first tube and is fluidly coupled to the first exhaust body and the second exhaust body.

5. The utility vehicle of claim 4, wherein flow of exhaust through the second tube and the second exhaust body is restricted.

6. The utility vehicle of claim 5, wherein the second exhaust body includes a plurality of baffle plates.

7. The utility vehicle of claim 6, wherein the exhaust assembly further includes a solenoid, wherein the solenoid is operable to open valve to allow a substantial portion or all of the exhaust entering first exhaust body from inlet tube to flow into first tube and into outlet tube through an unrestricted path.

8. The utility vehicle of claim 7, wherein the exhaust assembly further includes a electronic controller unit operable to provide instruction to the solenoid.

9. The utility vehicle of claim 7, wherein the solenoid is operable to receive a signal to at least partially close the valve to restrict exhaust entering the first exhaust body from the inlet tube to flow into the first tube and the outlet tube such that at least a substantial portion of the exhaust entering the first exhaust body from the inlet tube is diverted to the second tube and through a restricted flow path in the second exhaust body.

10. The utility vehicle of claim 1, wherein the exhaust assembly is be configured to allow the operator to selectively engage the low-flow mode.

11. The utility vehicle of claim 1, wherein the exhaust assembly includes an electronic control unit configured to operate the exhaust assembly in the low-flow mode, at specific throttle positions, or when in the non-sport drive mode.

12. The utility vehicle of claim 1, wherein a sound emanating from the exhaust assembly is greater when in the high-flow mode than in the low-flow mode.

* * * * *